United States Patent
Ellis et al.

(10) Patent No.: US 10,305,788 B2
(45) Date of Patent: May 28, 2019

(54) NEAR-REAL-TIME AND REAL-TIME COMMUNICATIONS

(71) Applicants: Donald R. Ellis, Ottawa (CA); Sylvain Chenard, Quebec (CA); Derrick Remedios, Ottawa (CA); Chris J. Chartrand, Ottawa (CA)

(72) Inventors: Donald R. Ellis, Ottawa (CA); Sylvain Chenard, Quebec (CA); Derrick Remedios, Ottawa (CA); Chris J. Chartrand, Ottawa (CA)

(73) Assignee: Alcatel Lucent, Nozay (FR)

( * ) Notice: Subject to any disclaimer, the term of this patent is extended or adjusted under 35 U.S.C. 154(b) by 57 days.

(21) Appl. No.: 15/199,725

(22) Filed: Jun. 30, 2016

(65) Prior Publication Data
US 2018/0006931 A1    Jan. 4, 2018

(51) Int. Cl.
*H04L 12/707* (2013.01)
*H04L 12/727* (2013.01)
(Continued)

(52) U.S. Cl.
CPC .......... *H04L 45/24* (2013.01); *H04L 1/0018* (2013.01); *H04L 45/121* (2013.01);
(Continued)

(58) Field of Classification Search
None
See application file for complete search history.

(56) References Cited

U.S. PATENT DOCUMENTS 4,949,254 A    8/1990    Shorter
6,111,673 A *  8/2000    Chang ................ H04J 14/0227
                                                    370/392
(Continued)

FOREIGN PATENT DOCUMENTS

WO    WO 2016/048430 A1    3/2016
WO    WO 2016/050270 A1    4/2016

OTHER PUBLICATIONS

Gill, Bob, "The Edge Manifesto: Digital Business, Rich Media. Latency Sensitivity and the Use of Distributed Data Centers," ID:G00290109, Jul. 31, 2015, downloaded from http/www.equinix.com/resource/analyst-reports/gartner-the-edge-manifesto/, 8 pages.
(Continued)

*Primary Examiner* — Michael J Moore, Jr.
(74) *Attorney, Agent, or Firm* — Tong, Rea, Bentley & Kim, LLC

(57) ABSTRACT

The present disclosure generally discloses capabilities for supporting new network zones and associated services. The network zones and associated services may include a near-real-time (NRT) zone and associated NRT services, a real-time (RT) zone and associated RT services, or the like. The resilient network zones and associated resilient and non-resilient services may be configured to provide bounded latency guarantees for reliably supporting various types of applications (e.g., mobile fronthaul, cloud computing, Internet-of-Things (IoT), or the like). The network zones and associated services may be provided using a distance-constrained fiber and wavelength switching fabric design comprised of various network devices and using associated controllers, which may be configured to support service provisioning functions, service testing functions, wavelength switching functions, and so forth.

21 Claims, 37 Drawing Sheets

(51) Int. Cl.
*H04L 1/00* (2006.01)
*H04L 29/06* (2006.01)
*H04L 29/08* (2006.01)
*H04L 12/721* (2013.01)

(52) U.S. Cl.
CPC .......... *H04L 65/1069* (2013.01); *H04L 67/12* (2013.01); *H04L 45/62* (2013.01)

(56) References Cited

U.S. PATENT DOCUMENTS

| | | | | |
|---|---|---|---|---|
| 7,839,766 | B1* | 11/2010 | Gardner | H04J 14/0294 370/218 |
| 8,400,355 | B1* | 3/2013 | Gaeta | H01Q 3/2682 342/368 |
| 8,484,353 | B1 | 7/2013 | Johnson et al. | |
| 9,392,471 | B1 | 7/2016 | Thomas et al. | |
| 9,780,909 | B2* | 10/2017 | Wood | H04J 14/0286 |
| 2005/0053375 | A1* | 3/2005 | Yoo | H04J 14/02 398/53 |
| 2005/0132367 | A1 | 6/2005 | Tewari | |
| 2007/0016904 | A1 | 1/2007 | Adlung et al. | |
| 2008/0244579 | A1 | 10/2008 | Muller | |
| 2008/0244595 | A1 | 10/2008 | Eilam | |
| 2011/0106802 | A1 | 5/2011 | Pinkney | |
| 2011/0170860 | A1* | 7/2011 | Smith | H04J 3/0682 398/25 |
| 2011/0318004 | A1* | 12/2011 | Bruno | H04Q 11/0062 398/45 |
| 2012/0158938 | A1 | 6/2012 | Shimonishi et al. | |
| 2012/0281979 | A1* | 11/2012 | Xia | H04J 14/0256 14/256 |
| 2013/0046906 | A1 | 2/2013 | Ripberger | |
| 2013/0055261 | A1 | 2/2013 | Han et al. | |
| 2014/0086576 | A1* | 3/2014 | Campbell | H04J 14/0227 14/227 |
| 2014/0330869 | A1 | 11/2014 | Factor et al. | |
| 2014/0334817 | A1* | 11/2014 | Miedema | H04Q 11/0062 398/48 |
| 2015/0082301 | A1 | 3/2015 | Garg et al. | |
| 2015/0237421 | A1* | 8/2015 | Morgan | H04Q 11/0005 398/45 |
| 2016/0134364 | A1* | 5/2016 | Grobe | H04B 10/071 398/25 |
| 2016/0364226 | A1 | 12/2016 | Takano et al. | |
| 2017/0019345 | A1 | 1/2017 | Yamasaki et al. | |
| 2017/0060628 | A1 | 3/2017 | Tarasuk-Levin et al. | |
| 2017/0132744 | A1 | 5/2017 | Wilt et al. | |
| 2017/0134089 | A1* | 5/2017 | Mansouri Rad | H04B 10/07953 |
| 2017/0161044 | A1 | 6/2017 | Singh et al. | |
| 2017/0230257 | A1 | 8/2017 | Bruun | |
| 2017/0295066 | A1 | 10/2017 | Ellis et al. | |
| 2017/0324620 | A1 | 11/2017 | Ellis et al. | |
| 2018/0041914 | A1 | 2/2018 | Zhang et al. | |
| 2018/0234308 | A1 | 8/2018 | Bruun et al. | |

OTHER PUBLICATIONS cellmapper.net, "Cellular Coverage and Tower Map," downloaded on Feb. 9, 2017 from https://www.cellmapper.net/map, 1 page.
datacentermap.com, "Data Center Map," downloaded on Feb. 9, 2017 from http://www.datacentermap.com/france/paris/, 16 pages.
Interoute, "Dark Fibre Network Provider, DWDM Network," downloaded on Feb. 9, 2017 from http://www.interoute.com/products/dark-fibre-network, 8 pages.
Vodofone, "Vodofone Ethernet Product overview," downloaded on Feb. 9, 2017 from http://www.vodafone.com/business/carrier-services, 2 pages.
Dix, John, "Inside AT&T's grand plans for SDN", Jan. 8, 2015, downloaded from http://www.networkworld.com/article/2866439/sdn/inside-atts-grand-plans-for-sdn.html, 8 pages.
Ovum, "Telecoms, Media & Entertainment Outlook 2015," downloaded from http://info.ovum.com/uploads/files/Ovum_Telecoms_Media_and_Entertainment_Outlook_2015.pdf on Feb. 9, 2017, 7 pages.
Data Center Knowledge, "Equinix CEO Unveils Aggressive Plan to Court Enterprises", downloaded from http://www.datacenterknowledge.com/archives/2016/01/08/equinix-ceo-unveils-aggressive-plan-to-court-enterprises/ on Feb. 9, 2017, 4 pages.
Crown Castle, "Outdoor Small Cell Solutions," downloaded from http://www.crowncastle.com/ on Mar. 21, 2017, 3 pages.
Zayo Group, "Mobile Infrastructure, Scalable bandwidth for wireless providers," downloaded from http://www.zayo.com/services/mobile-infrastructure on Feb. 9, 2017, 7 pages.
Verizon, "Verizon Enterprise Solutions," downloaded from http://www.verizonenterprise.com/about/ Feb. 9, 2017, 3 pages.
Equinix, "Syniverse Success Story", downloaded from http://www.equinix.com/industries/mobile/ on Feb. 9, 2017, 5 pages.
NGMN Alliance, "RAN Evolution Project—Backhaul and Fronthaul Evolution," v1.01 Mar. 31, 2015, 28 pages.
NGMN Alliance, "Fronthaul Requirements for C-RAN," v1.0 Mar. 31, 2015, 11 pages.
NGMN Alliance, "Suggestions on Potential Solutions to C-RAN," v4.0 Jan. 3, 2013.
Munoz, et al., "An experimental switching-aware GMPLS-based lightpath provisioning protocol in wavelength-routed networks," Photonic Network Communications, Kluwer Academic Publishers, BO, vol. 14, No. 3, Jul. 13, 2017, pp. 253-264, XP019532832.
Jukan, et al., "Constraint-based path selection methods for on-demand provisioning in WDM networks", IEEE Infocom 2002, vol. 2, Jan. 1, 2002, pp. 827-836, XP002428368.
Freiberger, et al., "Low Latency Optical Services," Optical Fiber Communication Conference and Exposition (OFC/NFOEC), 2012, and the National Fiber Optic Engineers Conference, IEEE, Mar. 4, 2012, pp. 1-3, XP032340399.
Charbonneau, et al., "A Survey of Advance Reservation Routing and Wavelength Assignment in Wavelength-Routed WDM Networks," IEEE Communications Surveys and Tutorials, Institute of Electrical and Electronics Engineers, US, vol. 14, No. 4, Oct. 1, 2012, pp. 1037-1064, XP011471436.
International Search Report and Written Opinion mailed in corresponding PCT/IB2017/000982, dated Oct. 26, 2017, 11 pages.

* cited by examiner

SERVICE ATTRIBUTES
/— 310

| 1.0 | ETHERNET WAVELENGTH SERVICE ATTRIBUTES | | | | | |
|---|---|---|---|---|---|---|
| | RT 1.0 | | | NRT 1.0 | | |
| BIT SERVICE | REAL TIME | | | NEAR REAL TIME | | |
| CONNECT ZONES | HIGH | MEDIUM | LOW | HIGH | MEDIUM | LOW |
| BIT DELAY | <150uS | <300uS | <450uS | <2mS | <5mS | <10mS |
| BDV | - | - | - | - | - | - |
| BER | 10-9 | 10-9 | 10-9 | 10-9 | 10-9 | 10-9 |

SERVICE ATTRIBUTES
/— 320

| 2.0 | ETHERNET WAVELENGTH SERVICE ATTRIBUTES | | | | | |
|---|---|---|---|---|---|---|
| | RT 2.0 | | | NRT 2.0 | | |
| FRAME SERVICE | REAL TIME | | | NEAR REAL TIME | | |
| PERFORMANCE ZONES | HIGH | MEDIUM | LOW | HIGH | MEDIUM | LOW |
| FRAME DELAY | <150uS | <300uS | <450uS | <2mS | <5mS | <10mS |
| FDV | <5uS | <5uS | <5uS | <20uS | <20uS | <50uS |
| FLR % | .0001 | .0001 | .0001 | .0001 | .0001 | .0001 |

| NRT EXPRESS SERVICE | |
|---|---|
| E-LINE | 9.648 |
| O-LINE | 6.448 |
| W-LINE | 6.048 |
| EW-LINE (NO DCx) | 1.969 |

| RT SERVICE | HP | MP | LP |
|---|---|---|---|
| E-LINE | | 0.218 | 0.438 |
| O-LINE | | 0.218 | 0.238 |
| W-LINE | | 0.168 | 0.188 |
| EW-LINE | 0.148 | | |

FIG. 3

NRT ZONE LATENCY ALLOCATION TABLE

TOTAL LATENCY TARGET | DISTANCE e | FIBER MEDIA | NETWORK, SERVICE & INTERCONNECT | | | | | | | | DATA CENTER

Table 1000

| NEAR REAL TIME ZONE | ms | km | LATENCY FIBER | % | LATENCY SERVICE | % | UNIs 10us | RSFEC | λx 100ns | Cx 25us | Px 100us | NR+SR ALLOCATION | NTR SERVICE TOTAL | DX 1ms | LATENCY (+DCx) | MARGIN |
|---|---|---|---|---|---|---|---|---|---|---|---|---|---|---|---|---|
| NRT EXPRESS ZONE | 10 | 200 | 1.961 | 20% | 8.039 | 80% | 4 | 1 | 32 | 8 | 16 | | 3.806 | 2 | | |
| # OF NEs | | | | | | | | | | | | | | | | |
| UNIs & NNIs | | | | | | | | | | | | | | | | |
| NRT EXPRESS SERVICE: E-LINE (Px) | | | | | | | 0.08 | 0.12 | 0.0064 | 0.4 | 3.2 | 3.666 | 5.648 | 2 | 7.648 | 0.391 |
| W-LINE (Cx) | | | | | | | 0.08 | | 0.0064 | 0.4 | 0 | 0.486 | 2.448 | 2 | 4.448 | 3.591 |
| W-LINE (λx) | 2 | 200 | 1.961 | 98% | 0.039 | 2% | 0.08 | | 0.0064 | 0 | 0 | 0.086 | 2.048 | 2 | 4.048 | 3.991 |
| NRT COLLECTOR ZONE | 5 | 80 | 0.785 | 16% | 4.215 | 84% | 2 | 1 | 16 | 4 | 4 | | 1.163 | 1 | | |
| # OF NEs | | | | | | | | | | | | | | | | |
| UNIs & NNIs | | | | | | | | | | | | | | | | |
| NRT COLLECTOR SERVICE: E-LINE (Px) | | | | | | | 0.04 | 0.12 | 0.0032 | 0.2 | 0.8 | 1.043 | 1.828 | 1 | 2.828 | 1.388 |
| W-LINE (Cx) | | | | | | | 0.04 | | 0.0032 | 0.2 | 0 | 0.243 | 1.028 | 1 | 2.028 | 2.188 |
| W-LINE (λx) | 1 | 80 | 0.785 | 78% | 0.215 | 22% | 0.04 | | 0.0032 | 0 | 0 | 0.043 | 0.828 | 1 | 1.828 | 2.388 |

▼ = 10G 3R UNI
▽ = 10G SERVICE UNI
▽ = 100G SERVICE UNI

120km DUAL PATH CIRCUMFERENCE — 1km INTERCONNECT
65km DUAL PATH CIRCUMFERENCE — 1km INTERCONNECT
12km DUAL PATH
2km ACCESS

FIG. 10

NEAR-REAL-TIME AND REAL-TIME COMMUNICATIONS

TECHNICAL FIELD

The present disclosure relates generally to communication networks and, more particularly but not exclusively, to communication networks that are configured to support new network zones and associated provider services.

BACKGROUND

Various types of communication services may be delivered using various types of communication networks. For example, various types of services may be provided using Metro Ethernet networks, Regional Internet networks, Internet networks, or the like.

SUMMARY

The present disclosure generally discloses capabilities for supporting one or more network zones and associated provider services.

In at least some embodiments, a network device includes a processor and a memory communicatively connected to the processor. The processor is configured to receive wavelength path latency information for a set of available wavelength paths supported by the network device, wherein the wavelength path latency information comprises bounded latency path information and lowest latency path information. The processor is configured to perform a management action for a service at the network device based on the wavelength path latency information. In at least some embodiments, a non-transitory computer-readable storage medium stores instructions which, when executed by a processor of a network device, cause the network device to perform a corresponding method. In at least some embodiments, a corresponding method is provided for use by a network device or other device.

In at least some embodiments, a controller includes a processor and a memory communicatively connected to the processor. The processor is configured to receive latency information from a network device. The processor is configured to determine, based on the latency information, wavelength path latency information for a set of available wavelength paths supported by the network device, wherein the wavelength path latency information comprises bounded latency path information and lowest latency path information. The processor is configured to propagate the wavelength path latency information toward the network device for use by the network device to perform a management action for a service at the network device based on the wavelength path latency information. In at least some embodiments, a non-transitory computer-readable storage medium stores instructions which, when executed by a processor of a controller, cause the controller to perform a corresponding method. In at least some embodiments, a corresponding method is provided for use by a controller or other device.

BRIEF DESCRIPTION OF THE DRAWINGS

The teachings herein can be readily understood by considering the following detailed description in conjunction with the accompanying drawings, in which:

FIG. 3 depicts exemplary Ethernet and wavelength service attributes for NRT and RT services;

FIG. 10 depicts various switching latencies and associated engineering guidelines for NRT zones and associated services;

To facilitate understanding, identical reference numerals have been used, where possible, to designate identical elements that are common to the figures.

DETAILED DESCRIPTION

Figure 1:
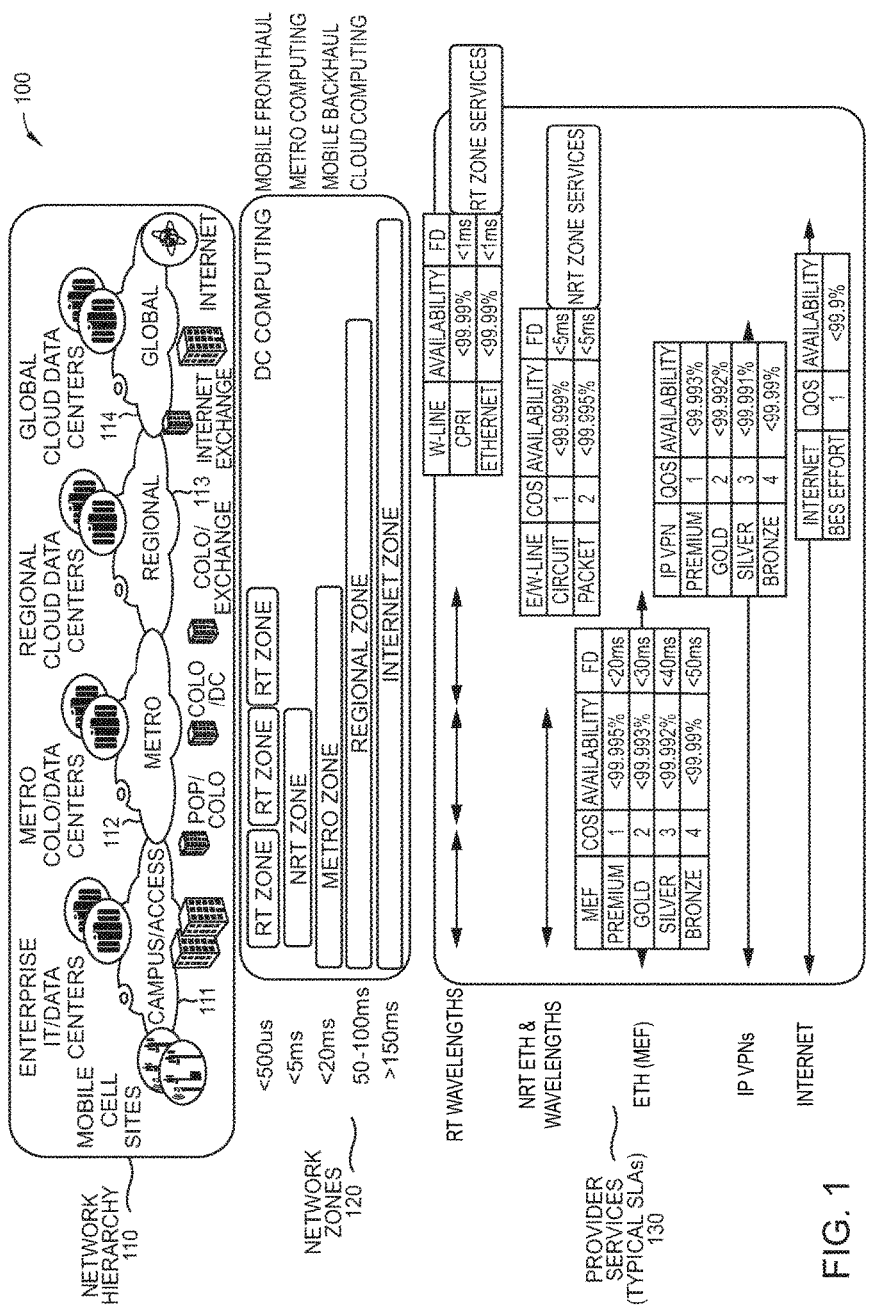
FIG. 1 depicts an exemplary communication system for illustrating network zones and associated provider services.

The present disclosure generally discloses capabilities for supporting one or more new network zones and associated zone services. The one or more new network zones (which may be referred to herein more generally as zones) and associated zone services (which may be referred to herein more generally as services). The network zones may be configured as resilient network zones which may support resilient and non-resilient services. The one or more new zones and associated zone services may include near-real-time (NRT) and real-time (RT) zones and associated NRT and RT services, respectively (although it will be appreciated that the one or more new zones and associated services may include fewer or more, as well as different, zones and associated services). The present disclosure defines service attributes for NRT and RT services, network engineering guidelines for providing NRT and RT zones to support NRT and RT services, network provisioning for providing NRT and RT zones to support NRT and RT services, service provisioning for providing NRT and RT services within NRT and RT zones, service testing for testing NRT and RT services within NRT and RT zones, wavelength selective switching capabilities (e.g., lowest latency wavelength first switching, equal bounded latency multipath wavelength switching, or the like), and the like, as well as various combinations thereof. The NRT and RT zones and services may be used within various contexts such as, but not limited to, mobile fronthaul, factory automation, motion control, industrial Internet-of-Things (IoT), tactile Internet, smart grid systems, intelligent transportation systems, securities trading applications, or the like, as well as various combinations thereof. The NRT and RT zones and services may be used to support various other zones and services (e.g., Metro Ethernet, Regional IP Services, Internet Services, or the like) which may be used within various contexts such as, but not limited to, metro computing, mobile backhaul, automated guided vehicle systems, transactional point of service (POS) systems, cloud computing systems, process automation systems, consumer IoT, or the like, as well as various combinations thereof. The NRT and RT zones and services may be used to support various customer services (e.g., customer Ethernet services, common public radio interface (CPRI) services, datacenter interconnect (DCI) services, Internet services, or the like) which may be provided within various contexts (e.g., within NRT or RT zones using NRT or RT services, utilizing NRT or RT zones as well as other types of network zones, or the like), where such support may include service provisioning, service testing (e.g., service latency verification, service SLA verification, or the like), or the like, as well as various combinations thereof. These and various other embodiments and potential advantages of capabilities for supporting new network zones and associated provider services may be further understood by way of reference to the exemplary communication system of FIG. 1.

FIG. 1 depicts an exemplary communication system for illustrating network zones and associated provider services.

The communication system 100 has a network hierarchy 110 which includes a set of network zones 120 which support a set of provider services 130.

The network hierarchy 110 includes a number of interconnected networks which support communications from end user devices out to global networks such as the Internet. The network hierarchy 110 includes a campus/access network 111, a metro network 112, a regional network 113, a global network 114, and the Internet 115. The campus/access network 111 supports a set of mobile cell sites and enterprise and IT data centers. The metro network 112 supports communications of the campus/access network 111 as well as metro colocation centers (COLOs) and metro datacenters (DCs). The regional network 113 supports communications of metro network 112 as well as regional cloud DCs. The global network 114 supports communications of regional network 113 as well as global cloud DCs. The global network 114 also provides access to the Internet 115. It will be appreciated that the network hierarchy 110 is merely exemplary and that various other network hierarchies, which may include various other types of communication networks supporting various other types of facilities and which may be arranged in different ways, may be supported.

The network hierarchy 110 includes the set of network zones 120. The network zones 120 correspond to portions of the network hierarchy 110 that are engineered in a particular way to support particular services. The network zones 120 may be constrained by various engineering constraints associated with portions of the network hierarchy 110 in which the network zones 120 are provided and, thus, may be defined based on various engineering constraints associated with portions of the network hierarchy 110 in which the network zones 120 are provided. For example, the network zones 120 may be defined in terms of the network latency that is supported by or experienced by the communications traversing those portions of the network hierarchy 110 (although it will be appreciated that network zones 120 may be defined based on other constraints and criteria). As depicted in FIG. 1, the network zones 120 include an Internet zone, a regional zone, a metro zone, an NRT zone, and three RT zones. The Internet zone is associated with communications between endpoints associated with access/campus network 111 and access to the Internet 115 (and is indicated as having a latency of greater than 150 ms, although it will be appreciated that other latency values may be used or achieved). The regional zone is associated with communications between endpoints associated with the access/campus network 111 and a demarcation point between the global network 114 and the regional network 113 (and is indicated as having a latency between 50 ms and 100 ms, although it will be appreciated that other latency values may be used or achieved). The metro zone is associated with communications between endpoints associated with the access/campus network 111 and a demarcation point between the regional network 113 and the metro network 112 (and is indicated as having a latency of less than 20 ms, although it will be appreciated that other latency values may be used or achieved). The NRT zone is associated with communications between endpoints associated with the access/campus network 111 and the metro network 112 indicated as having a latency of less than 5 ms, although it will be appreciated that other latency values may be used or achieved). The three RT zones are defined within and between elements of the access/campus network 111 and the metro network 112 (and are indicated as having a latency of less than 500 us, although it will be appreciated that other latency values may be used or achieved). As depicted in FIG. 1, different network zones 120 may be used to support different network functions (illustratively, the regional zone may support cloud computing functions, the metro zone may support mobile backhaul functions, the NRT zone may support metro computing functions, and the RT zones may support DC computing functions and mobile fronthaul functions). It will be appreciated that fewer or more, as well as different, network zones 120 may be defined.

The network zones 120 support the network of provider services 130. The network zones 120 correspond to portions of the network hierarchy 110 that are engineered in a particular way to support the provider services 130. The provider services 130 may be constrained by various constraints of the network zones 120. The provider services 130 may have various service level agreements (SLAs) associated therewith. The Internet zone supports an Internet service (e.g., a best effort service with a QoS level of "1" and an availability of 99.9%). The regional zone supports regional services such as IP virtual private network (VPN) services (e.g., a premium VPN service with a QoS level of "1" and an availability of 99.993%, a gold VPN service with a QoS level of "2" and an availability of 99.992%, a silver VPN service with a QoS level of "3" and an availability of 99.991%, and a bronze VPN service with a QoS level of "4" and an availability of 99.99%). The metro zone supports metro services such as Metro Ethernet Forum (MEF) services, such as a premium MEF service (with a CoS level of "1", an availability of 99.995%, and a frame delay (FD) of less than 20 ms), a gold MEF service (with a CoS level of "2", an availability of 99.993%, and an FD of less than 30 ms), a silver MEF service (with a CoS level of "3", an availability of 99.992%, and an FD of less than 40 ms), and a bronze MEF service (with a CoS level of "4", an availability of 99.99%, and an FD of less than 50 ms). The NRT zone supports NRT services such as NRT Ethernet services or NRT wavelength services (which are indicated as E/W-Line services). The E/W-Line services of the NRT zone may include a circuit-based E/W-Line service (with a CoS level of "1", an availability of 99.999%, and an FD of less than 5 ms) and a packet-based E/W-Line service (with a CoS level of "2", an availability of 99.995%, and an FD of less than 5 ms). The RT zone supports RT services such as RT wavelength services (which are indicated as W-Line services). The W-Line services of the RT zone may include a CPRI W-Line service for supporting mobile fronthaul (with an availability of 99.99% and an FD of less than 1 ms) and an Ethernet W-Line service (with an availability of 99.99% and an FD of less than 1 ms). It will be appreciated that fewer or more, as well as different, provider services 130 may be defined.

Figure 2:
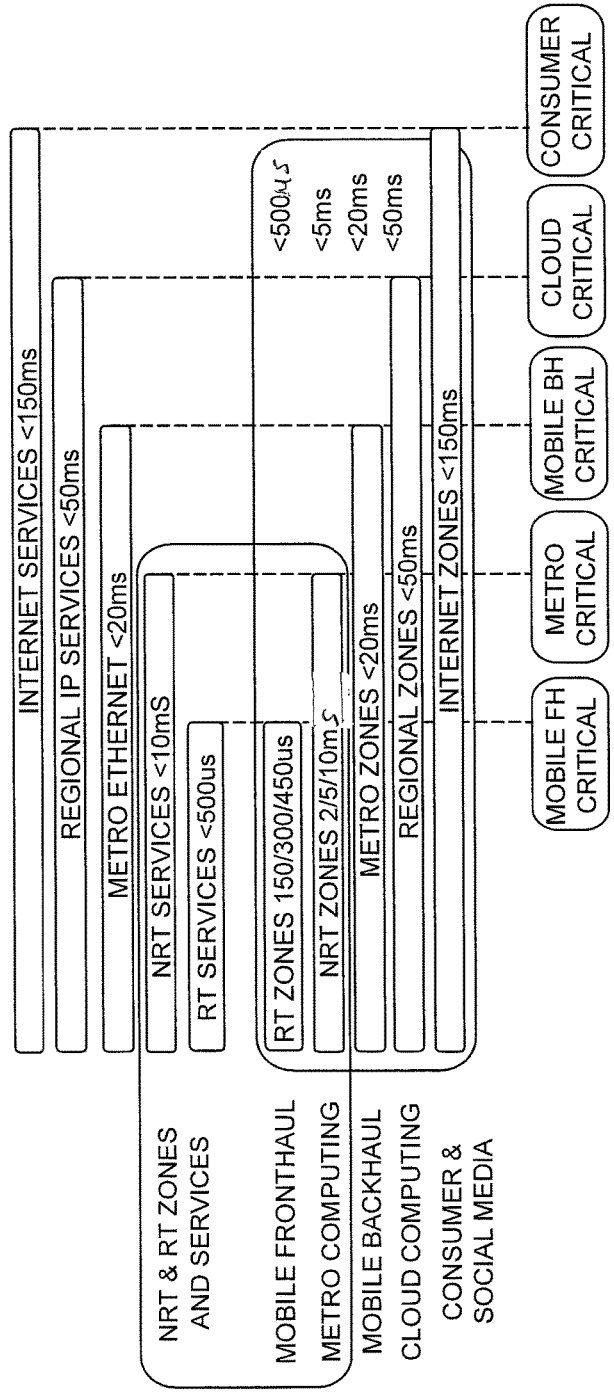
FIG. 2 depicts an exemplary hierarchy of network zones and associated services including NRT and RT zones and associated NRT and RT services.

FIG. 2 depicts an exemplary hierarchy of network zones and associated services including NRT and RT zones and associated NRT and RT services. As depicted in FIG. 2, the exemplary hierarchy 200 includes network zones and associated services depicted and described with respect to FIG. 1. As depicted in FIG. 2, the exemplary hierarchy 200 includes an Internet zone (e.g., latency <150 ms) configured to support Internet services (e.g., latency <150 ms), a regional zone (e.g., latency <50 ms) configured to support regional IP services (e.g., latency <50 ms), and a metro Ethernet zone (e.g., latency <20 ms) configured to support metro Ethernet services (e.g., latency <20 ms). As further depicted in FIG. 2, the exemplary hierarchy 200 includes a set of three NRT zones (e.g., an NRT low performance (LP) zone having a latency <10 ms, an NRT medium performance (MP) zone having a latency <5 ms, and an NRT high performance (HP) zone having a latency <2 ms) configured to support NRT services (e.g., latency <10 ms). As further depicted in FIG. 2, the exemplary hierarchy 200 includes a set of three RT zones (e.g., an RT low performance (LP) zone having a latency <450 us, an RT medium performance (MP) zone having a latency <300 us, and an LT high performance (HP) zone having a latency <150 us) configured to support RT services (e.g., latency <500 us). It will be appreciated that fewer or more NRT zones and services may be supported (or may be defined using other latencies or the like), fewer or more RT zones and services may be supported (or may be defined using other latencies or the like), or the like.

FIG. 3 depicts exemplary Ethernet and wavelength service attributes for NRT and RT services. The Ethernet and wavelength service attributes for NRT and RT services are depicted for two different services (illustratively, a bit service and a frame service) for three NRT zones (illustratively, LP, MP, and HP NRT zones) and for three RT zones (illustratively, LP, MP, and HP RT zones).

As depicted in FIG. 3, in at least some embodiments, NRT and RT zones may be configured to support a set of Ethernet and wavelength service attributes for a bit service (denoted in FIG. 3 as service attributes 310). The bit delays for the various NRT and RT zones may be bounded as follows: NRT LP zone (<10 ms), NRT MP zone (<5 ms), NRT HP zone (<2 ms), RT LP zone (<450 us), RT MP zone (<300 us), and RT HP zone (<150 us). The bit error rates (BERs) for the various NRT and RT zones are each bounded at 10-9. In at least some embodiments, the wavelength service attributes may include basic wavelength services (e.g., UNI-UNI), bit-aware mapping for W-UNI interfaces, wavelength virtual connections (WVCs) over various physical media (e.g., fiber, wavelength division multiplexing (WDM), optical transport network (OTN), microwave, or the like), point-to-point wavelength services (e.g., wavelength line (W-Line) services, wavelength access (W-Access) services, or the like), or the like, as well as various combinations thereof. In at least some embodiments, the wavelength service attributes may be used with various wavelength service interfaces, such as client UNIs (e.g., Ethernet any rate), Mobile client UNIs (e.g., CPRI), Cloud client UNIs (e.g., Ethernet, Fibre Channel (FC), InfiniBand (IB), or the like), or the like, as well as various combinations thereof).

As depicted in FIG. 3, in at least some embodiments, NRT and RT zones may be configured to support a set of Ethernet and wavelength service attributes for a frame service (denoted in FIG. 3 as service attributes 320). The frame delays for the various NRT and RT zones may be bounded as follows: NRT LP zone (<10 ms), NRT MP zone (<5 ms), NRT HP zone (<2 ms), RT LP zone (<450 us), RT MP zone (<300 us), and RT HP zone (<150 us). The frame delay variation (FDV) for the various NRT and RT zones may be bounded as follows: NRT LP zone (<50 us), NRT MP zone (<20 us), NRT HP zone (<20 us), RT LP zone (<5 us), RT MP zone (<5 us), and RT HP zone (<5 us). The frame loss ratio (FLR) for the various NRT and RT zones are each bounded at 0.0001. In at least some embodiments, the wavelength service attributes may include enhanced wavelength services (e.g., UNI-WVC-UNI), frame-aware mapping for W-UNI network-facing interfaces, WVCs over various physical media (e.g., fiber, WDM, OTN, microwave, or the like), point-to-point wavelength services (e.g., W-Line services, W-Access, wavelength tree (W-Tree) services, or the like), or the like, as well as various combinations thereof. In at least some embodiments, the wavelength service attributes may be used with various wavelength service interfaces, such as client UNIs (e.g., Ethernet any rate including Time Sensitive Ethernet (TSE)), Mobile client UNIs (e.g., CPRI), Cloud client UNIs (e.g., Ethernet, FC, IB, or the like), or the like, as well as various combinations thereof).

It will be appreciated that various other Ethernet and wavelength service attributes may be supported for NRT and RT services provided using NRT and RT zones, respectively.

Figure 4:
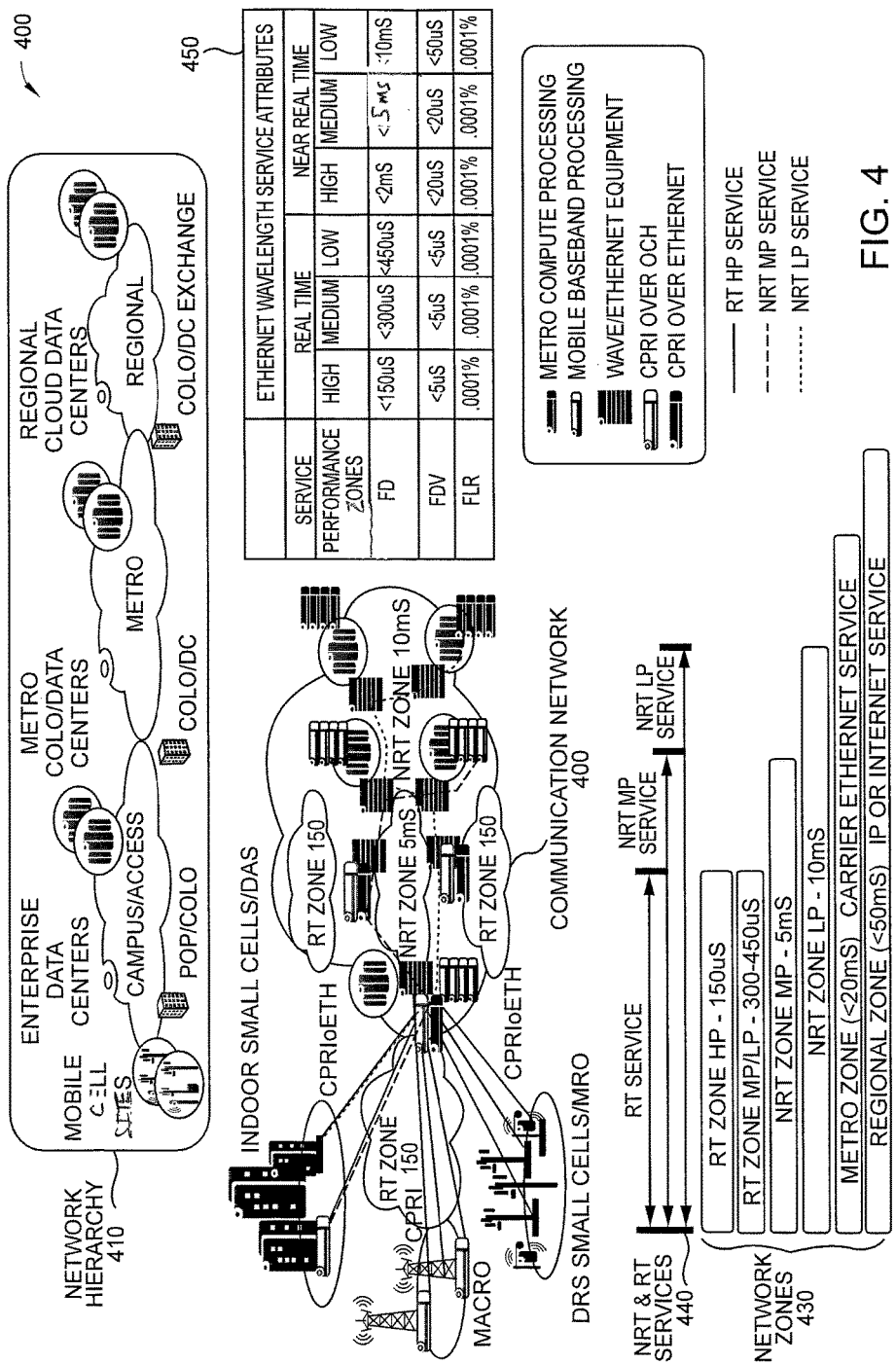
FIG. 4 depicts an exemplary communication system to illustrate an exemplary communication network having NRT and RT zones in relation to the exemplary communication system of FIG. 1, the exemplary hierarchy of network zones and associated services of FIG. 2, and the exemplary Ethernet and wavelength service attributes of FIG. 3.

FIG. 4 depicts an exemplary communication system to illustrate an exemplary communication network having NRT and RT zones in relation to the exemplary communication system of FIG. 1, the exemplary hierarchy of network zones and associated services of FIG. 2, and the exemplary Ethernet and wavelength service attributes of FIG. 3.

The communication system 400 has a network hierarchy 410, a communication network 420, a set of network zones 430, a set of NRT and RT services 440, and a set of Ethernet and wavelength service attributes 450.

The network hierarchy 410 is substantially similar to the network hierarchy 110 of FIG. 1.

The communication network 420 corresponds to network hierarchy 410, illustrating additional details of the network hierarchy 410. The communication network 420 includes three sets of mobile access points (illustratively, a set of indoor small cells, a set of macro access devices, and a set of DRS small cells) and an associated mobile access network supporting the three sets of mobile access points.

The network zones 430 are configured to support the NRT and RT services 440 in order to meet the set of Ethernet and wavelength service attributes 450. As depicted in FIG. 4, an RT HP zone is set up to support communication between each of the three sets of mobile access points and a network access point of the mobile access network, two additional RT zones are set up for communications within the mobile access network, an NRT MP zone is set up for backhaul communications between the RT HP zone (e.g., from the network access point of the mobile access network) and other network elements of the mobile access network, and an NRT LP zone is set up for backhaul communications between the NRT MP zone and the regional zone of the communication network. The set of network zones 430 includes a regional zone, a metro zone, an NRT LP zone, an NRT MP zone, an RT MP/LP zone, and an RT HP zone. The set of NRT and RT services 440 includes NRT and RT services supported by the NRT and RT zones of the set of NRT and RT zones 430, respectively (illustratively, NRT LP services, NRT MP services, and RT services).

It will be appreciated that communication system 400 is merely exemplary and that various other communication systems may be configured in various other ways based on network zones and associated services.

As indicated above, NRT and RT zones and associated NRT and RT services may have network and service latencies associated therewith. In existing networks, which do not support NRT and RT zones and associated NRT and RT services, networking is typically unconstrained. For example, in circuit switched networks such as plesiochronous digital hierarchy (PDH) networks and synchronous digital hierarchy (SDH) networks, the associated DS-x and OC-n routes were not designed based on latency objectives. Similarly, for example, in various packet networks (e.g., Frame Relay (FR) networks, Asynchronous Transfer mode (ATM) networks, Internet Protocol (IP) networks, Ethernet local area networks (LANs), and so forth), there are many variables and many potential paths which prevent bounding of latency. Similarly, for example, in carrier Ethernet and OTN networks, while service delays can be measured, the latency typically is not bounded. By contrast, for NRT and RT zones and associated NRT and RT services, the NRT and RT zones may be configured such that network latency may be bounded to provide predictable network and service latencies.

In at least some embodiments, configuration of a communication network to include NRT and RT zones, in order to provide bounded network latency (and, thus, support bounded service latency), may include use fiber network engineering, fiber network control capabilities, or the like, as well as various combinations thereof. The configuration of a communication network to bound network latency may include use of fiber network engineering to provide NRT and RT zones and to interconnect the NRT and RT zones to provide a fiber network with bounded network latency. The fiber network engineering may include fiber network distance engineering, fiber network nodal engineering, or the like, as well as various combinations thereof. The fiber network engineering may include use of fiber network constraints, dual path fibers wavelength (λ) switching (which may be referred to herein as a wave fabric), or the like, as well as various combinations thereof). The use of wavelength switching to provide NRT and RT zones and to interconnect the NRT and RT zones may include use of colorless-directionless-contentionless (CDC) reconfigurable optical add-drop multiplexers (ROADMs), which may be configured to support wavelength switching within network zones and which may be arranged to support wavelength switching between various network zones (e.g., between network zones of the same type, hierarchically between network zones of different types, or the like, as well as various combinations thereof). The fiber network engineering may include configuration of NRT and RT zones and interconnections between NRT and RT zones in order to support non-blocking wavelength services. In at least some embodiments, the configuration of NRT and RT zones in order to bound network latency may include use of a wavelength switching capabilities configured to support wavelength switching (e.g., use of a wavelength switching layer (λx) and associated wavelength switching hierarchy which may be based on wavelength switches, zone uniformity, control capabilities (e.g., using control plane software, such as software similar to SDN software), wavelength switching capabilities, limited over-subscription at any layer, or the like, as well as various combinations thereof). In at least some embodiments, the configuration of NRT and RT zones in order to bound network latency may include use of wavelength switching capabilities configured to support wavelength switching where the wavelength switching capabilities may include a wave fabric (e.g., a hierarchy of interconnected wavelength selective switches configured to provide a non-blocking, bounded latency optical network), wavelength switching strategies (e.g., Lowest Latency λ Path Switching (LLλPS), Equal Bounded Latency Multi-Path λ Switching (EBLMλS), or the like, as well as various combinations thereof), or the like, as well as various combinations thereof. In at least some embodiments, the configuration of NRT and RT zones in order to bound network latency may include, in addition to wavelength switching, use of one or both of circuit switching (Cx) and packet switching (Px). These and various other embodiments for configuring NRT and RT zones in order to bound network latency and, thus, service latency, are discussed in further detail below.

Figure 5:
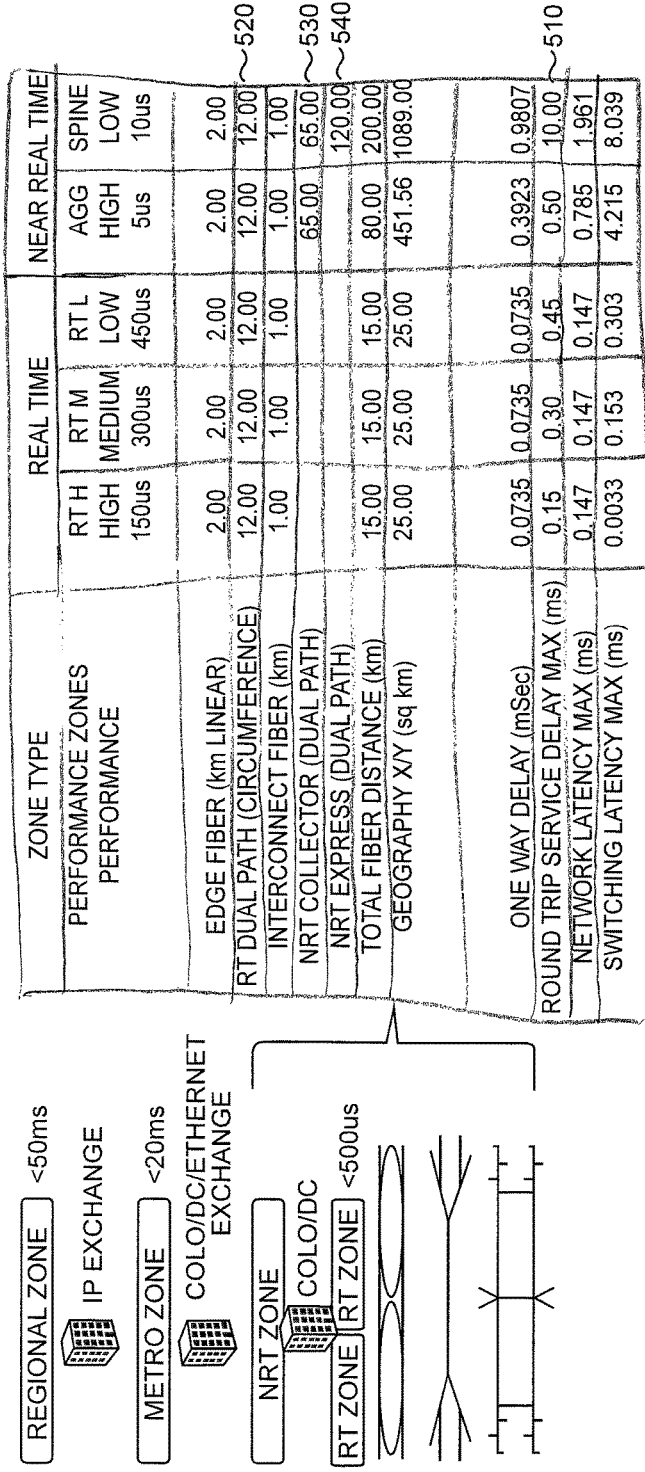
FIG. 5 depicts exemplary fiber network distance engineering guidelines for providing NRT and RT zones to support NRT and RT services having the service attributes of FIG. 3.

FIG. 5 depicts exemplary network distance engineering guidelines for providing NRT and RT zones to support NRT and RT services having the service attributes of FIG. 3. As depicted in FIG. 5, the network distance engineering guidelines 500 include various latency values and associated distance values for NRT zones (illustratively, an NRT LP zone (which also may be referred to herein as an Aggregation (Agg) Zone) and an NRT MP zone (which also may be referred to herein as a Spine Zone)) and for RT zones (illustratively, an RT LP zone, an RT MP zone, and an RT HP zone). The desired service delays associated with the NRT and RT zones are depicted in row 510 (Round Trip Service Delay Max (ms) of the network distance engineering guidelines 500 (illustratively, 10 ms for the NRT LP zone, 5 ms for the NRT MP zone, 450 us for the RT LP zone, 300 us for the RT MP zone, and 150 us for the RT HP zone). The fiber distances for the NRT and RT zones may be calculated based on the desired wavelength path/service latencies associated with the NRT and RT zones and based on the speed of light and, similarly, the wavelength path/service latencies associated with the NRT zones may be calculated based on the fiber distances for the NRT and RT zones and based on the speed of light. In this manner, the NRT and RT zones may be configured to provide bounded wavelength path/service latencies and, thus, to provide bounded communication latencies even when other types of latencies are introduced (e.g., network, service, interconnect, or the like, as well as various combinations thereof). The RT dual path distance for the RT zones is depicted in row 520 (illustratively, 12 km). The NRT dual path distance for the NRT MP zone is depicted in row 530 (illustratively, 65 km). The NRT dual path distance for the NRT LP zone is depicted in row 540 (illustratively, 120 km). It will be appreciated that other suitable latency goals and associated distances may be used.

Figure 6:
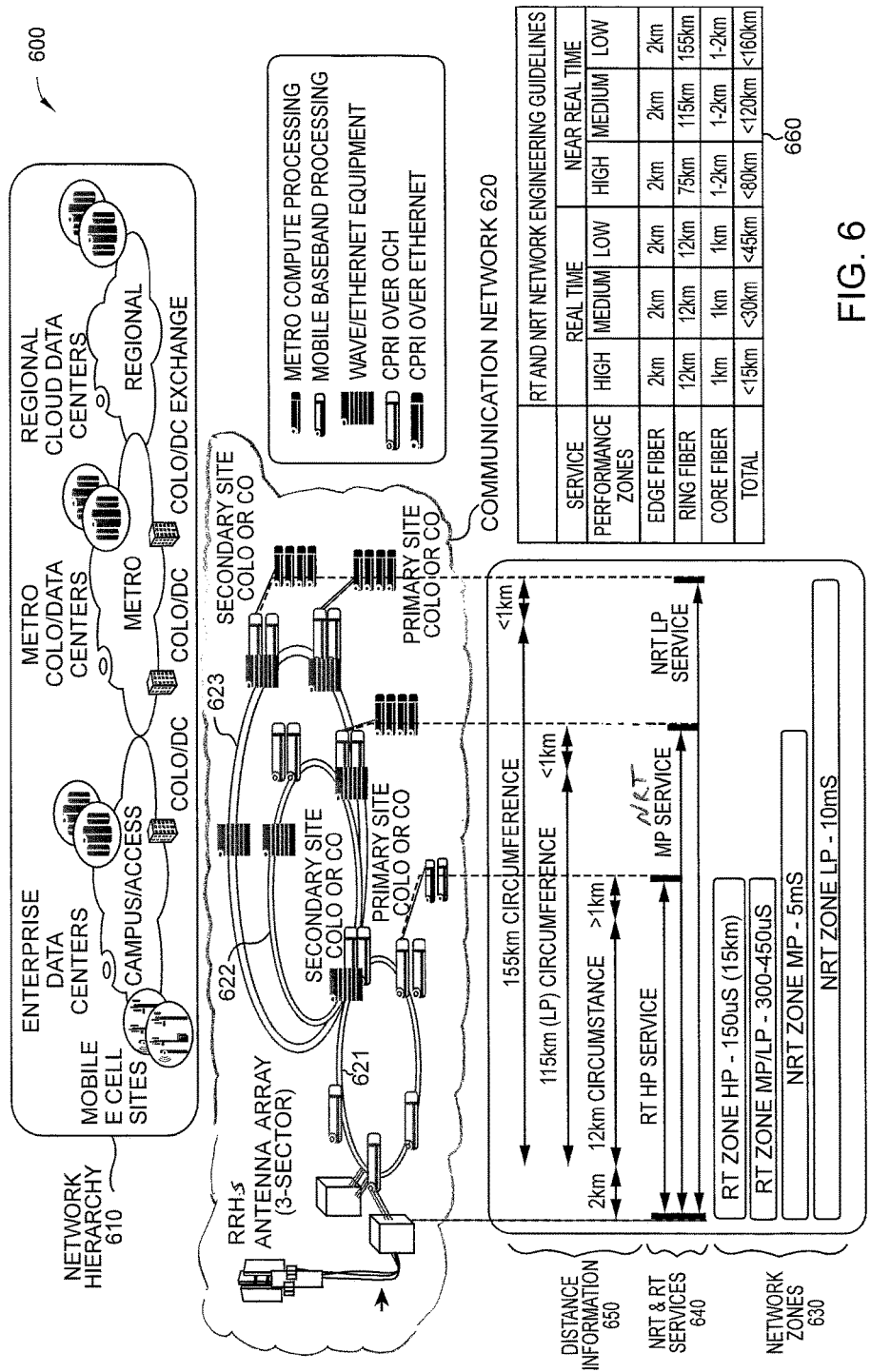
FIG. 6 depicts an exemplary communication system including NRT and RT zones engineered based on the fiber network distance engineering guidelines of FIG. 5.

FIG. 6 depicts an exemplary communication system including NRT and RT zones engineered based on the network distance engineering guidelines of FIG. 5.

The communication system 600 has a network hierarchy 610, a communication network 620, a set of network zones 630, a set of NRT and RT services 640, a set of distance information 650, and a set of NRT and RT network engineering guidelines 660.

The network hierarchy 610 is substantially similar to the network hierarchy 110 of FIG. 1 and the network hierarchy 410 of FIG. 4.

The communication network 620 corresponds to network hierarchy 610, illustrating additional details of the network hierarchy 610. The communication network 620 includes various interconnected fiber rings having certain circumferences configured based on the network distance engineering guidelines 500 of FIG. 5. For example, a first fiber ring 621 has a 12 km circumference in order to provide an RT zone. For example, a second fiber ring 622, which is interconnected with the first fiber ring 621, has a 115 km circumference in order to provide an NRT MP zone (supporting traffic of the first fiber ring 621 and, thus, of the RT zone). For example, a third fiber ring 623, which is interconnected with the first fiber ring 621 and the second fiber ring 622, has a 155 km circumference in order to provide an NRT LP zone (supporting traffic of the first fiber ring 621 and the second fiber ring 622 and, thus, of the RT zone and the NRT MP zone, respectively). As depicted in FIG. 6, the fiber rings interconnect nodes deployed at various locations. It will be appreciated that the configuration of fiber rings may be performed in various ways. For example, where a large set of locations and associated equipment of the network provider are already available, the locations and equipment may be analyzed (e.g., based on network distance engineering guidelines as well as various other factors, such as locations of service interfaces, traffic expectations, or the like, as well as various combinations thereof) in order to determine various ways in which the existing locations and equipment may be interconnected to provide NRT and RT zones. For example, in a greenfield situation in which the network provider has not yet obtained locations or deployed equipment, locations for the equipment and the equipment may be used may be selected (e.g., based on network distance engineering guidelines as well as various other factors, such as locations of service interfaces, traffic expectations, or the like, as well as various combinations thereof) so as to provide NRT and RT zones. It will be appreciated that combinations of such approaches may be used in order to identify locations and associated equipment, as well as their interconnections, in order to provide various NRT and RT zones supporting bounded network and service latency.

The network zones 630 are configured to support the NRT and RT services 640 where the configuration of the network zones, as indicated above, is based on the NRT and RT network engineering guidelines 660. As depicted in FIG. 6, the set of network zones 630 includes (1) an RT HP zone, with a circumference of 12 km on first fiber ring 621, which is configured to support communication between the mobile access points (illustratively, RRHs) and a network access point of the metro network, (2) an NRT MP zone, with a circumference of 115 km on second fiber ring 622, which is configured for backhaul communications between the RT HP zone (e.g., from the network access point of the mobile access network) and other network elements of the mobile access network, and (3) an NRT LP zone, with a circumference of 155 km on third fiber ring 623, is set up for backhaul communications between the RT zone and/or the NRT MP zone and the regional zone of the communication network. The set of NRT and RT services 640 includes NRT and RT services supported by the NRT and RT zones of the set of NRT and RT zones 430, respectively (illustratively, NRT LP services, NRT MP services, and various RT services which may be supported).

It will be appreciated that communication system 600 is merely exemplary and that various other communication systems may be configured in various other ways based on network zones and associated services.

Figure 7:
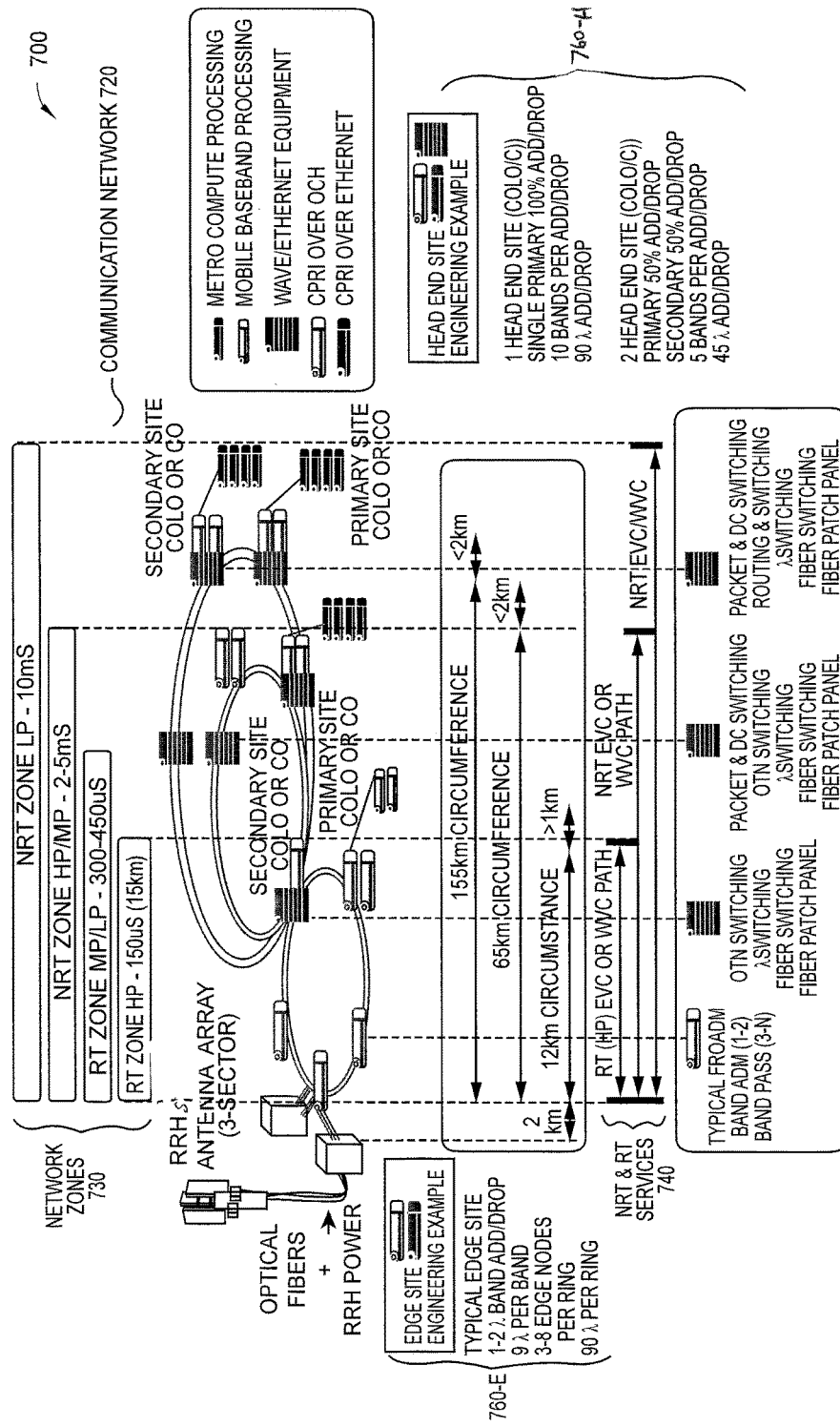
FIG. 7 depicts an exemplary communication system including NRT and RT zones engineered based on fiber network nodal engineering.

FIG. 7 depicts an exemplary communication system including NRT and RT zones engineered based on fiber network nodal engineering.

The communication system 700 includes a communication network 720, a set of network zones 730, and a set of NRT and RT services 740, a set of fiber network nodal engineering examples 750, and a set of site engineering examples including an edge site engineering example 760-E and a head-end site engineering example 760-H.

The communication network 720 is substantially similar to the communication network 620 of FIG. 6. As discussed further below, the communication network 720 include various nodes which may be engineered to support the network zones 730 and the NRT and RT services 740.

The network zones 730 are configured to support the NRT and RT services 740 where the configuration of the network zones, as discussed further below, is based on the fiber network nodal engineering examples (e.g., the set of fiber network nodal engineering examples 750). The network zones 730 and NRT and RT services 740 are substantially similar to the network zones 630 and the NRT and RT services 640 of FIG. 6, respectively.

The set of fiber network nodal engineering examples 750 includes nodal engineering examples for various types of nodes which may be deployed within the communication network 720 to support the network zones 730 and the NRT and RT services 740. For example, various rings of the communication network 720 may include FROADMs which may be configured to support band ADM, band pass, or the like, as well as various combinations thereof. For example, various rings of the communication network 720 (e.g., at interconnection points between fiber rings providing NRT and RT zones) may include devices which may be configured to support OTN switching, wavelength switching, fiber switching, fiber patch panel capabilities, or the like, as well as various combinations thereof. For example, various rings of the communication network 720 (e.g., within fiber rings providing NRT zones) may include devices which may be configured to support packet and datacenter switching, OTN switching, wavelength switching, fiber switching, fiber patch panel capabilities, or the like, as well as various combinations thereof. For example, various rings of the communication network 720 (e.g., within fiber rings providing NRT zones) may include devices which may be configured to support packet and datacenter switching, routing and switching capabilities, wavelength switching, fiber switching, fiber patch panel capabilities, or the like, as well as various combinations thereof.

The set of site engineering examples includes an edge site engineering example 760-E and a head-end site engineering example 760-H. The edge site engineering example 760-E describes an edge site having a 1-2 wavelength band ADM, nine wavelengths per band, 3-8 edge nodes per ring, and 90 wavelengths per ring. The head-end site engineering example 760-H describes (1) a first head-end site having a single primary 100% add/drop, 10 bands per add/drop, and 90 wavelengths per add/drop and (2) a second head-end site having a primary 50% add/drop, a secondary 50% add/drop, 5 bands per add/drop, and 45 wavelengths per add/drop.

It will be appreciated that communication system 700 is merely exemplary and that various other communication systems may be configured in various other ways based on network zones and associated services.

Figure 8:
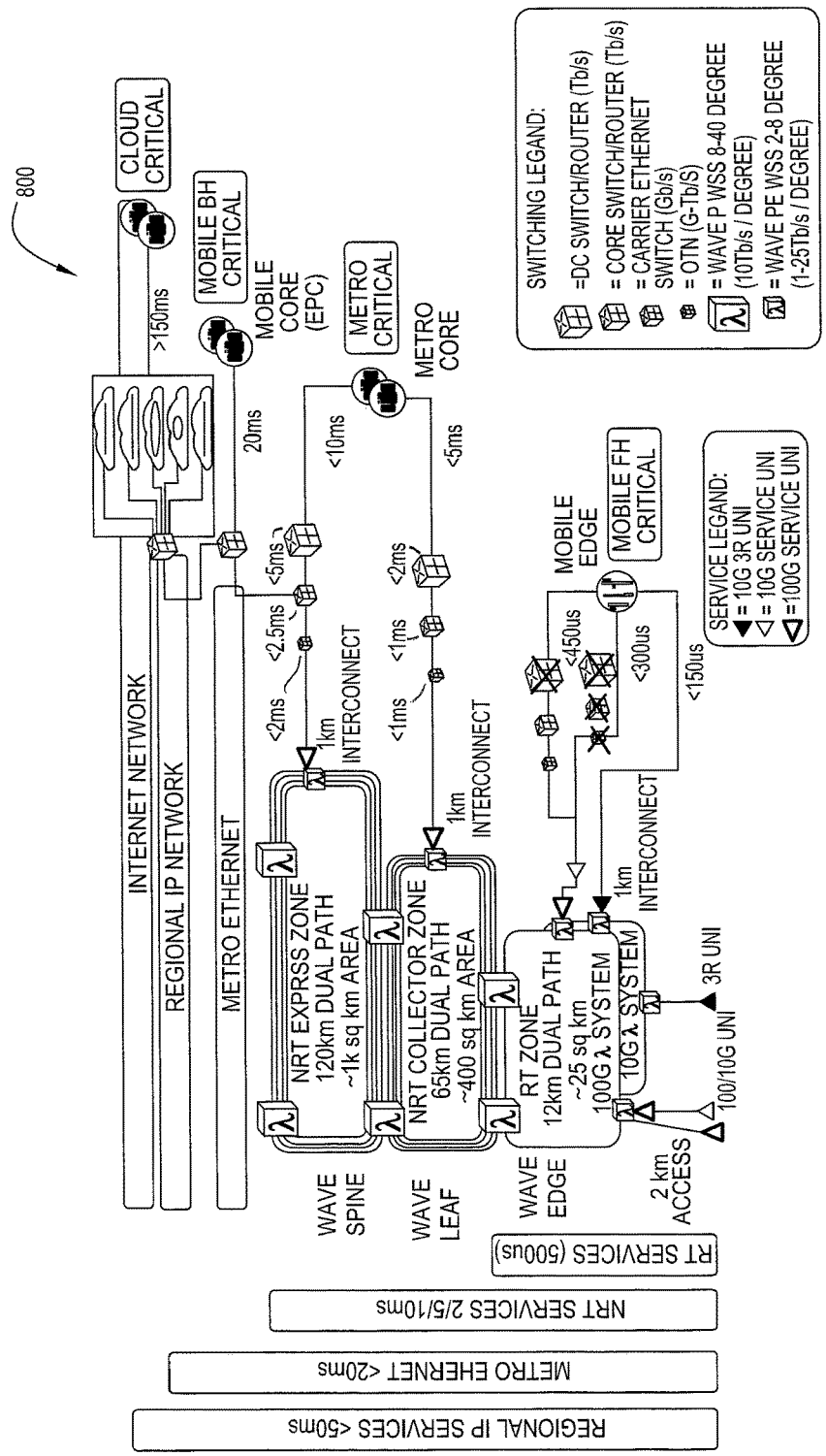
FIG. 8 depicts an exemplary communication system including NRT and RT zones engineered based on fiber network distance engineering, fiber network nodal engineering, and a hierarchical wave fabric configured to support wavelength switching.

FIG. 8 depicts an exemplary communication system including NRT and RT zones engineered based on fiber network distance engineering, fiber network nodal engineering, and a hierarchical wave fabric configured to support wavelength switching.

As depicted in FIG. 8, the communication system 800 includes an RT zone 801 configured to support a mobile edge (e.g., mobile fronthaul), an NRT collector zone 802 configured to support a metro core, and an NRT express zone 803 configured to support a mobile core (e.g., an Evolved Packet Core (EPC)). The fiber network distance engineering of FIG. 6 and the fiber network nodal engineering of FIG. 7 are illustrated for various zones.

As further depicted in FIG. 8, the communication system 800 is configured to support a hierarchical wave fabric configured to support wavelength switching. The hierarchical wave fabric may be provided by a set of user-network interface (UNI) service interfaces and a set of wavelength selective switches (WSSs). The WSSs may include a set of provider edge (PE) WSSs (which also may be referred to herein as wave PE switches) and a set of provider (P) WSSs (which also may be referred to herein as wave P switches). In general, wave PE switches are multi-service network elements including wavelength switching and as well as add-drop capabilities (e.g., a DWDM WSS and a DWDM add/drop mux terminal(s)), whereas wave P switches are network elements including wavelength switching without add-drop capabilities (e.g., a DWDM WSS).

The UNI service interfaces may include various types of UNI service interfaces via which access devices (e.g., within a mobile fronthaul context, devices such as RRHs, 3R transponders, or the like) may access various zones. For example, UNI service interfaces may include various types of UNI service interfaces via which access devices may access RT zone 801, NRT collector zone 802, and NRT express zone 803. For example, the UNI service interfaces may include a 10G 3R UNI for 3R transponders, 10G service UNIs, 100G service UNIs, or the like. It will be appreciated that various other types of UNI service interfaces may be supported.

The WSSs, as noted above, may include PE WSSs and P WSSs. The WSSs are configured to support wavelength switching. The PE WSSs are configured to provide points of access for the UNI service interfaces to access the various zones (illustratively, RT zone 801, NRT collector zone 802, and NRT express zone 803). The P WSSs are configured to provide wavelength backhaul within network zones and are configured to support switching between network zones in order to support interconnections of the network zones.

The hierarchical wave fabric, as noted above, is configured to support wavelength switching. The hierarchical wave fabric is configured to provide a non-blocking wavelength switching network configured to support bounded network and service latency (with the network and service latencies being provided in further detail with respect to FIG. 9 for RT zones such as RT zone 801 and with respect to FIG. 10 for NRT zones such as NRT collector zone 802 and NRT express zone 803). It is noted that, given the use of the hierarchical wave fabric to provide the NRT and RT zones, the RT zone 810 also may be referred to as a wave edge network, the NRT collector zone 802 also may be referred to as a wave leaf network, and NRT express zone 803 also may be referred to as a wave spine network.

As further depicted in FIG. 8, the communication system 800 is configured to support switching on top of the wavelength switching provided by the hierarchical wave fabric. The switching may be provided using OTN switches, carrier Ethernet switches, core switches and routers, DC switches and routers, or the like, as well as various combinations thereof.

Figure 9:
FIG. 9 depicts various switching latencies and associated engineering guidelines for RT zones and associated services.

FIG. 9 depicts various switching latencies and associated engineering guidelines for RT zones and associated services. The table 900 includes switching latencies and associated engineering guidelines for various types of RT services which may be provided in various types of RT zones. For example, table 900 includes switching latencies and associated engineering guidelines for RT LP services (illustratively, a W-Line wavelength switching service, a W-Line circuit switching service, an E-Line packet switching service, and an E-Line DC switching service), RT MP services (illustratively, a W-Line wavelength switching service, a W-Line circuit switching service, and an E-Line packet switching service), and RT HP services (illustratively, a CPRI 3R service, a W-Line wavelength switching service, a W-Line circuit switching service, and an E-Line packet switching service).

FIG. 10 depicts various switching latencies and associated engineering guidelines for NRT zones and associated services. The table 1000 includes switching latencies and associated engineering guidelines for various types of NRT services which may be provided in various types of NRT zones. For example, table 1000 includes switching latencies and associated engineering guidelines for NRT express zone services (illustratively, a W-Line wavelength switching service, a W-Line circuit switching service, and an E-Line packet switching service) and NRT collector zone services (illustratively, a W-Line wavelength switching service, a W-Line circuit switching service, and an E-Line packet switching service).

Figure 11:
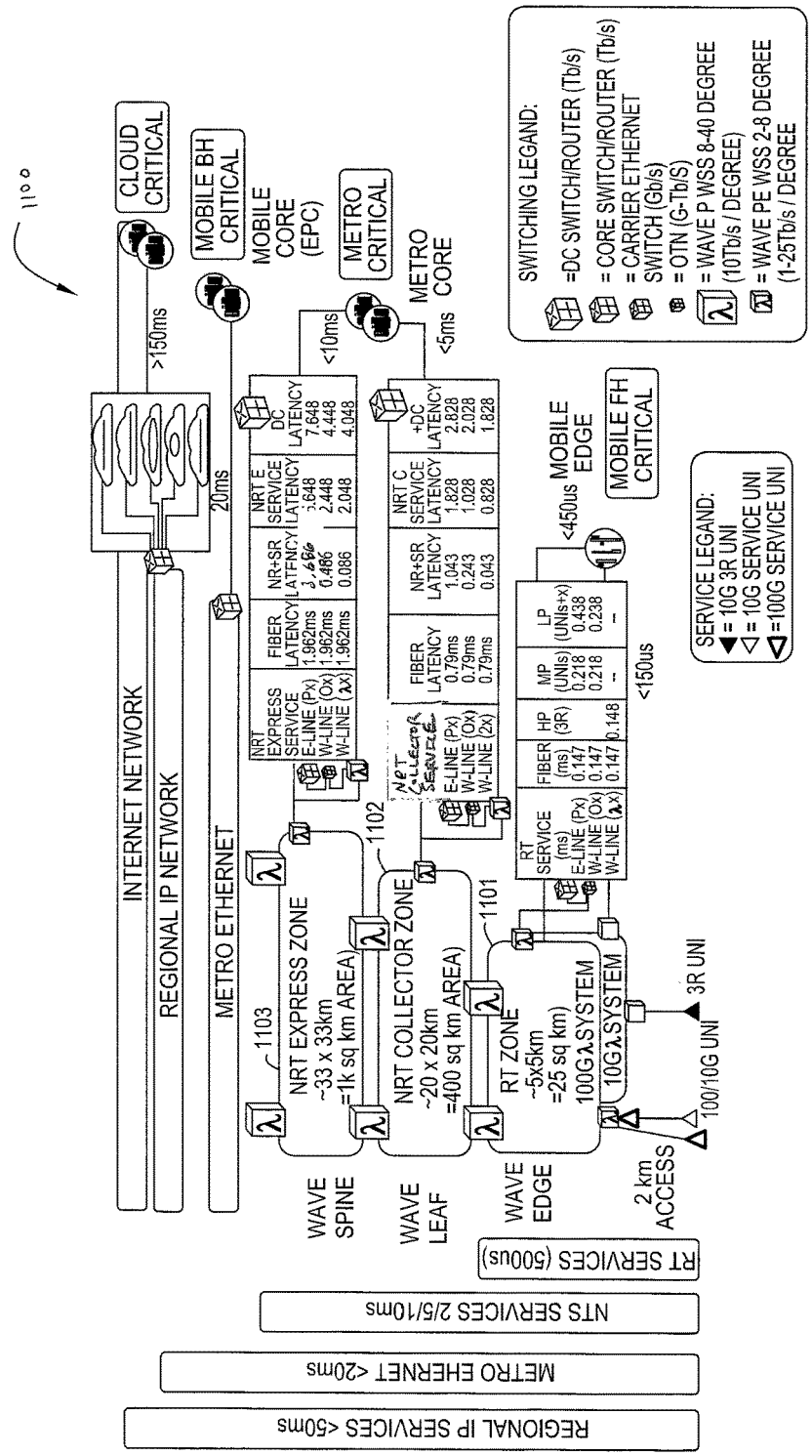
FIG. 11 depicts the exemplary communication system of FIG. 8 including the RT switching latencies for RT services from FIG. 9 and NRT switching latencies for NRT services from FIG. 10.

FIG. 11 depicts the exemplary communication system of FIG. 8 including the RT switching latencies for RT services from FIG. 9 and NRT switching latencies for NRT services from FIG. 10. The communication system 1100 of FIG. 11 is substantially similar to the communication system 800 of FIG. 8.

The communication system 1100 includes an RT zone 1101 configured to support a mobile edge (e.g., mobile fronthaul). The RT switching latencies for RT services, from FIG. 9, are illustrated for RT zone 1101.

The communication system 1100 includes an NRT collector zone 1102 configured to support a metro core. The NRT switching latencies for NRT collector services, from FIG. 10, are illustrated for NRT zone 1102.

The communication system 1100 includes an NRT express zone 1103 configured to support a mobile core (e.g., EPC). The NRT switching latencies for NRT express services, from FIG. 10, are illustrated for NRT zone 1103.

Figure 12:
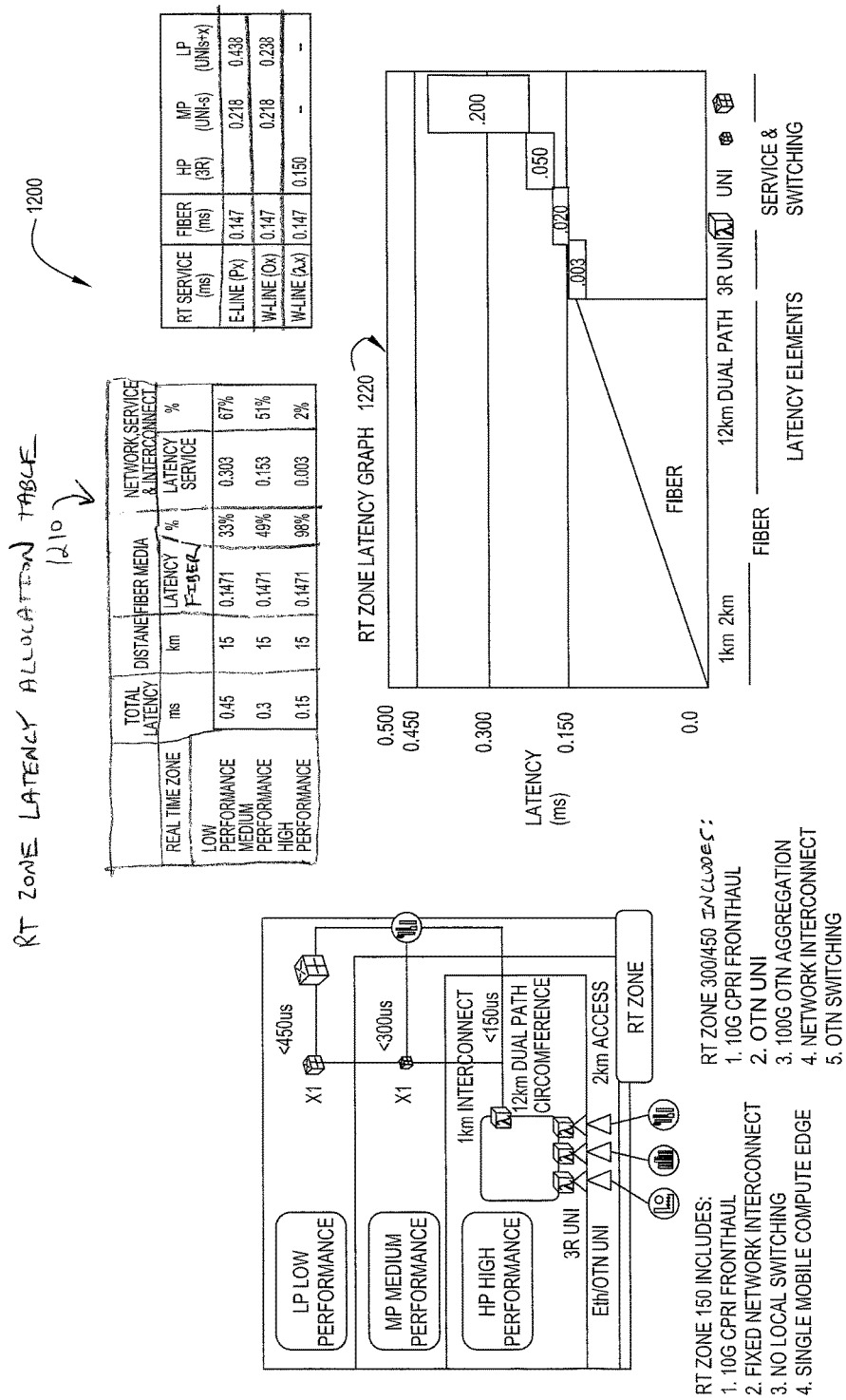
FIG. 12 depicts exemplary RT zone latency information for an exemplary RT zone such as the RT zone depicted in FIG. 11.

FIG. 12 depicts exemplary RT zone latency information for an exemplary RT zone such as the RT zone depicted in FIG. 11. The RT zone latency information 1200 includes an RT zone latency allocation table 1210 and an RT zone latency graph 1220, both of which include latency information for an exemplary RT zone such as the RT zone 1101 depicted in FIG. 11. As illustrated in FIG. 12, for an RT zone supporting a mobile network, an RT zone 150 (also referred to herein as an RT HP zone) may include a 10G CPRI fronthaul, fixed network interconnects, no logical switching, a single mobile compute edge, or the like, as well as various combinations thereof. As illustrated in FIG. 12, for an RT zone supporting a mobile network, an RT zone 300 (also referred to herein as an RT MP zone) or an RT zone 450 (also referred to herein as an RT LP zone) may include a 10G CPRI fronthaul, an OTN UNI, 100G OTN aggregation, network interconnects, OTN switching, 100G wave to NRT, primary and secondary mobile computing edge, or the like, as well as various combinations thereof.

Figure 13:
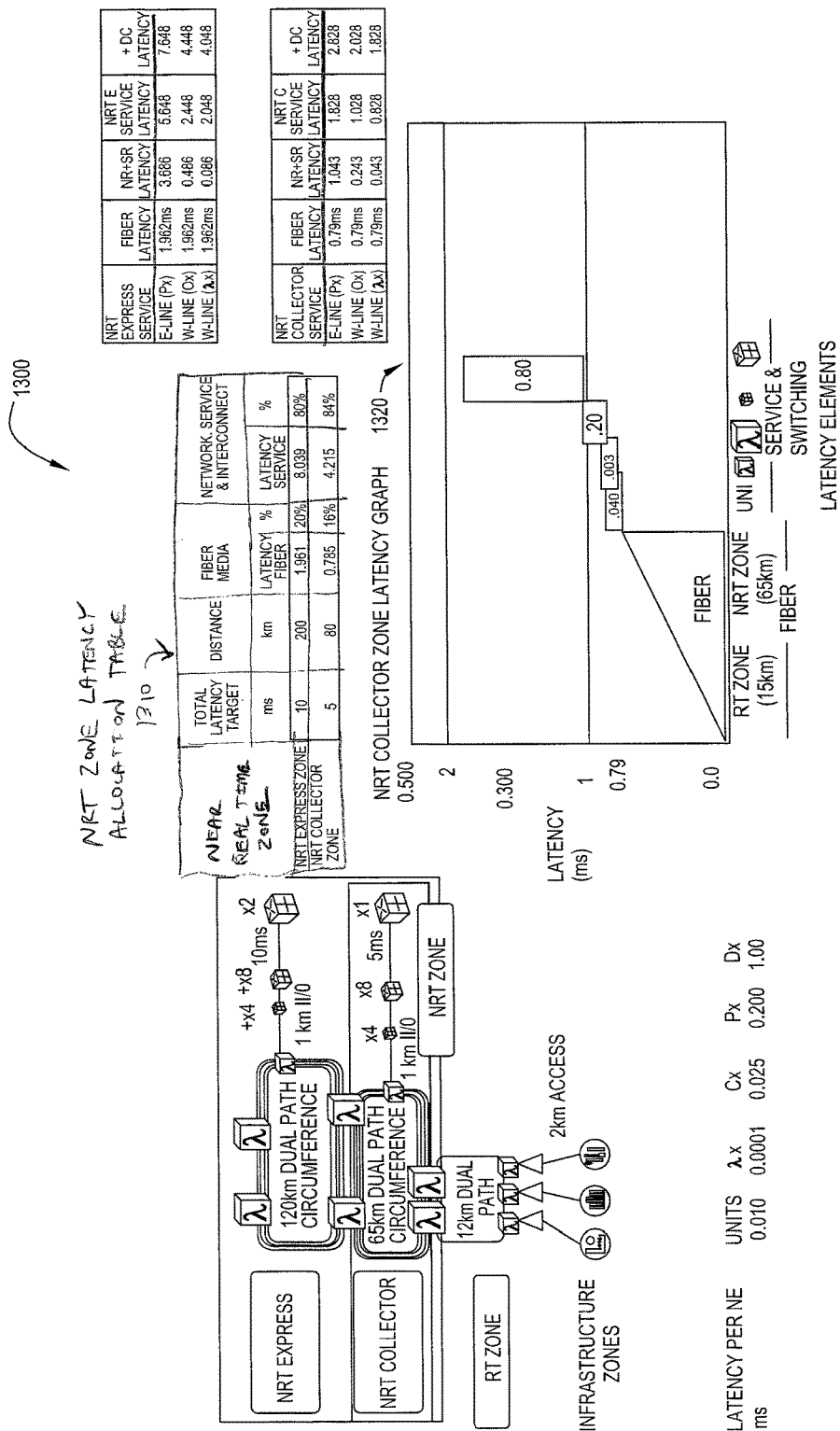
FIG. 13 depicts exemplary NRT zone latency information for an exemplary NRT collector zone such as the NRT collector zone depicted in FIG. 11.

FIG. 13 depicts exemplary NRT zone latency information for an exemplary NRT collector zone such as the NRT collector zone depicted in FIG. 11. The NRT zone latency information 1300 includes an NRT collector zone latency allocation table 1310 and an NRT collector zone latency graph 1320, both of which include latency information for an exemplary NRT collector zone such as the NRT collector zone 1102 depicted in FIG. 11.

Figure 14:
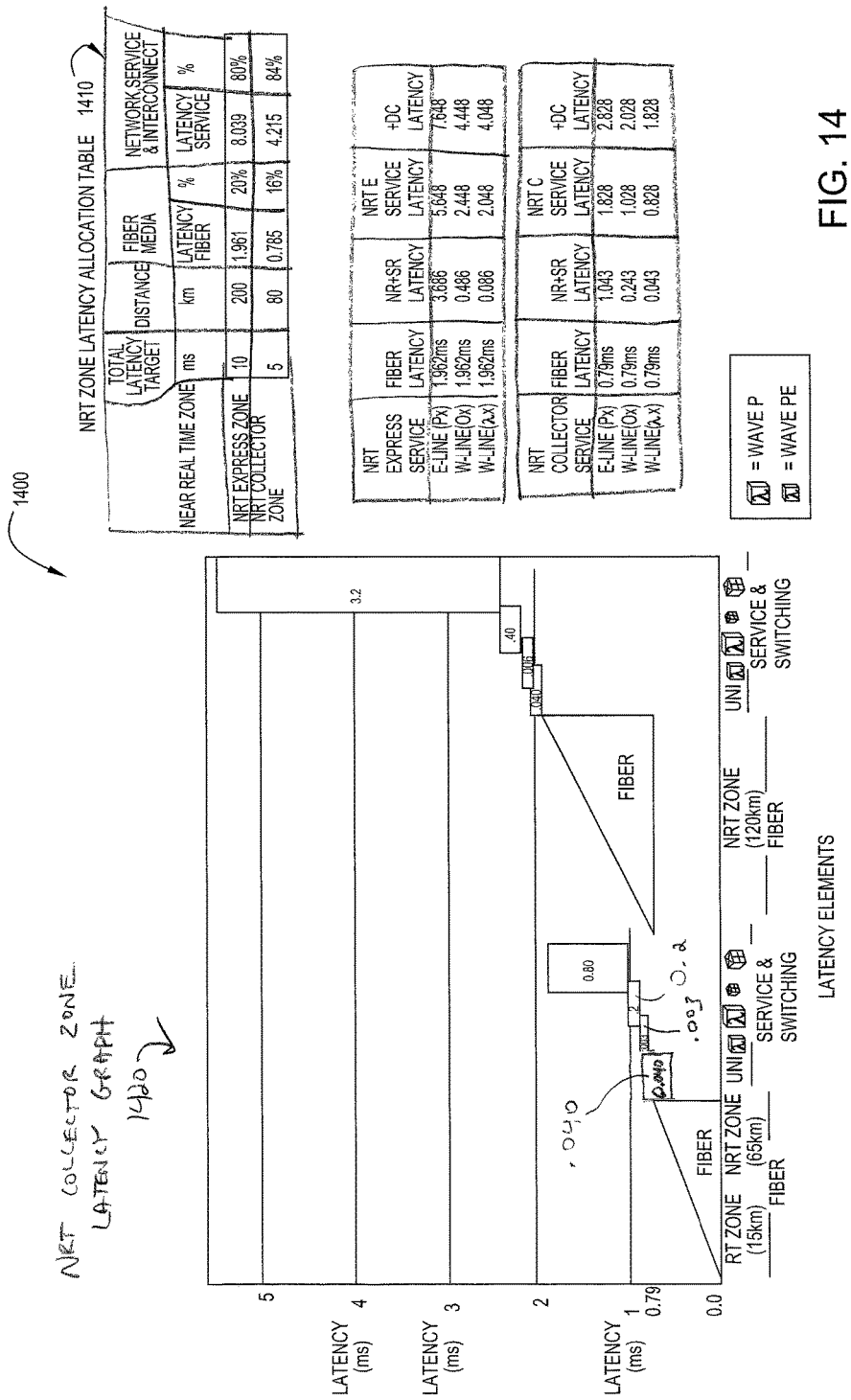
FIG. 14 depicts exemplary NRT zone latency information for an exemplary NRT collector zone such as the NRT collector zone depicted in FIG. 11.

FIG. 14 depicts exemplary NRT zone latency information for an exemplary NRT collector zone such as the NRT collector zone depicted in FIG. 11. The NRT zone latency information 1400 includes an NRT collector zone latency allocation table 1410 and an NRT collector zone latency graph 1420, both of which include latency information for an exemplary NRT collector zone such as the NRT collector zone 1102 depicted in FIG. 11.

As discussed herein, in at least some embodiments, the configuration of NRT and RT zones in order to bound network latency may include use of wavelength switching capabilities configured to support wavelength switching where the wavelength switching capabilities may include a wave fabric (e.g., a hierarchy of interconnected wavelength selective switches configured to provide a non-blocking, bounded latency optical network), wavelength switching strategies (e.g., LLλPS, EBLMλS, or the like, as well as various combinations thereof), or the like, as well as various combinations thereof. These wavelength switching strategies may are depicted and described with respect to FIGS. 15-25, which are discussed further hereinbelow. These wavelength switching strategies may be used to provide NRT and RT zones supporting the various attributes depicted and described with respect to FIGS. 1-14, which are discussed further hereinabove.

Figure 15:
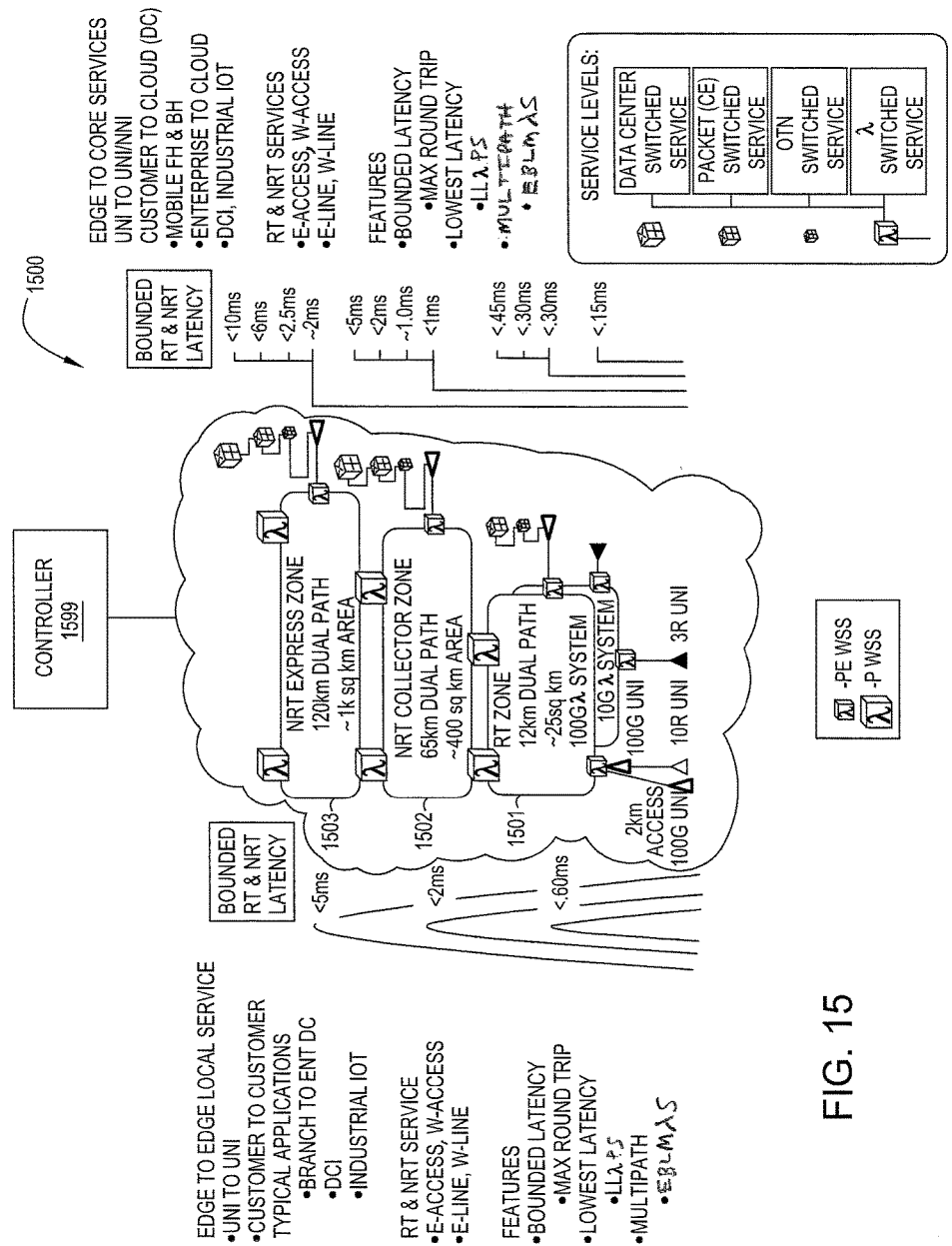
FIG. 15 depicts an exemplary communication system including NRT and RT zones configured to support bounded latency, lowest latency wavelength switching, and multi-path wavelength switching.

FIG. 15 depicts an exemplary communication system including NRT and RT zones configured to support bounded latency, lowest latency wavelength switching, and multi-path wavelength switching.

The communication system 1500 includes an RT zone 1501 that is configured to support a mobile edge (e.g., mobile fronthaul), an NRT collector zone that is 1502 configured to support a metro core, and an NRT express zone 1503 that is configured to support a mobile core (e.g., EPC).

The RT zone 1501, NRT collector zone 1502, and NRT express zone 1503 each include WSSs (illustratively, PE WSSs and P WSSs) that are configured to provide a wave fabric supporting bounded latency, configured to support lowest latency wavelength switching (e.g., using LLλPS), and configured to support multi-path wavelength switching (e.g., using EBLMλS).

As depicted in FIG. 15, the various features of the RT and NRT zones enable the RT and NRT zones to support various RT and NRT services (e.g., E-Access, W-Access, E-Line, W-Line, or the like).

As depicted in FIG. 15, the various RT and NRT services may support various types of services (e.g., edge-to-edge local services, edge-to-core services, or the like). For example, the edge-to-edge local services may include UNI to UNI services, customer to customer services, services associated with various applications (e.g., branch to enterprise DCs, DCI, industrial IoT, or the like). For example, the edge-to-core services may include UNI to UNI/NNI services, customer to cloud services, services associated with various applications (e.g., mobile fronthaul and backhaul, enterprise to cloud, DCI, industrial IoT, or the like). It will be appreciated that the various RT and NRT services may support various other types of services and applications.

The communication system 1500 further includes a controller 1599 which may configured to control various network elements. The controller 1599 may be configured to control network elements of RT zone 1501 (e.g., PE WSSs, P WSSs, or the like), elements of NRT collector zone 1502 (e.g., PE WSSs, P WSSs, or the like), elements of NRT express zone 1503 (e.g., PE WSSs, P WSSs, or the like), or the like, as well as various combinations thereof. The controller 1599 may represent one or more of one or more operations support systems (OSSs), one or more business support systems (BSSs), or the like, as well as various combinations thereof. The controller 1599 may be configured to communicate with network elements in order to configure the network elements to provide various functions (e.g., wavelength switching) and services, in order to collect information which may be used to provide higher level functions within communication system 1500, or the like, as well as various combinations thereof. It will be appreciated that controller 1599 may be configured to provide various other functions as discussed further herein.

Figure 16:
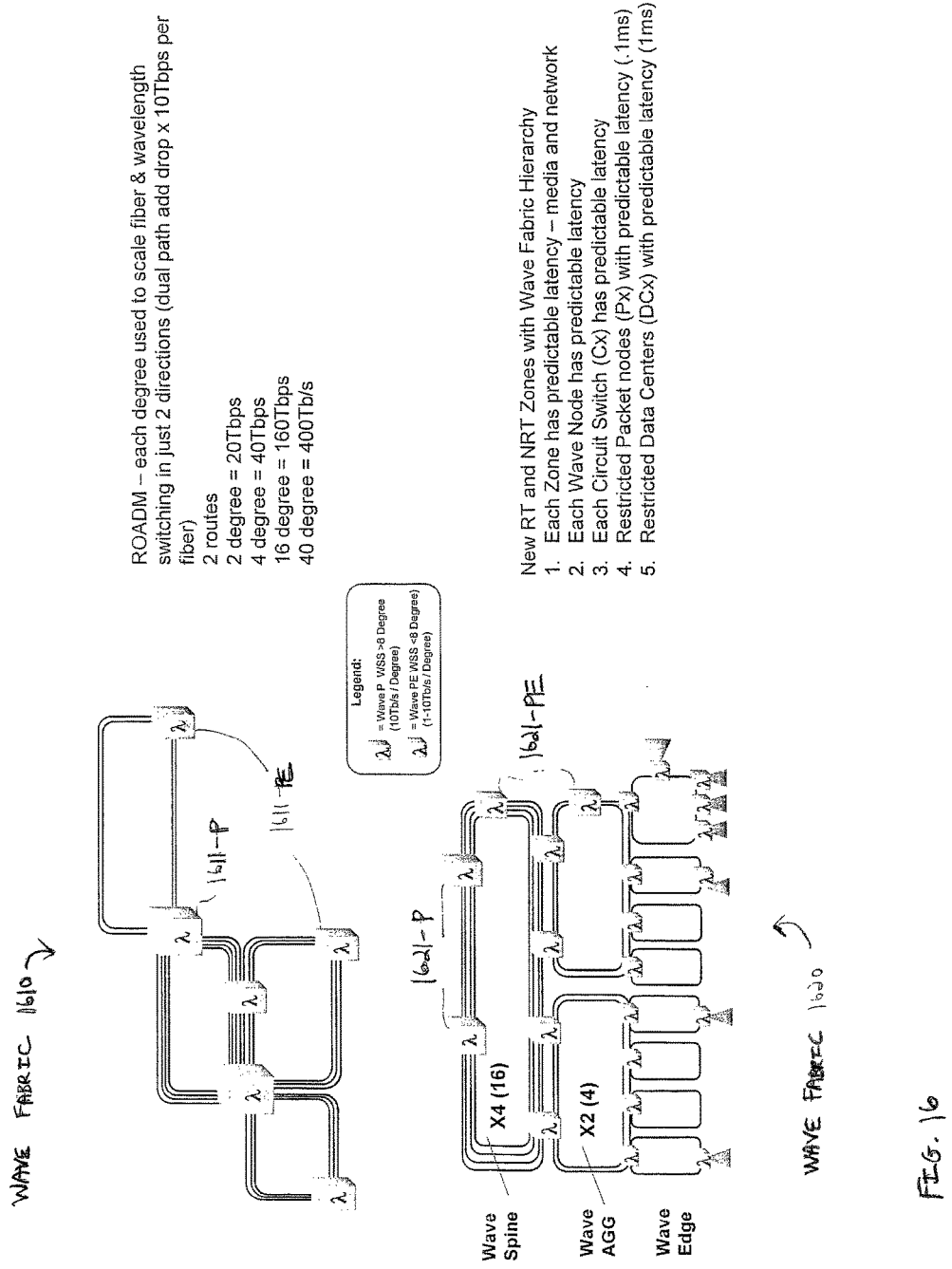
FIG. 16 depicts an exemplary wave fabric provided using wavelength selective switches.

FIG. 16 depicts an exemplary wave fabric provided using wavelength selective switches.

As depicted in FIG. 16, a wave fabric 1610 is composed of interconnected WSSs, which include PE WSSs 1611-PE and P WSSs 1611-P (collectively, WSSs 1611). The wave fabric 1610 represents a generic wave fabric having a hierarchical arrangement of zones (e.g., RT and NRT zones as discussed herein). The WSSs 1611 may be, or may include, ROADMs. The WSSs 1611, rather than being configured to use degrees to support fiber and wavelength switching in multiple directions, may be configured to use degrees to support fiber and wavelength switching in two directions in order to support scaling of fiber and wavelength switching to provide a non-blocking, bounded latency wave fabric. For example, ROADMs may be configured to use dual path add/drop×10 Tbps per fiber, such that 2 degrees can support 20 Tbps, 4 degrees can support 40 Tbps, 16 degrees can support 160 Tbps, and 40 degrees can support 400 Tbps.

As depicted in FIG. 16, a wave fabric 1620 is composed of interconnected WSSs, which include PE WSSs 1621-PE and P WSSs 1621-P (collectively, WSSs 1621). The wave fabric 1620 represents a specific wave fabric having a hierarchical arrangement of RT zones and NRT zones where the RT zones provide a wave edge layer, a first level of NRT zones provides a wave aggregation layer, and a second level of NRT zones provides a wave spine layer. The configuration of the WSSs 1621 to provide the RT and NRT zones provides bounded latency within the RT and NRT zones (e.g., each WSS has a predictable latency, each circuit switch (Cx) has a predictable latency, each restricted packet node (Px) has a predictable latency, and each restricted data center has a predictable latency), and, thus, ensures that each zone has a bounded and predictable latency.

Figure 17:
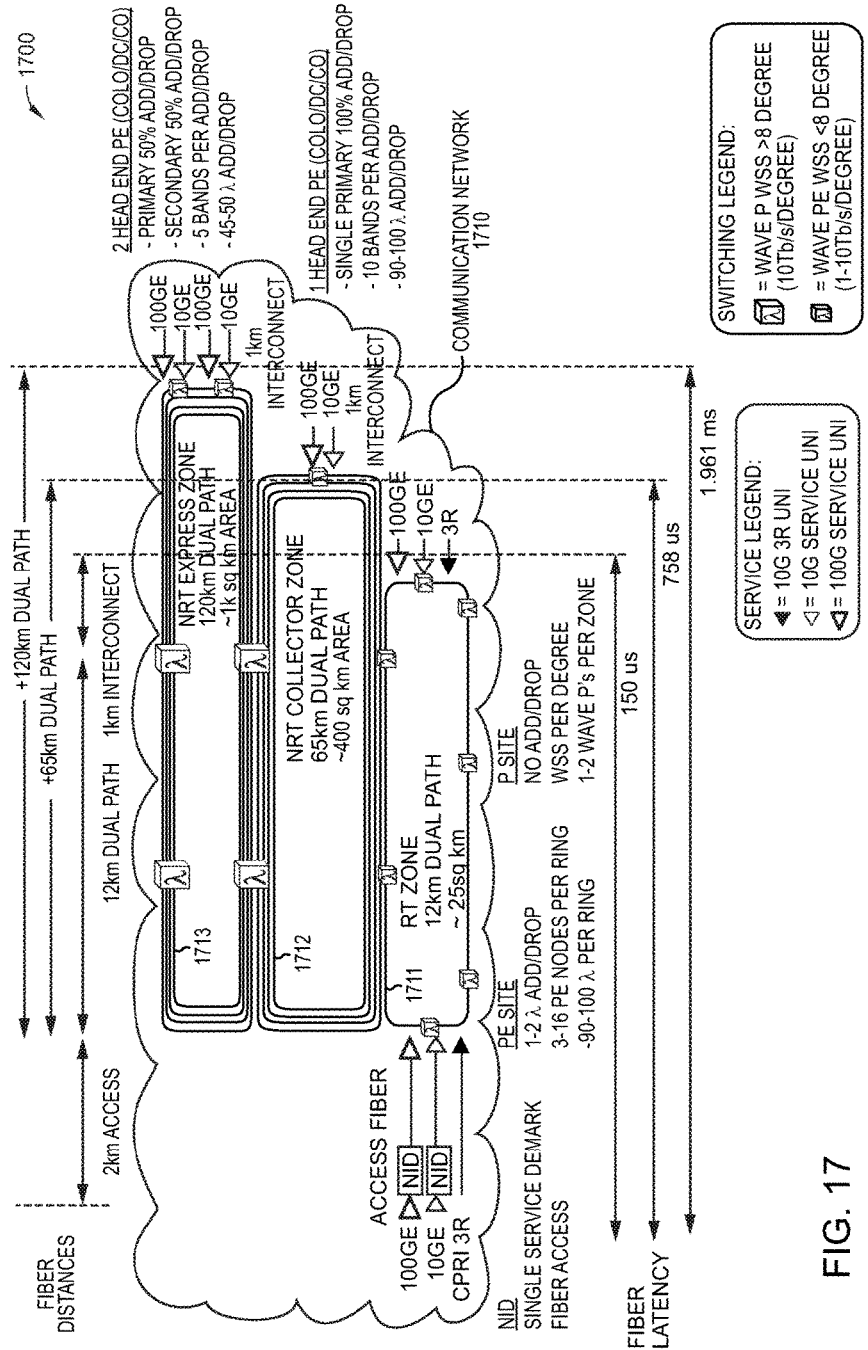
FIG. 17 depicts an exemplary communication system for illustrating an exemplary wave fabric configured to support 10G and 100G services.

FIG. 17 depicts an exemplary communication system for illustrating an exemplary wave fabric configured to support 10G and 100G services.

As depicted in FIG. 17, the exemplary communication system 1700 includes a communication network 1710 implemented using a wave fabric.

The communication network 1710 includes an RT zone 1711, an NRT collector zone 1712, and an NRT express zone 1713.

The RT zone 1711, the NRT collector zone 1712, and the NRT express zone 1713 each include a number of PE WSS sites having PE WSSs and a number of P WSS sites having P WSSs.

The PE WSSs may be configured to provide access to various types of network interface devices (NIDs), Provider Edge Network Elements), such as 10GE NIDs, 100GE NIDs, or the like. The NIDs may be remote access network elements (e.g., single service demarcation NEs).

The PE WSS sites may be configured such that there are 1-2 wavelengths per add/drop, 3-16 PE WSSs per ring, and 90-100 wavelengths per ring.

The P WSS sites may be configured such that 1-2 P WSSs are provided per network zone, a P WSS is provided per degree, and no add/drops are provided on the P-WSS (Provider Network Elements).

The NRT collector zone 1712 includes a single head-end PE WSS having a single primary 100% add/drop configured to support all wavelengths☐ per add/drop.

The NRT express zone 1713 includes a dual head-end PE WSS having a primary 50% wavelength add/drop and a secondary 50% wavelength add/drop.

Figure 18:
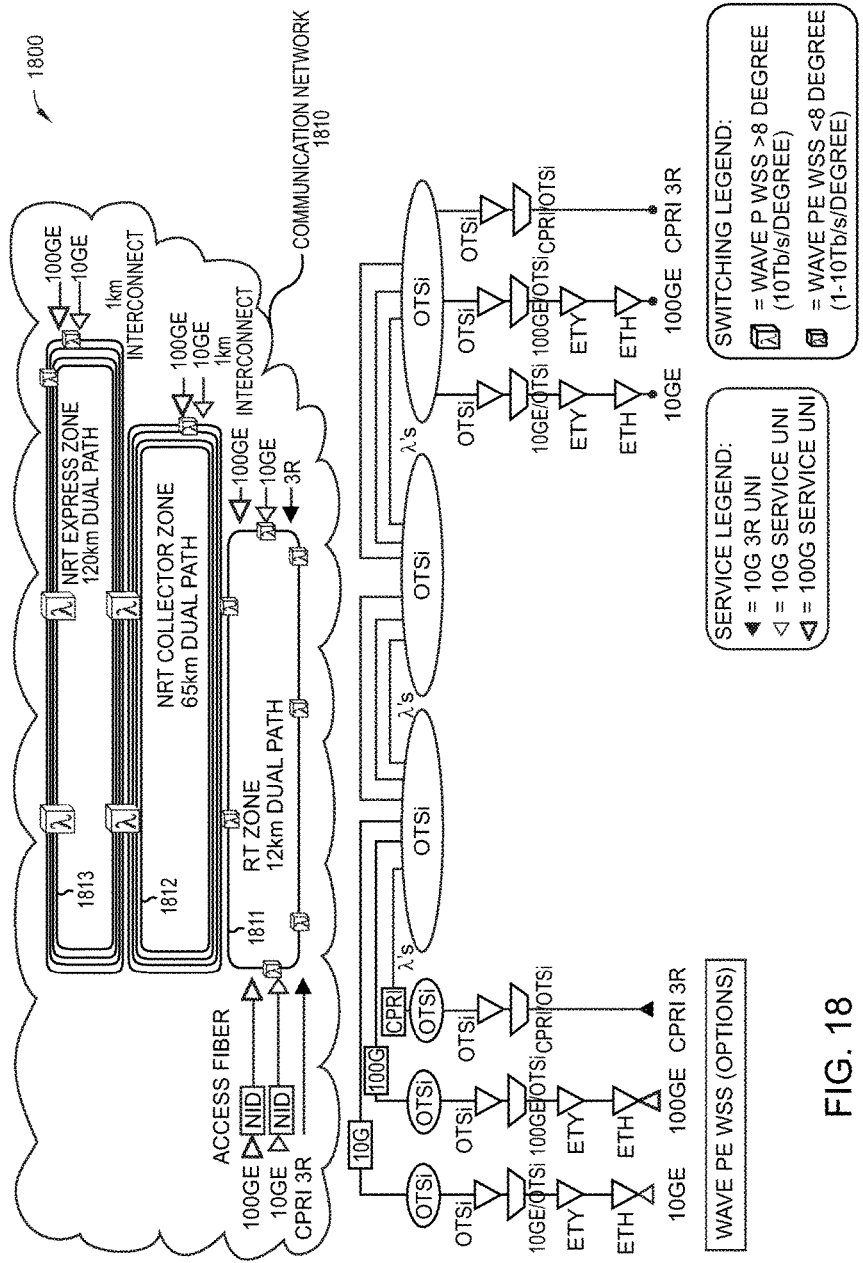
FIG. 18 depicts an exemplary communication system for illustrating an exemplary wave fabric configured to support a native protocol.

FIG. 18 depicts an exemplary communication system for illustrating an exemplary wave fabric configured to support a native protocol.

As depicted in FIG. 18, the exemplary communication system 1800 includes a communication network 1810 implemented using a wave fabric.

The communication network 1810 includes an RT zone 1811, an NRT collector zone 1812, and an NRT express zone 1813.

The RT zone 1811, the NRT collector zone 1812, and the NRT express zone 1813 each include a number of PE WSS sites having PE WSSs (also referred to as Wave PE WSSs) and a number of P WSS sites having P WSSs (also referred to as Wave P WSSs).

The bottom of FIG. 18 shows the NID and/or Wave PE WSS functional mapping supporting both 10G and 100G OCh-P (Optical Channel Payload).

The bottom of FIG. 18 shows the NID and/or Wave PE WSS functional mapping supporting per 10GbE Ethernet physical layer (802.1) to the Ethernet media access control (MAC) layer (802.3) to the 10G OTSi (Optical Optical Tributary Signal interface) to the OCh-P (Optical Channel Payload) for switching via the Wave PE WSS.

The bottom of FIG. 18 shows the NID and/or Wave PE WSS functional mapping per 100GbE Ethernet physical layer (802.1) to the Ethernet media access control layer (802.3) to the 100G OTSi (Optical Optical Tributary Signal interface) to the OCh-P (Optical Channel Payload) for switching via the Wave PE WSS.

The bottom of FIG. 18 shows the NID and/or Wave PE WSS functional mapping per CPRI (Common Public Radio Interface) physical layer to the CPRI OTSi (Optical Optical Tributary Signal interface) to the OCh-P (Optical Channel Payload for switching via the Wave PE WSS).

The bottom right of FIG. 18 shows the Wave PE WSS functional mapping for an Provider Edge NE supporting nx OCh-P (Optical Channel Payloads) and a multi-blade PE chassis supporting channel add/drop for all client types of client interface 10G, 100G and CPRI interfaces.

Figure 19:
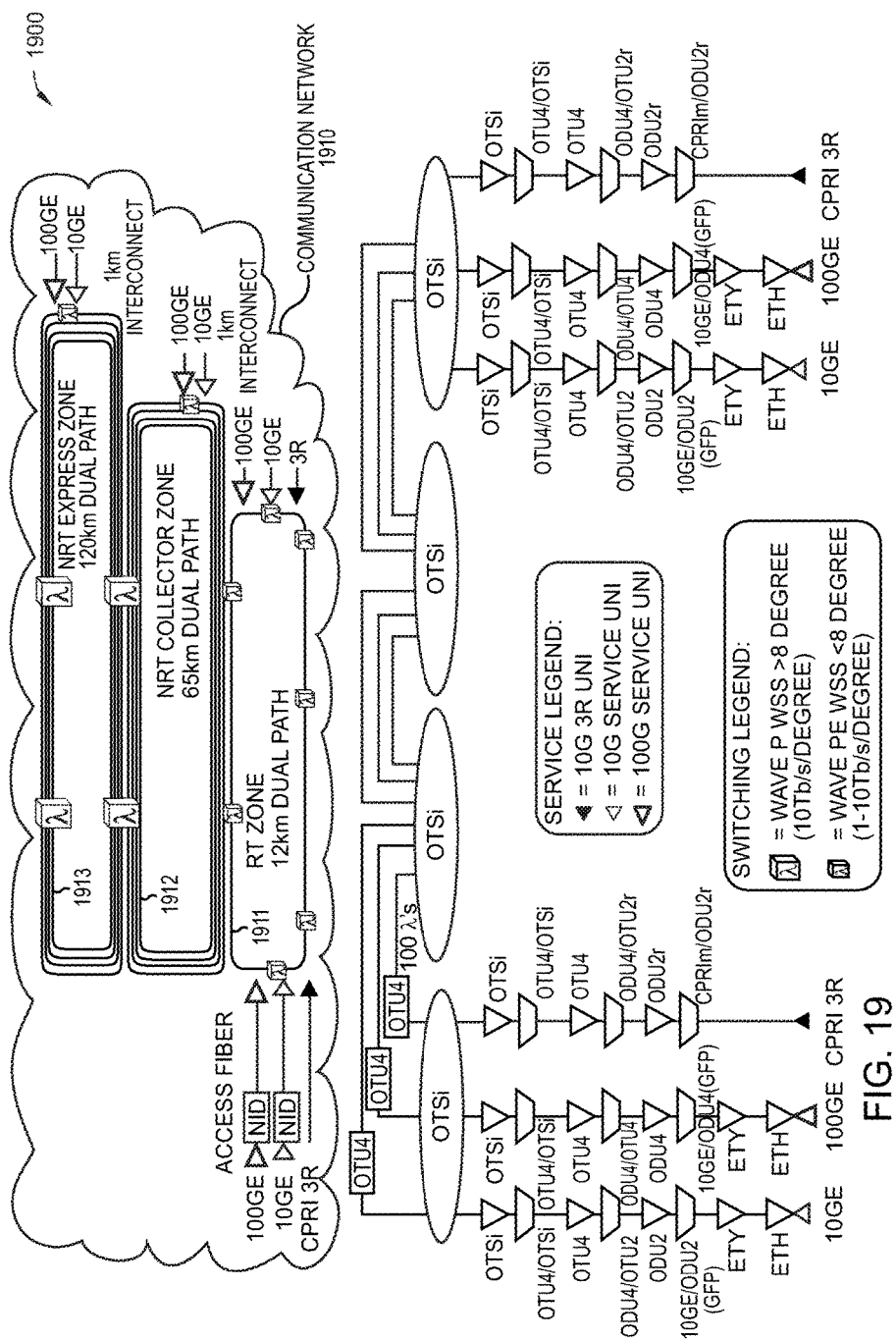
FIG. 19 depicts an exemplary communication system for illustrating an exemplary wave fabric configured to support CPRI/Ethernet mapped into OTN.

FIG. 19 depicts an exemplary communication system for illustrating an exemplary wave fabric configured to support CPRI/Ethernet mapped into OTN.

As depicted in FIG. 19, the exemplary communication system 1900 includes a communication network 1910 implemented using a wave fabric.

The communication network 1910 includes an RT zone 1911, an NRT collector zone 1912, and an NRT express zone 1903.

The RT zone 1911, the NRT collector zone 1912, and the NRT express zone 1193 each include a number of PE WSS sites having PE WSSs (also referred to as Wave PE WSSs) and a number of P WSS sites having P WSSs (also referred to as Wave P WSSs).

The bottom of FIG. 19 shows the optimized 100G Wave PE WSS functional mapping for 100G wavelengths. This configuration may support full 90-100 wavelengths per fiber all at 100 Gbps.

The bottom of FIG. 19 shows the Wave PE WSS functional mapping for nx 10GbE Ethernet physical layer (802.1) to the Ethernet media access control layer (802.3) to OTN, via mapping to ODU2 (10G) and then multiplexing and mapping to ODU4 (100G) and then to 100G OTSi (Optical Optical Tributary Signal interface) to the OCh-P (Optical Channel Payload) for switching via the Wave PE WSS.

The bottom of FIG. 19 also shows the Wave PE WSS functional mapping for 100GbE Ethernet physical layer (802.1) to the Ethernet media access control layer (802.3) to OTN, via mapping to ODU4 (100G) and then to 100G OTSi (Optical Optical Tributary Signal interface) to the OCh-P (Optical Channel Payload) for switching via the Wave PE WSS.

The bottom of FIG. 19 also shows the Wave PE WSS functional mapping for nx CPRI (Common Public Radio Interface) physical layer to the to OTN, via mapping to ODU2 (10G) and then multiplexing and mapping to ODU4 (100G) and then to 100G OTSi (Optical Optical Tributary Signal interface) to the OCh-P (Optical Channel Payload) for switching via the Wave PE WSS.

Figure 20:
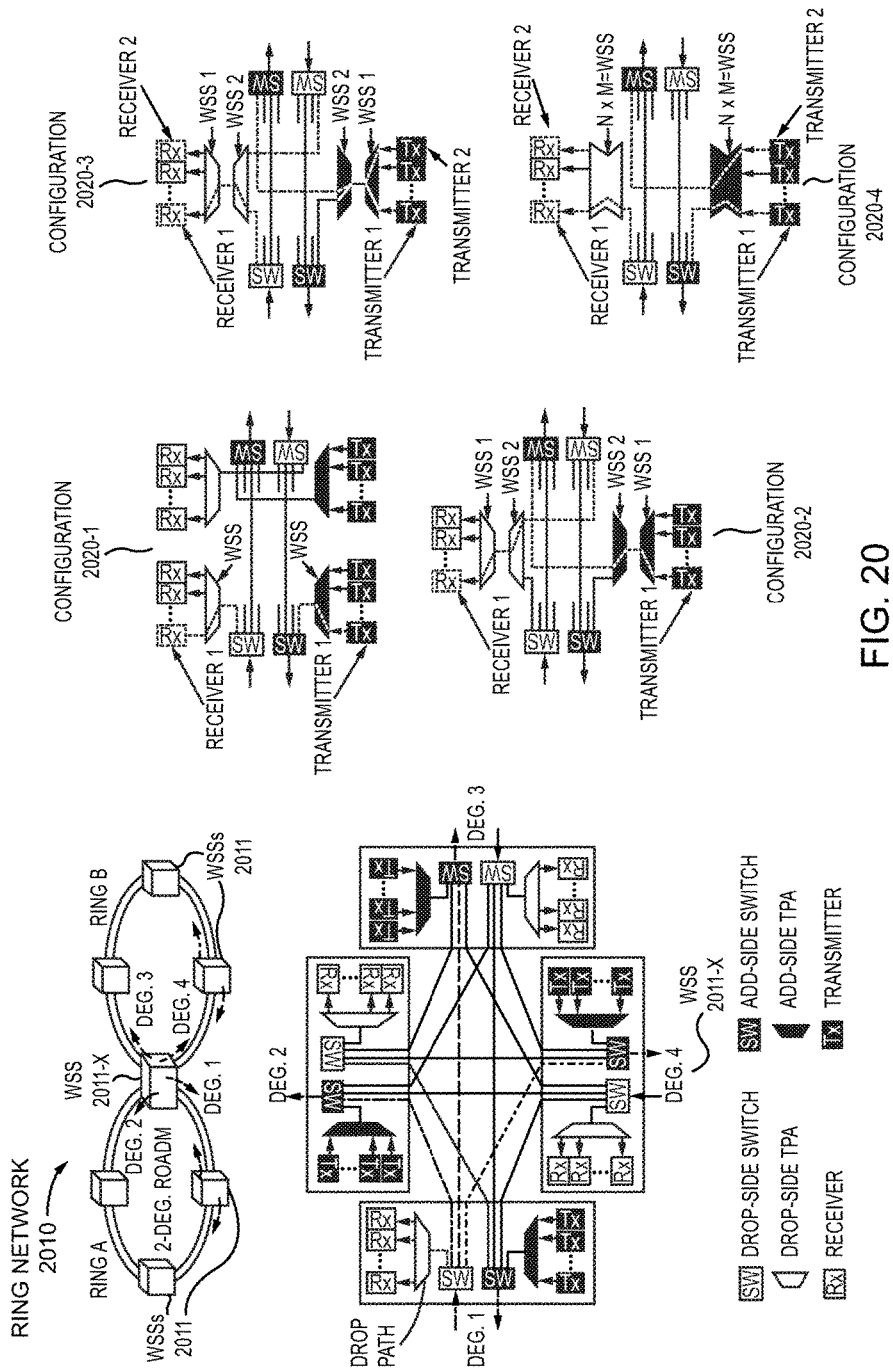
FIG. 20 depicts an exemplary configuration of a wavelength selective switch to use degrees to support fiber and wavelength scaling.
Figure 21:
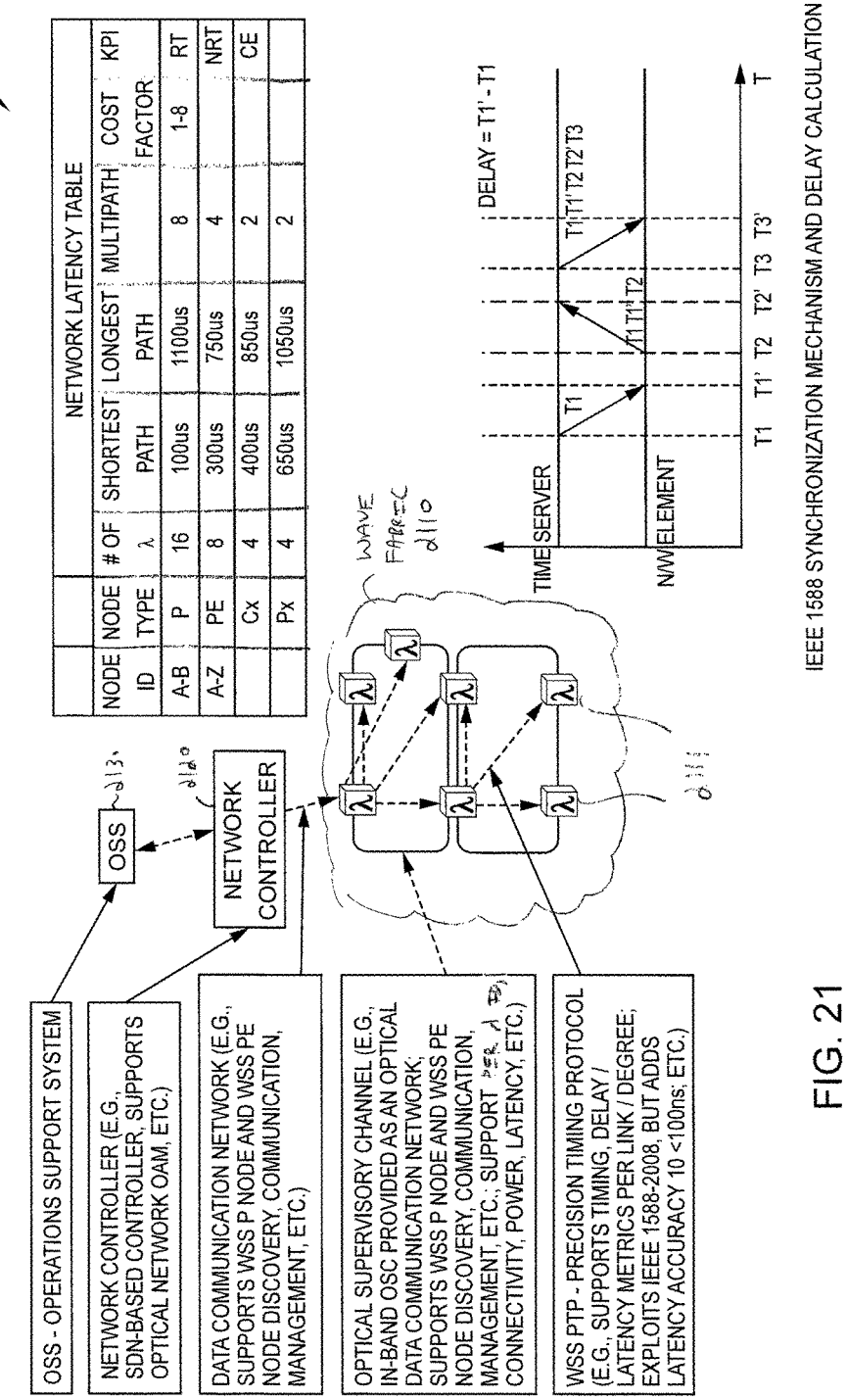
FIG. 21 depicts an exemplary communication system including a wave fabric of wavelength selective switches and associated controllers for network-based configuration of the wavelength selective switches to support network KPIs.

FIG. 20 depicts a configuration of a wavelength selective switch to use degrees to support fiber and wavelength scaling. As depicted in FIG. 20, a ring network 2010 includes a first ring (denoted as ring A) including three WSSs 2011 and a second ring (denoted as ring B) including three WSSs 2011 where the first and second ring networks are connected by a four-degree WSS (illustratively, WSS 2011-X) which is part of both the first ring and the second ring. As further depicted in FIG. 20, the WSS 2011-X includes various transponder aggregators (TPA)s. The WSS 2011-X may be configured such that the TPAs are directed TPAs (illustratively, configuration 2020-1) or directionless TPAs (illustratively, configuration 2020-2). The WSS 2011-X may be configured such that the TPAs are contention TPAs (illustratively, configuration 2020-3) or contentionless TPAs (illustratively, configuration 2020-4). FIG. 21 depicts an exemplary communication system including a wave fabric of wavelength selective switches and associated controllers for network-based configuration of the wavelength selective switches to support network KPIs.

As depicted in FIG. 21, the communication system 2100 includes a wave fabric 2110, a network controller (NC) 2120, and an Operations Support System (OSS) 2130.

The wave fabric 2110 includes a hierarchical arrangement of network zones (e.g., an RT zone and an NRT zone). The network zones are configured as fiber rings. The network zones each include WSSs 2111 and are interconnected by certain WSSs 2111 configured to operate in both of the network zones. The WSSs 2111 include PE WSSs 2111 (which may be configured as access points for the network zones and which may support communications within network zones) and P WSSs 2111 (which may support communications within and between network zones). The WSSs 2111 are configured to support wavelength switching, fiber switching, and the like.

The WSSs 2111, NC 2120, and OSS 2130 may be configured to support various network management functions.

The WSSs 2111 may be configured to support WSS discovery functions supported by NC 2120 and/or OSS 2130, thereby enabling NC 2120 and/or OSS 2130 to support discovery of WSSs 2111 in the wave fabric 2110

The WSSs 2111 may be configured under the control of NC 2120 and/or OSS 2130 based on status information supplied to the NC 2120 and/or OSS 2130 by the WSSs 2111.

The WSSs 2111 may be configured to determine status information and report the status information to the NC 2120 for use by the NC 2120 and/or OSS 2130 in determining configuration information for configuring the WSSs 211. The status information may include various types of status information (e.g., wavelength identification, connectivity information, power information, timing information, or the like, as well as various combinations thereof) which may be determined at various granularities (e.g., per link, per degree, or the like, as well as various combinations thereof). The timing information may include various types of timing measurements (e.g., delay measurements, latency measurements, or the like, as well as various combinations thereof) which may be determined at various granularities (e.g., per link, per degree, or the like, as well as various combinations thereof). The WSSs 2111 may be configured to determine the timing information using the IEEE 1588-2008 Precision Timing Protocol (PTP), a modified version of the IEEE 1588-2008 PTP configured to support determination and reporting of latency information, or the like. The WSSs 2111 may be configured to report the status information to the NC 2120, for use by the NC 2120 and/or OSS 2130 in determining configuration information for configuring the WSSs 2111, using any suitable reporting capabilities by which network elements may report information to a network controller.

The NC 2120 is configured to provide network control functions for wave fabric 2110. The NC 2120 is configured to control discovery of WSSs 2111, configuration of WSSs 2111, management of WSSs 2111, or the like, as well as various combinations thereof. The NC 2120 may be configured to provide network control functions for wave fabric 2110 under the control of OSS 2130. The NC 2120 may be configured to provide optical network OAM functions for wave fabric 2110. The NC 2120 may be implemented as an SDN controller or using any other suitable type of controller or associated control protocol(s).

The wave fabric 2110 and NC 2120 may be configured to support network control functions for wave fabric 2110 using optical supervisory channels (OSCs). The OSCS may be used between WSSs 2111 for determining various types of status information. The OSCs may be used by WSSs 2111 to report status information to NC 2120. The OSCs may be used by NC 2120 to communicate with WSSs 2111 for purposes of discovery of WSSs 2111, configuration of WSSs 2111 (e.g., sending to WSSs 2111 configuration information which may be used by the WSSs 2111 to configure themselves, receiving configuration feedback information indicate of the result of WSS configuration, or the like), management of WSSs 2111, or the like, as well as various combinations thereof.

The OSS 2130 may be configured to provide operations support system functions for NC 2120 and, thus, also for wave fabric 2110. The OSS 2130 may be configured to support discovery of WSSs 2111, configuration of WSSs 2111, management of WSSs 2111, or the like, as well as various combinations thereof. The OSS 2130 is configured to provide operations support system functions for NC 2120 and, thus, for wave fabric 2110, under the control of one or more other systems (which have been omitted for purposes of clarity).

The NC 2120 and/or OSS 2130 may be configured to determine wavelength path latency information (which also may be referred to as optical path latency information for optical paths of the wave fabric 2110). The NC 2120 and/or OSS 2130 may be configured to use the wavelength path latency information locally, at the NC 2120 and/or OSS 2130, to perform various functions. The NC 2120 and/or OSS 2130 may be configured to provide the wavelength path latency information to WSSs 2111 for use by the WSSs 2111 to perform various functions. The various functions which may be performed at the control level (e.g., by NC 2120 and/or OSS 2130) and/or at the network level (e.g., by WSSs 2111) may include one or more of service provisioning functions (e.g., based on bounded latency path information included in the wavelength path latency information), service testing functions (e.g., based on bounded latency path information included in the wavelength path latency information), wavelength switching functions (e.g., LLλPS based on lowest latency path information included in the wavelength path latency information, EBLMλS based on equal bounded latency multipath information included in the wavelength path latency information, or the like), or the like, as well as various combinations thereof.

The NC 2120 and/or OSS 2130 may be configured to determine wavelength path latency information based on various network OAM functions (at least some of which are discussed below in conjunction with FIG. 21, and at least some of which are depicted and described in additional detail with respect to FIG. 30 and FIG. 31).

The NC 2120 and/or OSS 2130 may be configured to determine wavelength path latency information by determining network latency information and using the network latency information to determine the wavelength path latency information.

The network latency information may include latency information for network links of wave fabric 2110, latency information for network paths of wave fabric 2110, or the like, as well as various combinations thereof. The network latency information may be determined based on various types of tests which may be performed by WSSs 2111 under the control of NC 2120 and/or OSS 2130 (e.g., trace tests, ping tests, or the like, as well as various combinations thereof). The network latency information may be maintained by the NC 2120 and/or OSS 2130 in one or more network latency information tables.

The wavelength path latency information may be determined from the network latency information by calculating bounded latency information based on the network latency information and determining the wavelength path latency information based on the bounded latency information.

The bounded latency information may include per-link bounded latency information for links, per-path bounded latency information for paths, per-connection bounded latency information for connections, or the like, as well as various combinations thereof. The bounded latency information may be maintained by the NC 2120 and/or OSS 2130 in one or more bounded latency information tables.

The wavelength path latency information may include various types of latency-related path information (e.g., metrics, options, or the like, as well as various combinations thereof), which may be on a per-WSS basis. For example, for a given WSS, the wavelength path latency information determined for the WSS may include one or more of bounded latency path information (e.g., for use by the WSS in service provisioning, testing, or the like), lowest latency path information (e.g., for use in LLλPS wavelength switching or for providing other functions), equal bounded latency multipath information (e.g., for use in EBLMλS wavelength switching or for providing other functions), or the like, as well as various combinations thereof.

The wavelength path latency information may be maintained using one or more path latency tables. As depicted in the Path Latency Table 2160 of FIG. 21, the wavelength path latency information for a node may include an indication of the node (the Node ID column), an indication of the node type (the Node Type column), an indication of a number of wavelengths supported (the # of λs column), an indication of a lowest path latency metric (the Shortest Path column), an indication of a bounded path latency metric (the Longest Path column), a multipath indicator (the Multipath column), and a KPI indicator (the KPI column). It will be appreciated that less or more wavelength path latency information may be provided, that the wavelength path latency information may be organized in other ways, that the wavelength path latency information may be maintained using other types of data structures, or the like, as well as various combinations thereof.

The WSSs 2111 may be configured to receive wavelength path latency information from NC 2120 and/or OSS 2130 and to perform various functions based on the wavelength path latency information received from NC 2120 and/or OSS 2130. The functions which may be performed by a given WSS 2111 based on the wavelength path latency information received by the given WSS 2111 from the NC 2120 and/or OSS 2130, as indicated above, may include one or more of service provisioning functions (e.g., based on bounded latency path information included in the wavelength path latency information), service testing functions (e.g., based on bounded latency path information included in the wavelength path latency information), wavelength switching functions (e.g., LLλPS based on lowest latency path information included in the wavelength path latency information, EBLMλS based on equal bounded latency multipath information included in the wavelength path latency information, or the like), or the like, as well as various combinations thereof.

For example, for service provisioning, a WSS 2111 may receive a service provisioning request from a controller (e.g., NC 2120 and/or OSS 2130) where the service provisioning request includes service latency information associated with the requested service (e.g., an indication as to whether the service is an RT service or an NRT service, a bounded service latency associated with the service, a lowest service latency for the service, or the like, as well as various combinations thereof) and may configure itself (e.g., configuring one or more interfaces of the WSS 2111 (e.g., one or more UNIs) or one or more other elements of the WSS 2111) to support the service based on the service latency information associated with the service request and wavelength path latency information provided to the WSS 2111.

For example, for service testing, a WSS 2111 may receive a service testing request from a controller (e.g., NC 2120 and/or OSS 2130) where the service testing request includes service latency information associated with the service to be tested (e.g., an indication as to whether the service is an RT service or an NRT service, a bounded service latency associated with the service, a lowest service latency for the service, or the like, as well as various combinations thereof), may initiate one or more tests for testing the service (e.g., for testing a latency of the service, an SLA of the service, or the like), and may provide test results from the testing of the service to the controller for use by the controller in evaluating the service (e.g., evaluating the provisioned service by comparing the measured service latency to the reference service latency information for the service, comparing the measured SLA information to the reference SLA information for the service, or the like). The service test may be a pre-activation service test, an in-service service test, or the like. The WSS 2111 may evaluate the service based on the test results and, rather than or in addition to providing the test results to the controller, provide the results of the evaluation of the service to the controller.

For example, for wavelength switching, a WSS 2111 may receive wavelength path latency information from a controller (e.g., NC 2120 and/or OSS 2130) and perform wavelength switching based on the wavelength path latency information. The wavelength switching, as indicated above, may include LLλPS, EBLMλS, or the like, as well as various combinations thereof. The wavelength switching may be provided within the context of service provisioning (e.g., assigning wavelengths to services based on one or more of LLλPS, EBLMλS, or the like, as well as various combinations thereof). The LLλPS wavelength switching functions which may be supported may be further understood by way of reference to FIGS. 24 and 25, the EBLMλS wavelength switching functions which may be supported may be further understood by way of reference to FIGS. 26 and 27, and so forth.

The WSSs 2111, NC 2120, and OSS 2130 may be configured to support various other functions.

Figure 22:
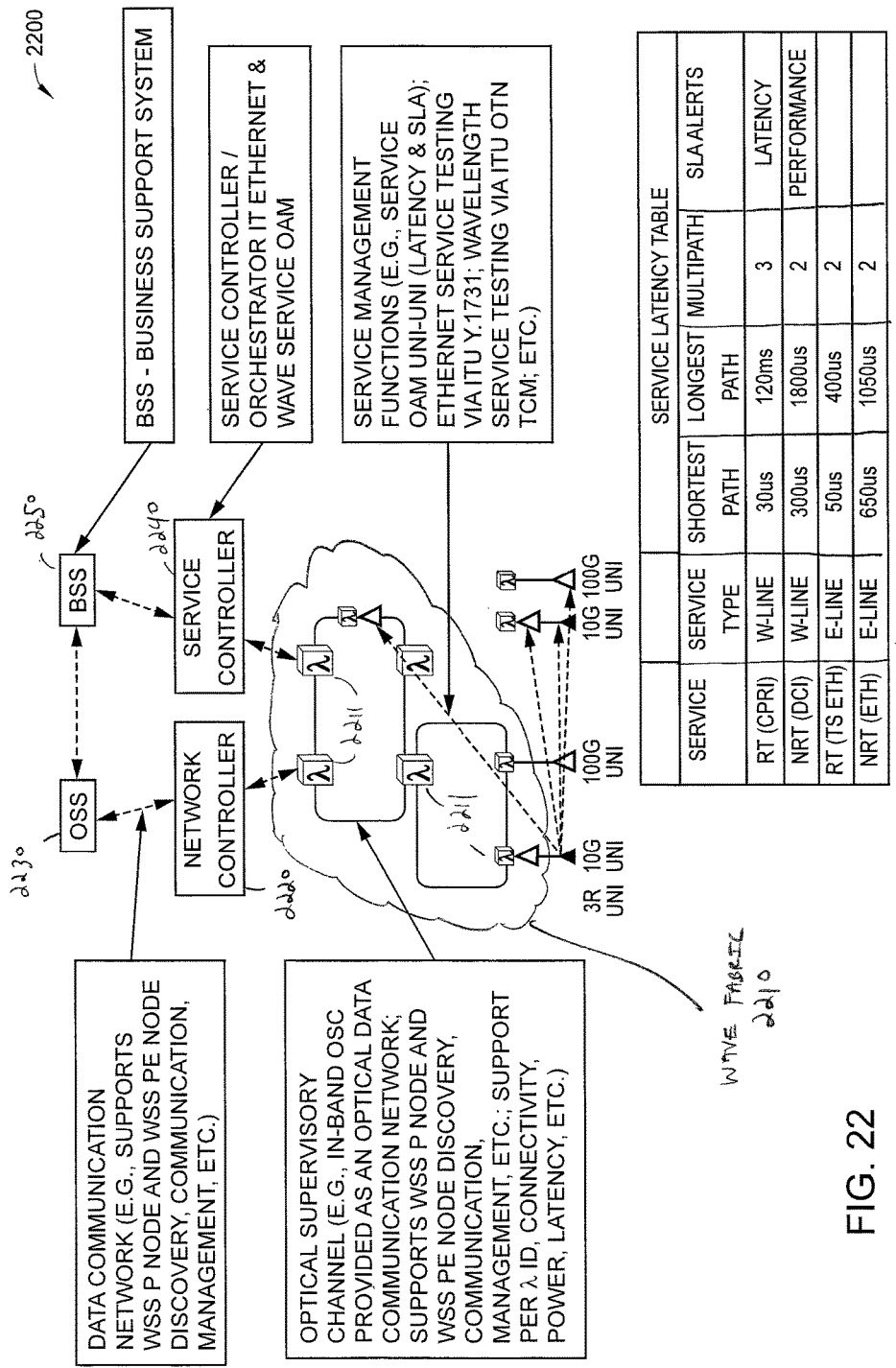
FIG. 22 depicts an exemplary communication system including a wave fabric of wavelength selective switches and associated controllers for service-based configuration of the wavelength selective switches to support service SLAs.

FIG. 22 depicts an exemplary communication system including a wave fabric of wavelength selective switches and associated controllers for service-based configuration of the wavelength selective switches to support service SLAs.

As depicted in FIG. 22, the communication system 2200 includes a wave fabric 2210, a network controller (NC) 2220, an Operations Support System (OSS) 2230, a service controller (SC) 2240, and a Business Support System (BSS) 2250.

The wave fabric 2210 is similar to wave fabric 2110 of FIG. 21. The wave fabric 2210. The wave fabric 2210 includes a hierarchical arrangement of network zones (e.g., an RT zone and an NRT zone). The network zones are configured as fiber rings. The network zones each include WSSs 2211 and are interconnected by certain WSSs 2211 configured to operate in both of the network zones. The WSSs 2211 include PE WSSs 2211 (which may be configured as access points for the network zones and which may support communications within network zones) and P WSSs 2211 (which may support communications within and between network zones). The exemplary UNIs associated with PE WSSs 2211 are depicted in FIG. 22. The WSSs 2211 are configured to support wavelength switching, fiber switching, and the like.

The WSSs 2211, NC 2220, and OSS 2230 may be configured to support various network management functions. The WSSs 2211, NC 2220, and OSS 2230 may be configured to support network management functions in a manner similar to that described for WSSs 2111, NC 2120, and OSS 2130 within the context of FIG. 21.

The WSSs 2211, SC 2240, and BSS 2250 may be configured to support various service management functions. The service management functions may include service provisioning functions, service testing functions, service maintenance functions, or the like, as well as various combinations thereof.

The WSSs 2211 are configured to support service management functions. The WSSs 2211 may be configured to receive service management instructions and information from SC 2240 and to perform associated service management functions based on the service management instructions and information from SC 2240. The WSSs 2211 may be configured to provide service management response information to SC 2240 (e.g., indications as to whether provisioning of services was successful or unsuccessful, service testing information collected by WSSs 2211 (e.g., based on service tests initiated by WSS 2211 locally and/or responsive to instructions from SC 2240), indications as to whether service maintenance actions performed by WSSs 2211 were successful or unsuccessful, or the like, as well as various combinations thereof). The WSSs 2211 may be configured to support various other service management functions.

The SC 2240 is configured to provide service management functions for wave fabric 2210. The SC 2240 may be configured to provide service management instructions and information to WSSs 2211 for causing the WSSs 2211 to perform service management functions (e.g., service provisioning instructions and information for controlling provisioning of services on WSSs 2211, service testing functions instructions and information for controlling service testing performed by WSSs 2211 for provisioned services, service maintenance instructions and information for controlling service maintenance performed by WSSs 2211 for provisioned services, or the like, as well as various combinations thereof). The SC 2240 may be configured to receive service management response information from WSSs 2211 related to service management functions performed by the WSSs 2211 (e.g., indications as to whether provisioning of services was successful or unsuccessful, service testing information collected by WSSs 2211 (e.g., based on service tests initiated by WSS 2211 locally and/or responsive to instructions from SC 2240), indications as to whether service maintenance actions performed by WSSs 2211 were successful or unsuccessful, or the like, as well as various combinations thereof). The SC 2240 may be configured to support various other service management functions.

The wave fabric 2210 and SC 2240 may be configured to support various types of service management capabilities. For example, the wave fabric 2210 and SC 2240 may be configured to support service provisioning for various types of interfaces (e.g., UNIs, NNIS, Maintenance Entity Group (MEG) endpoints (MEPs), MEG intermediate points (MIPs), or the like, as well as various combinations thereof). For example, the wave fabric 2210 and SC 2240 may be configured to support wave service testing (e.g., via ITU OTN TCM or other service testing capabilities). For example, the wave fabric 2210 and SC 2240 may be configured to support Ethernet service testing (e.g., via ITU Y.1731). For example, the wave fabric 2210 and SC 2240 may be configured to support service OAM functions related to various interfaces for testing various parameters (e.g., latency, service SLAs, or the like, as well as various combinations thereof).

The BSS 2250 may be configured to provide business support system functions for SC 2240 and, thus, also for wave fabric 2210. The BSS 2250 may be configured to support service provisioning functions, service testing functions, service maintenance functions, or the like, as well as various combinations thereof. The BSS 2250 is configured to provide business support system functions for SC 2240 and, thus, for wave fabric 2210, under the control of one or more other systems (which have been omitted for purposes of clarity).

The SC 2240 and/or BSS 2250 may be configured to determine service latency information. The SC 2240 and/or BSS 2250 may be configured to use the service latency information locally, at the NC 2220 and/or OSS 2230, to perform various functions. The SC 2240 and/or BSS 2250 may be configured to provide the service latency information to the NC 2220 and/or OSS 2230 for use by NC 2220 and/or OSS 2230 to perform various functions. The SC 2240 and/or BSS 2250 may be configured to provide the service latency information to WSSs 2211 for use by the WSSs 2211 to perform various functions. The various functions which may be performed at the control level (e.g., by the SC 2240 and/or BSS 2250 and/or by the NC 2220 and/or OSS 2230) and/or at the network level (e.g., by WSSs 2211) may include one or more of service provisioning functions (e.g., based on comparisons of service latency information to wavelength path latency information), service testing functions (e.g., based on comparisons of measured service latency values to the service latency information), wavelength switching functions (e.g., LL$\lambda$PS based on the service latency information, EBLM$\lambda$S based on the service latency information, or the like), or the like, as well as various combinations thereof.

The SC 2240 and/or BSS 2250 may be configured to determine service latency information based on service latency benchmarks associated with various services, based on evaluation of service latency measurements that are collected within the wave fabric 2210, or the like, as well as various combinations thereof.

The SC 2240 and/or BSS 2250 may be configured to determine service latency information based on service latency benchmarks associated with various services by obtaining the service latency benchmarks from various sources of such information (e.g., other systems, organizations, or the like, as well as various combinations thereof).

The SC 2240 and/or BSS 2250 may be configured to determine service latency information based on evaluation of service latency measurements that are collected within the wave fabric 2210 by performing various types of tests within the wave fabric 2210. The service latency information may be determined based on various types of tests which may be performed by WSSs 2211 under the control of SC 2240 and/or BSS 2250 (e.g., service trace tests, service ping tests, or the like, as well as various combinations thereof). The service latency information may be determined based on various service OAM functions (at least some of which are discussed below in conjunction with FIG. 21, and at least some of which are depicted and described in additional detail with respect to FIG. 30 and FIG. 31).

The SC 2240 and/or BSS 2250 may be configured to determine service latency information and to make the service latency information available over various time scales. The SC 2240 and/or BSS 2250 may be configured to determine service latency information in real time, weekly, monthly, quarterly, yearly, or the like. The SC 2240 and/or BSS 2250 may be configured to make the service latency information available in real time, weekly, monthly, quarterly, yearly, or the like.

The service latency information may include service latencies for service types (e.g., (UNI, NNI, EVC, WVC, or the like). The service latency information may include service latencies for specific services (e.g., CPRI, DCI, or the like). The service latency information may include service latencies for dual path protection and balancing options (unprotected, protected, load balanced, or the like). The service latency information may be provided at various levels of granularity (e.g., service latency information for the wave fabric 2210, per-zone service latency information for particular network zones, per-customer service latency information for particular customers, or the like, as well as various combinations thereof).

The service latency information may be maintained using one or more service latency tables. As depicted in Service Latency Table 2260 of FIG. 22, the service latency information for a service may include an indication of the service (the Service column), an indication of the service type (the Service Type column), an indication of a lowest service latency metric (the Shortest Path column), an indication of a bounded service latency metric (the Longest Path column), a multipath indicator (the Multipath column), and an indicator as to whether there are any SLA alerts (the SLA Alerts column). It will be appreciated that less or more service latency information may be provided, that the service latency information may be organized in other ways, that the service latency information may be maintained using other types of data structures, or the like, as well as various combinations thereof.

The NC 2220 and/or OSS 2230 may be configured to receive the service latency information from SC 2240 and/or BSS 2250 and to perform various functions based on the service latency information received from the SC 2240 and/or BSS 2250. The functions which may be performed by NC 2220 and/or OSS 2230 based on the service latency information received by the NC 2220 and/or OSS 2230 from SC 2240 and/or BSS 2250, as indicated above, may include one or more of service provisioning functions (e.g., based on comparisons of service latency information to wavelength path latency information), service testing functions (e.g., based on comparisons of measured service latency values to the service latency information), wavelength switching functions (e.g., LL$\lambda$PS based on comparisons of service latency information to lowest latency path information included in wavelength path latency information, EBLM$\lambda$S based on comparisons of service latency information to equal bounded latency multipath information included in wavelength path latency information, or the like), or the like, as well as various combinations thereof.

The WSSs 2211 may be configured to receive the service latency information from SC 2240 and/or BSS 2250 (e.g., directly or indirectly via NC 2220 and/or OSS 2230) and to perform various functions based on the service latency information received from SC 2240 and/or BSS 2250. The functions which may be performed by a given WSS 2211 based on the service latency information received by the given WSS 2211 from SC 2240 and/or BSS 2250, as indicated above, may include one or more of service provisioning functions (e.g., based on comparisons of service latency information to wavelength path latency information), service testing functions (e.g., based on comparisons of measured service latency values to the service latency information), wavelength switching functions (e.g., LLλPS based on lowest latency path information included in the wavelength path latency information, EBLMλS based on equal bounded latency multipath information included in the wavelength path latency information, or the like), or the like, as well as various combinations thereof.

For example, for service provisioning, a WSS 2211 may receive a service provisioning request from a controller (e.g., SC 2240 and/or BSS 2250) where the service provisioning request includes service latency information associated with the requested service (e.g., an indication as to whether the service is an RT service or an NRT service, a bounded service latency associated with the service, a lowest service latency for the service, or the like, as well as various combinations thereof) and may configure itself (e.g., configuring one or more interfaces of the WSS 2211 (e.g., one or more UNIs) or one or more other elements of the WSS 2111) to support the service based on the service latency information associated with the service request and wavelength path latency information provided to the WSS 2211.

For example, for service testing, a WSS 2211 may receive a service testing request from a controller (e.g., SC 2240 and/or BSS 2250) where the service testing request includes service latency information associated with the service to be tested (e.g., an indication as to whether the service is an RT service or an NRT service, a bounded service latency associated with the service, a lowest service latency for the service, or the like, as well as various combinations thereof), may initiate one or more tests for testing the service (e.g., for testing a latency of the service, an SLA of the service, or the like), and may provide test results from the testing of the service to the controller for use by the controller in evaluating the service (e.g., evaluating the provisioned service by comparing the measured service latency to the reference service latency information for the service, comparing the measured SLA information to the reference SLA information for the service, or the like). The service test may be a pre-activation service test, an in-service service test, or the like. The WSS 2211 may evaluate the service based on the test results and, rather than or in addition to providing the test results to the controller, provide the results of the evaluation of the service to the controller.

For example, for wavelength switching, a WSS 2211 may receive wavelength path latency information from a controller (e.g., SC 2240 and/or BSS 2250) and perform wavelength switching based on the wavelength path latency information. The wavelength switching, as indicated above, may include LLλPS, EBLMλS, or the like, as well as various combinations thereof. The wavelength switching may be provided within the context of service provisioning (e.g., assigning wavelengths to services based on one or more of LLλPS, EBLMλS, or the like, as well as various combinations thereof). The LLλPS wavelength switching functions which may be supported may be further understood by way of reference to FIGS. 24 and 25, the EBLMλS wavelength switching functions which may be supported may be further understood by way of reference to FIGS. 26 and 27, and so forth.

The WSSs 2211, NC 2220, OSS 2230, SC 2240, and BSS 2250 may be configured to support use of dual path bounded latency to provide network path protection or resiliency. The wave fabric 2210 is configured to support dual path bounded latency for network zones (e.g., RT zones and NRT zones). The various network zones are presented herein as using dual path architectures (illustratively, the ring structures used to provide the various network zones). The various network zones are presented herein as being configured to support communication between various PE sink locations. In at least some embodiments, dual path bounded latency for network zones may be used to provide network path protection for network paths configured over the network zones. The NC 2220 maintains wavelength path latency information and may be configured to track dual path connection options between pairs of PE devices. The NC 2220 may be configured to provide dual path connection option information to the SC 2240 for use in supporting network path protection (e.g., provisioning backup network paths, in conjunction with provisioning of primary network paths or responsive to failures of primary network paths, based on the dual path connection option information). The SC 2240 may be configured to receive the dual path connection option information from the NC 2220 and to use the dual path connection option information to control provisioning of protection network paths for network path protection. The WSSs 2211 may be configured to interact with the various controllers (e.g., NC 2220 and/or SC 2240) to support provisioning of backup network paths based on dual path bounded latency.

The WSSs 2211, NC 2220, OSS 2230, SC 2240, and BSS 2250 may be configured to support use of alternate bounded latency paths to provide service protection or resiliency for network services (e.g., RT services, NRT services, or the like). The wave fabric 2210 is configured to support dual path bounded latency for network zones (e.g., RT zones and NRT zones). The various network zones are presented herein as using dual path architectures (illustratively, the ring structures used to provide the various network zones). The various network zones are presented herein as being configured to support communication between various PE sink locations. In at least some embodiments, alternate bounded latency paths for network zones may be used to provide service protection for services of the network zones. For example, LLλPS services and EBLMλS services may have associated therewith (e.g., information which may be maintained at NC 2220, SC 2240, WSSs 2211, or the like) bounded long path options which could be used for protection. The NC 2220 maintains wavelength path latency information and may be configured to track alternate bounded latency path options within the network zones. The NC 2220 may be configured to provide alternate bounded latency path information to the SC 2240 for use in supporting service protection for network services. The SC 2240 may be configured to receive the alternate bounded latency path information from the NC 2220 and to use the alternate bounded latency path information to control provisioning of service connections to provide service protection for network services. The WSSs 2211 may be configured to interact with the various controllers (e.g., NC 2220 and/or SC 2240) to support provisioning of service connections based on alternate bounded latency path information in order to provide service protection for network services.

The WSSs 2211, NC 2220, OSS 2230, SC 2240, and BSS 2250 may be configured to support use of alternate bounded latency paths to provide load balancing for network services (e.g., RT services, NRT services, or the like). The wave fabric 2210 is configured to support dual path bounded latency for network zones (e.g., RT zones and NRT zones). The various network zones are presented herein as using dual path architectures (illustratively, the ring structures used to provide the various network zones). The various network zones are presented herein as being configured to support communication between various PE sink locations. In at least some embodiments, alternate bounded latency paths for network zones may be used to provide load balancing for services of the network zones. For example, LLλPS services and EBLMλS services may have associated therewith (e.g., information which may be maintained at NC 2220, SC 2240, WSSs 2211, or the like) bounded long path options which could be used for load balancing. The NC 2220 maintains wavelength path latency information and may be configured to track alternate bounded latency path options within the network zones. The NC 2220 may be configured to provide alternate bounded latency path information to the SC 2240 for use in supporting load balancing for network services. The SC 2240 may be configured to receive the alternate bounded latency path information from the NC 2220 and to use the alternate bounded latency path information to control provisioning of service connections to provide load balancing for network services. The WSSs 2211 may be configured to interact with the various controllers (e.g., NC 2220 and/or SC 2240) to support provisioning of service connections based on alternate bounded latency path information in order to provide load balancing for network services.

The WSSs 2211, NC 2220, OSS 2230, SC 2240, and BSS 2250 may be configured to support various other functions.

Figure 23:
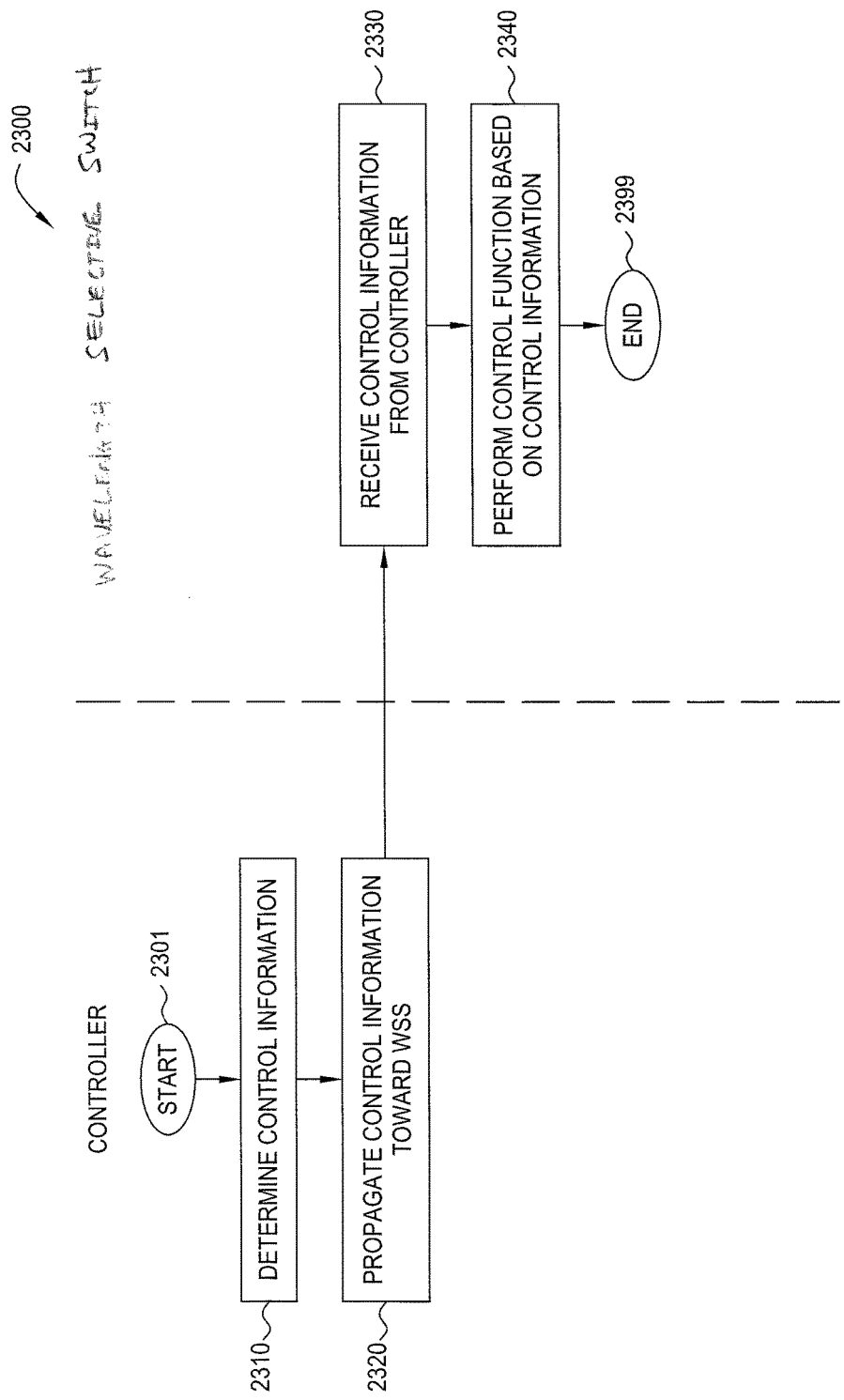
FIG. 23 depicts an exemplary embodiment of a method by which a controller controls wavelength selective switches to provide a wave fabric supporting non-blocking latency bounded communications as in FIG. 16.

FIG. 23 depicts an exemplary embodiment of a method by which a controller controls wavelength selective switches to provide a wave fabric supporting non-blocking latency bounded communications as in FIG. 16. The method 2300 includes functions performed by a controller (e.g., NC 2120, SC 2240, or the like) and functions performed by a WSS. At block 2301, method 2300 begins. At block 2310, the controller determines control information for the WSS. The control information may include network control information (e.g., as depicted and described with respect to FIG. 21), service control information (e.g., as depicted and described with respect to FIG. 22), or the like, as well as various combinations thereof. The control information may be determined based on information available at the controller, information received from the WSS or other WSSs, information received from one or more other systems, or the like, as well as various combinations thereof. At block 2320, the controller propagates the control information toward the WSS. At block 2330, the WSS receives the control information from the controller. At block 2340, the WSS performs a control function based on the control information. The control function may be a network configuration function, a service provisioning function, a service testing function, a service maintenance function, or the like, as well as various combinations thereof. At block 2399, method 2300 ends. It will be appreciated that, although depicted and described as ending (for purposes of clarity), the controller and WS S may continue to interact for providing a wave fabric supporting non-blocking latency bounded communications.

Figure 24:
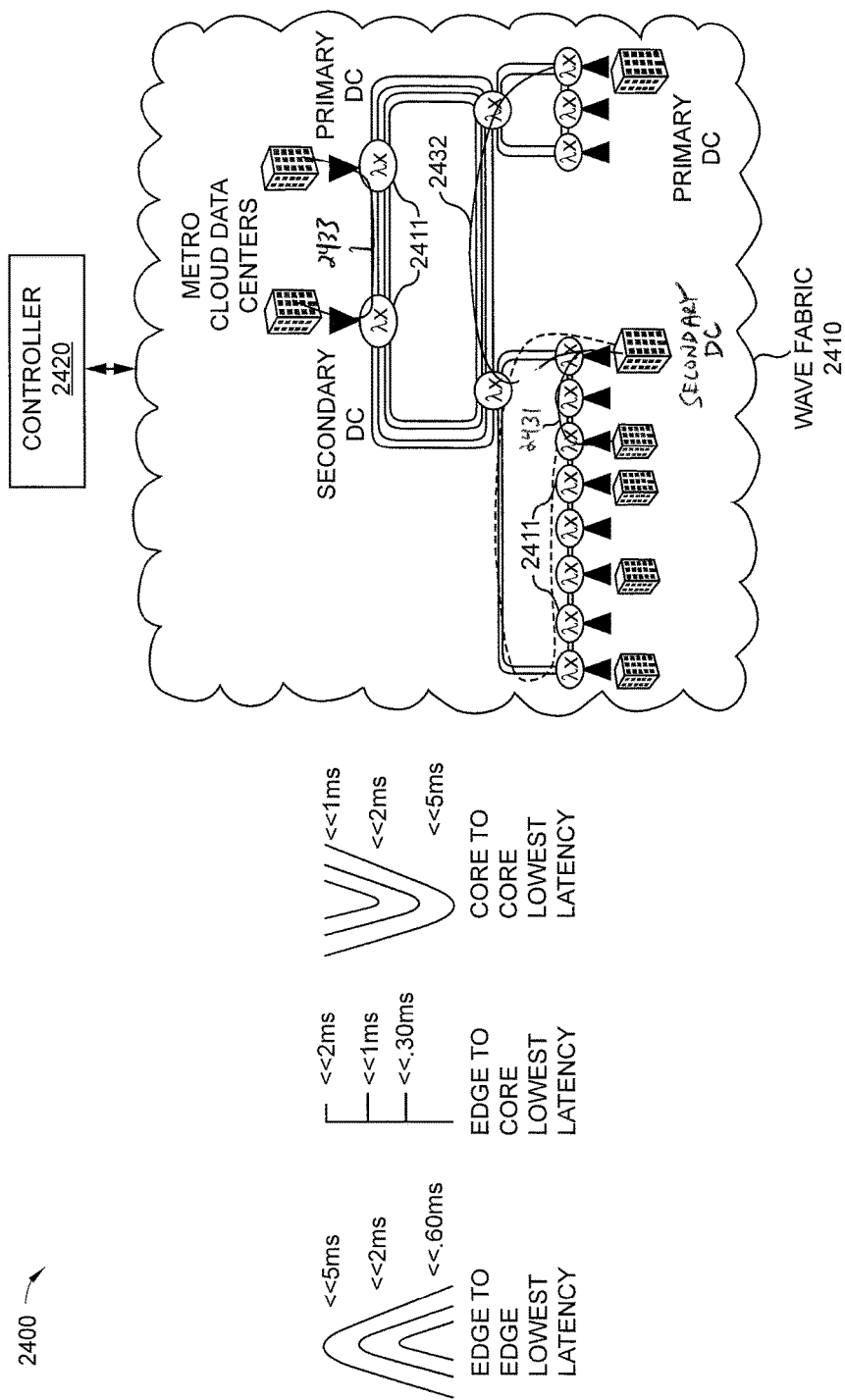
FIG. 24 depicts an exemplary use of a Lowest Latency λ Path Switching (LLλPS) wavelength switching capability.

FIG. 24 depicts an exemplary use of a Lowest Latency λ Path Switching (LLλPS) wavelength switching capability.

In general, the LLλPS wavelength switching capability is a wavelength switching strategy whereby lowest latency paths via a wave fabric may be identified and utilized by WSSs for low latency communication via the wave fabric.

As depicted in FIG. 24, a wave fabric 2410 is controlled by a controller 2420. The wave fabric 2410 includes a hierarchical arrangement of network zones (e.g., an RT zone and an NRT zone). The network zones are configured as fiber rings. The network zones each include WSSs 2411 and are interconnected by certain WSSs 2411 configured to operate in both of the network zones. The WSSs 2411 include PE WSSs 2211 (which may be configured as access points for the network zones and which may support communications within network zones) and P WSSs 2411 (which may support communications within and between network zones). The WSSs 2411 are configured to support wavelength switching, fiber switching, and the like. The WSSs 2411 are configured to perform wavelength switching using the LLλPS wavelength switching capability. The controller 2420 is configured to provide control functions for wave fabric 2410, including supporting use of the LLλPS wavelength switching capability.

The WSSs 2411 and controller 2420, as discussed above, may cooperate to support use of the LLλPS wavelength switching capability. The WSSs 2411 may collect latency information within wave fabric 2410 and provide the latency information to the controller 2420 for use by the controller 2420 in determining wavelength path latency information for wave fabric 2410. The controller 2420 may then provide various portions of the wavelength path latency information to the WSSs 2411. The WSSs 2411 may receive the wavelength path latency information from the controller 2420 and route traffic over optical paths using the LLλPS wavelength switching capability based on the wavelength path latency information. In general, a WSS 2411 that is using the LLλPS wavelength switching capability may be configured to receive an indication of a traffic flow to be transmitted from the WSS 2411, select a lowest latency wavelength path (or group of wavelength paths) for the traffic flow based on the wavelength path latency information maintained at the WSS 2411, and transmit the traffic of the traffic flow via the lowest latency wavelength path (or group of wavelength paths) selected for the traffic flow.

The LLλPS wavelength switching capability, as noted above, is based on lowest latency path information. In at least some embodiments, the lowest latency path information which is used to provide the LLλPS wavelength switching capability also may be used to improve various other network functions.

In at least some embodiments, for example, the lowest latency path information which is used to provide the LLλPS wavelength switching capability also may be used to improve Shortest Path Bridging (SPB). In general, SPB, which is specified in the IEEE 802.1aq standard, is a computer networking technology intended to simplify the creation and configuration of networks, while enabling multipath routing. The lowest latency path information which is used to provide the LLλPS wavelength switching capability may be used to improve SPB, such as by making SPB based on the fewest number of hops and/or lowest latency (e.g., lowest latency information also may be taken into account for SPB).

In at least some embodiments, for example, the lowest latency path information which is used to provide the LLλPS wavelength switching capability also may be used to improve Open Shortest Path First (OSPF). In general, OSPF detects changes in network topology (e.g., link failures) and converges on a new loop-free routing structure. More specifically, OSPF computes the shortest-path tree for each route using a method based on Dijkstra's algorithm. The OSPF routing policies for constructing a route table are governed by link metrics associated with each routing interface. Cost factors may be the distance of a router (round-trip time), data throughput of a link, or link availability and reliability, which may be expressed as simple unitless numbers. This provides a dynamic process of traffic load balancing between routes of equal cost. The lowest latency path information which is used to provide the LLλPS wavelength switching capability may be used to improve OSPF, such as by configuring OSPF to compute the shortest path and/or lowest latency tree (e.g., lowest latency information also may be taken into account for OSPF).

The wave fabric 2410 is depicted as having been configured to use the LLλPS wavelength switching capability in order to support certain lowest latency paths. A first lowest latency path 2431 between a UNI and a secondary DC is depicted. A second lowest latency path 2432 between a secondary DC and a primary DC is depicted. A third lowest latency path 2433 between a secondary and a primary DC is depicted.

It will be appreciated that the LLλPS wavelength switching capability may be utilized within various other contexts.

Figure 25:
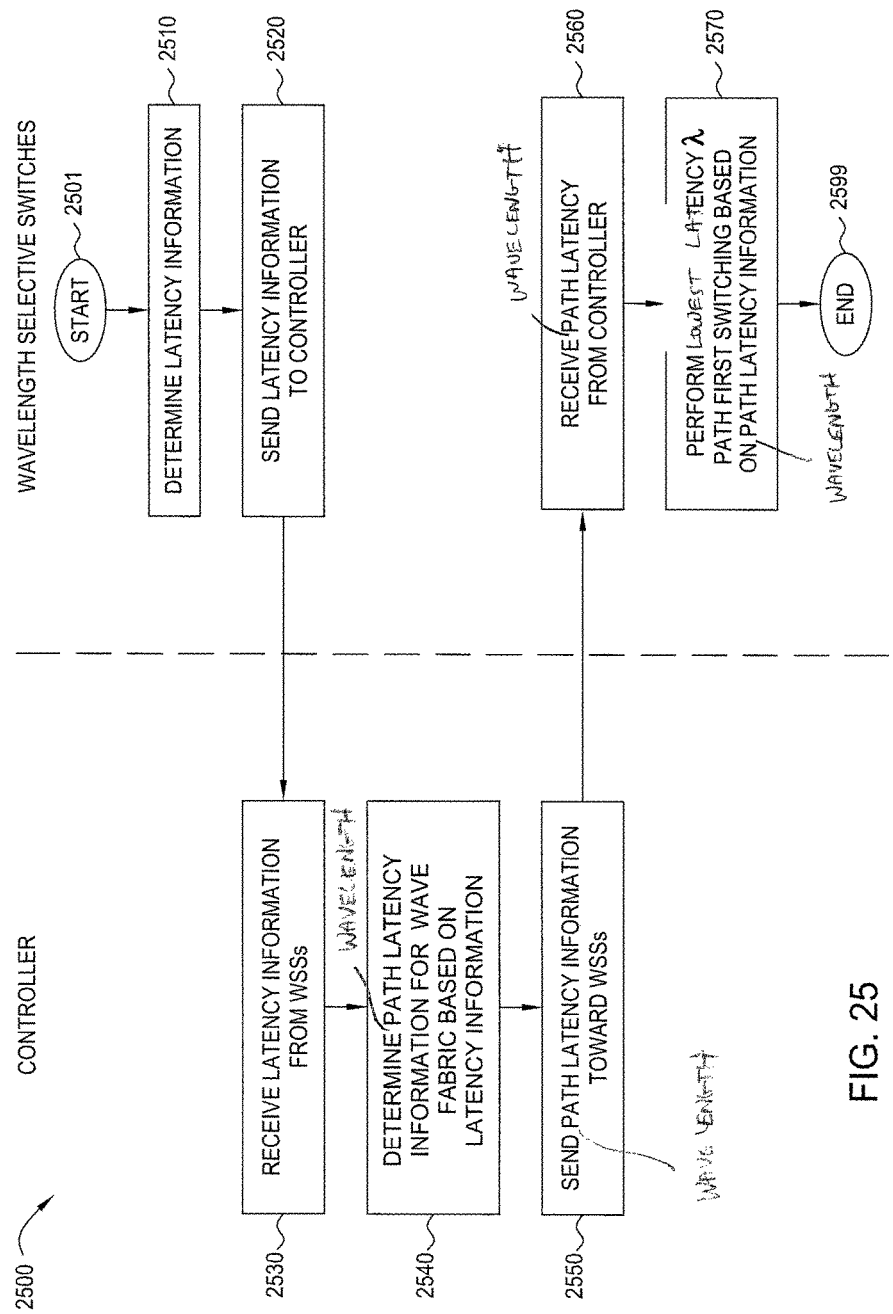
FIG. 25 depicts an exemplary embodiment of a method by which a controller interacts with a wavelength selective switch to support use of the Lowest Latency λ Path Switching (LLλPS) wavelength switching capability of FIG. 24.

FIG. 25 depicts an exemplary embodiment of a method by which a controller interacts with a wavelength selective switch to support use of the Lowest Latency λ Path Switching (LLλPS) wavelength switching capability of FIG. 24. The method 2500 includes functions performed by a controller (e.g., controller 2420 of FIG. 24) and functions performed by a set of WSSs of a wave fabric (e.g., WSSs 2411 wave fabric 2410 of FIG. 24). At block 2501, method 2500 begins. At block 2510, the WSSs of the wave fabric determine latency information. At block 2520, the WSSs of the wave fabric propagate the latency information toward the controller. At block 2530, the controller receives latency information from the WSSs of the wave fabric. At block 2540, the controller determines wavelength path latency information for the wave fabric based on the latency information received from the WSSs of the wave fabric. At block 2550, the controller propagates the wavelength path latency information toward the WSSs of the wave fabric. At block 2560, the WSSs receive the wavelength path latency information from the controller. At block 2570, the WSSs of the wave fabric perform LLλPS wavelength switching, based on the wavelength path latency information, for transporting traffic via the wave fabric. At block 2599, method 2500 ends. It will be appreciated that, although depicted and described as ending (for purposes of clarity), the controller and WSSs may continue to interact for supporting use of the LLλPS wavelength switching capability.

Figure 26:
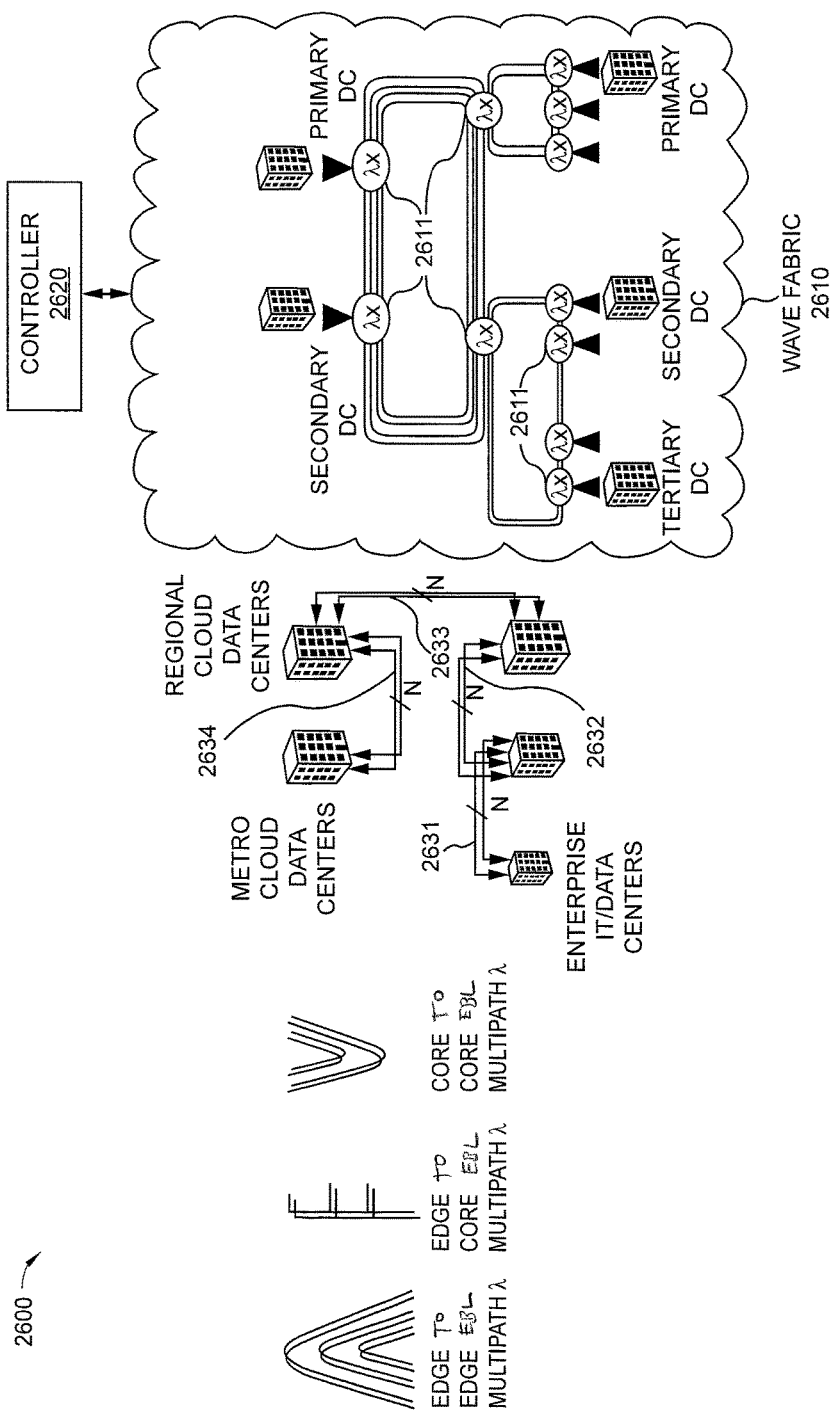
FIG. 26 depicts an exemplary use of an Equal Bounded Latency Multi-Path λ switching (EBLMλS) capability.

FIG. 26 depicts an exemplary use of an Equal Bounded Latency Multi-Path λ switching (EBLMλS) capability.

In general, the EBLMλS wavelength switching capability is a wavelength switching strategy whereby multiple equal bounded latency paths via a wave fabric may be identified and utilized by WSSs for low latency communication via the wave fabric. In EBLMλS wavelength switching, the multiple wavelength paths may have equal bounded latencies or may have bounded latencies that satisfy a threshold (e.g., multiple wavelength paths having a bounded latency of<X, which may reflect situations in which it may be unlikely for wavelength paths to have exactly identical latencies).

As depicted in FIG. 26, a wave fabric 2610 is controlled by a controller 2620. The wave fabric 2610 includes a hierarchical arrangement of network zones (e.g., an RT zone and an NRT zone). The network zones are configured as fiber rings. The network zones each include WSSs 2611 and are interconnected by certain WSSs 2611 configured to operate in both of the network zones. The WSSs 2611 include PE WSSs 2611 (which may be configured as access points for the network zones and which may support communications within network zones) and P WSSs 2611 (which may support communications within and between network zones). The WSSs 2611 are configured to support wavelength switching, fiber switching, and the like. The WSSs 2611 are configured to perform wavelength switching using the EBLMλS wavelength switching capability. The controller 2620 is configured to provide control functions for wave fabric 2610, including supporting use of the EBLMλS wavelength switching capability.

The WSSs 2611 and controller 2620, as discussed above, may cooperate to support use of the EBLMλS wavelength switching capability. The WSSs 2611 may collect latency information within wave fabric 2610 and provide the latency information to the controller 2620 for use by the controller 2620 in determining wavelength path latency information for wave fabric 2610. The controller 2620 may then provide various portions of the wavelength path latency information to the WSSs 2611. The WSSs 2611 may receive the wavelength path latency information from the controller 2620 and route traffic over optical paths using the EBLMλS wavelength switching capability based on the wavelength path latency information. In general, a WSS 2611 that is using the EBLMλS wavelength switching capability may be configured to receive an indication of a traffic flow to be transmitted from the WSS 2611, identity multiple wavelength paths having equal bounded latency where the multiple wavelength paths having equal bounded latency are identified based on the wavelength path latency information maintained at the WSS 2611, and transmit the traffic of the traffic flow via the multiple wavelength paths having equal bounded latency.

The EBLMλS wavelength switching capability, as noted above, is based on bounded latency path information. In at least some embodiments, the EBLMλS wavelength switching capability wavelength switching capability may be used to improve various other network functions. In at least some embodiments, for example, use of EBLMλS wavelength switching capability to provide load balancing across multiple equal bounded latency wavelength paths can improve Equal Cost Multipath (ECMP) over any routing protocol (e.g., OSPF, ISIS, BGP, RIP, or the like). In general, multipath routing is used in conjunction with most routing protocols and can substantially increase bandwidth by load-balancing traffic over multiple paths; however, there may be significant problems in deploying it in practice. For example, one of the problems is variable latencies per path. Typically, since each of the redundant paths may have a different latency involved, having packets take separate paths can cause packet to arrive out of order, increasing delivery latency and buffering requirements. In general, using ECMP means that, if multiple equal cost routes to the same destination exist, they can be discovered and used to provide load balancing among redundant paths. In at least some embodiments, for example, use of EBLMλS wavelength switching capability to provide load balancing across multiple equal bounded latency wavelength paths can improve the variable latency and packet reordering associated with ECMP (over any routing protocol), since the multi-path latency is predicted and bounded across the wavelength paths.

The wave fabric 2610 is depicted as having been configured to use the EBLMλS wavelength switching capability in order to support certain sets of multiple equal bounded latency paths. A first set of multiple equal bounded latency paths 2631 between DCs is depicted. A second set of multiple equal bounded latency paths 2632 between DCs is depicted. A third set of multiple equal bounded latency paths 2633 between DCs is depicted. A fourth set of multiple equal bounded latency paths 2634 between DCs is depicted.

It will be appreciated that the EBLMλS wavelength switching capability may be utilized within various other contexts.

Figure 27:
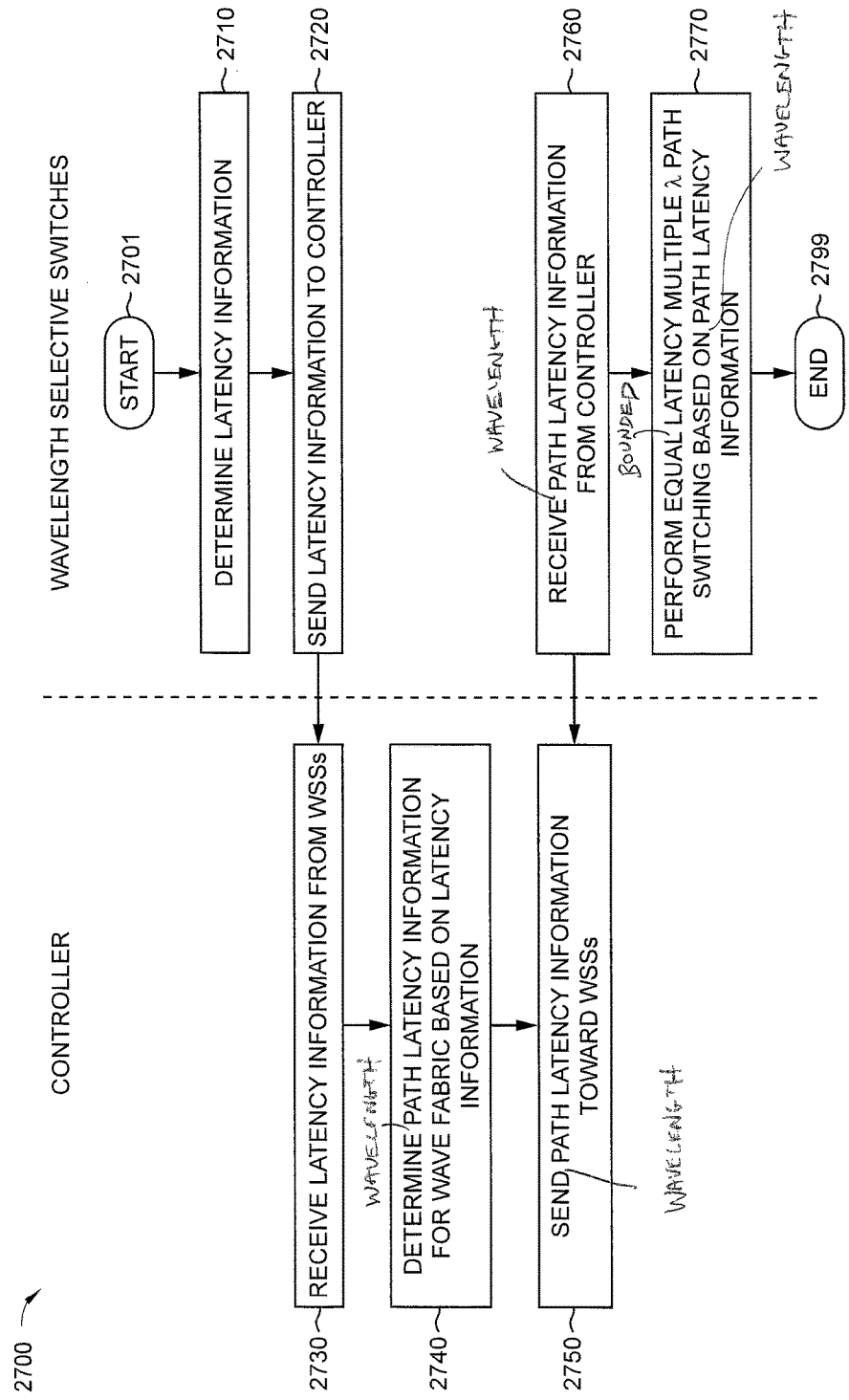
FIG. 27 depicts an exemplary embodiment of a method by which a controller interacts with a wavelength selective switch to support use of the Equal Bounded Latency Multi-Path λ switching (EBLMλS) capability of FIG. 26.

FIG. 27 depicts an exemplary embodiment of a method by which a controller interacts with a wavelength selective switch to support use of the Equal Bounded Latency Multi-Path λ Switching (EBLMλS) capability of FIG. 26. The method 2700 includes functions performed by a controller (e.g., controller 2620 of FIG. 26) and functions performed by a set of WSSs of a wave fabric (e.g., WSSs 2611 wave fabric 2610 of FIG. 26). At block 2701, method 2700 begins. At block 2710, the WSSs of the wave fabric determine latency information. At block 2720, the WSSs of the wave fabric propagate the latency information toward the controller. At block 2730, the controller receives latency information from the WSSs of the wave fabric. At block 2740, the controller determines wavelength path latency information for the wave fabric based on the latency information received from the WSSs of the wave fabric. At block 2750, the controller propagates the wavelength path latency information toward the WSSs of the wave fabric. At block 2760, the WSSs receive the wavelength path latency information from the controller. At block 2770, the WSSs of the wave fabric perform EBLMλS wavelength switching, based on the wavelength path latency information, for transporting traffic via the wave fabric. At block 2599, method 2500 ends. It will be appreciated that, although depicted and described as ending (for purposes of clarity), the controller and WSSs may continue to interact for supporting use of the EBLMλS wavelength switching capability.

Figure 28:
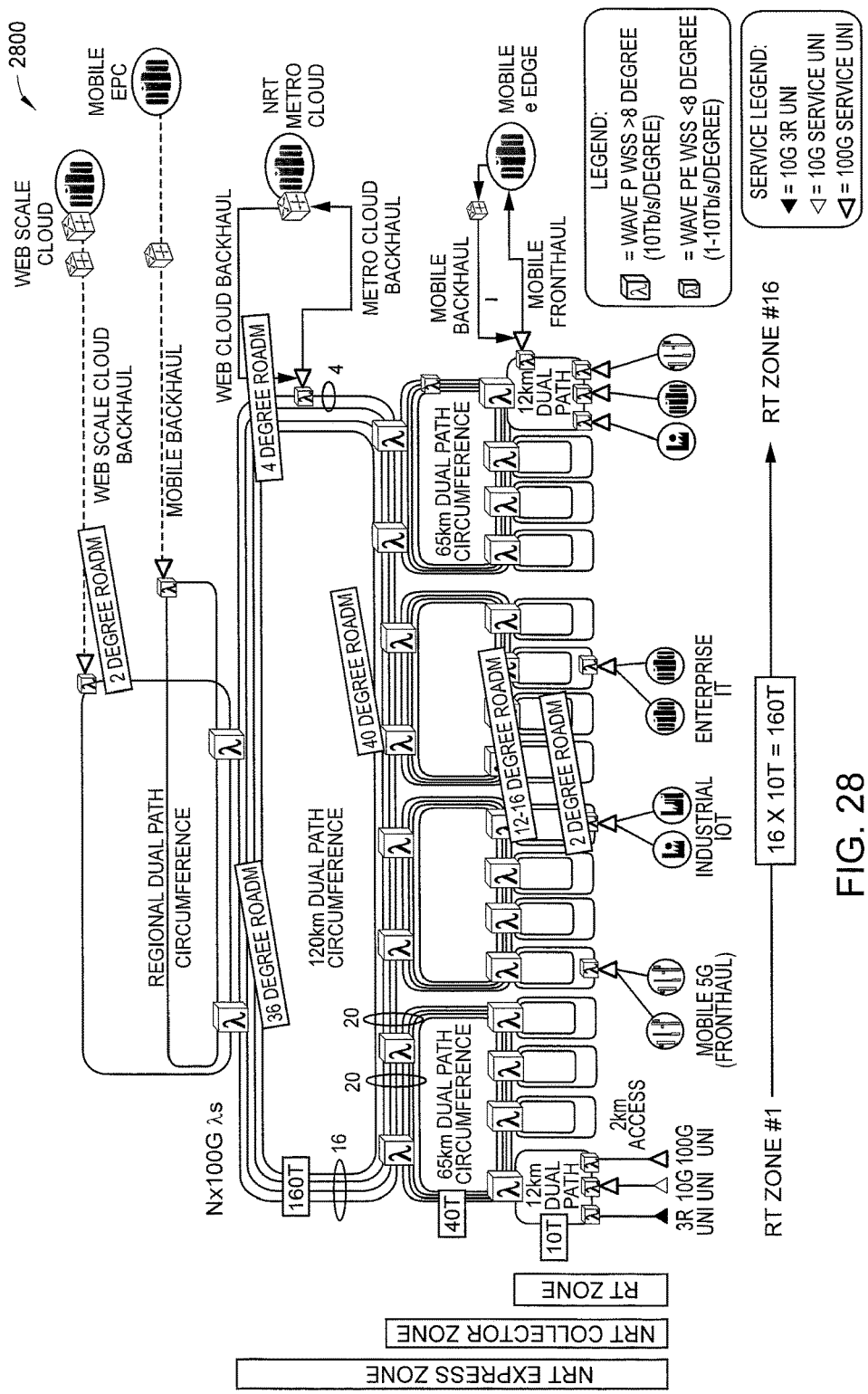
FIG. 28 depicts an exemplary communication system including a wave fabric provided using wavelength selective switches.

FIG. 28 depicts an exemplary communication system including a wave fabric provided using wavelength selective switches.

The communication system 2800 includes a wave fabric composed of a hierarchical arrangement of network zones (illustratively, sixteen RT zones, four NRT collector zones (each serving four of the RT zones, respectively), and an NRT express zone (serving the four NRT collector zones)).

The wave fabric is composed of network zones configured as fiber rings. The wave fabric is configured to support 160 Tbps (illustratively, the sixteen RT zones each are configured to support 10 Tbps for a total of 160 Tbps, the four RT zones each are configured to support 40 Tbps for a total of 160 Tbps, and the NRT express zone is configured to support 160 Tbps).

The network zones each include WSSs and are interconnected by certain WSSs configured to operate in multiple network zones in order to interconnect the network zone. The WSSs include PE WSSs (which may be configured as access points for the network zones and which may support communications within network zones) and P WSSs (which may support communications within and between network zones). The WSSs are configured to support wavelength switching, fiber switching, and the like.

The WSSs are configured to utilize ROADM degrees in order to support scaling of fiber and wavelength switching to provide a non-blocking, bounded latency wave fabric. For example, 2 degree ROADMs may be configured to support access into the RT zones, 12-16 degree ROADMs may configured to support interconnection between RT zones and NRT collector zones, 40 degree ROADMs may be configured to support interconnection between NRT collector zones and the NRT express zone, and so forth. It will be appreciated that the wave fabric may be configured to support other capacities and, thus, that ROADMs having other numbers of degrees may be configured to provide the WSSs for the wave fabric.

Figure 29:
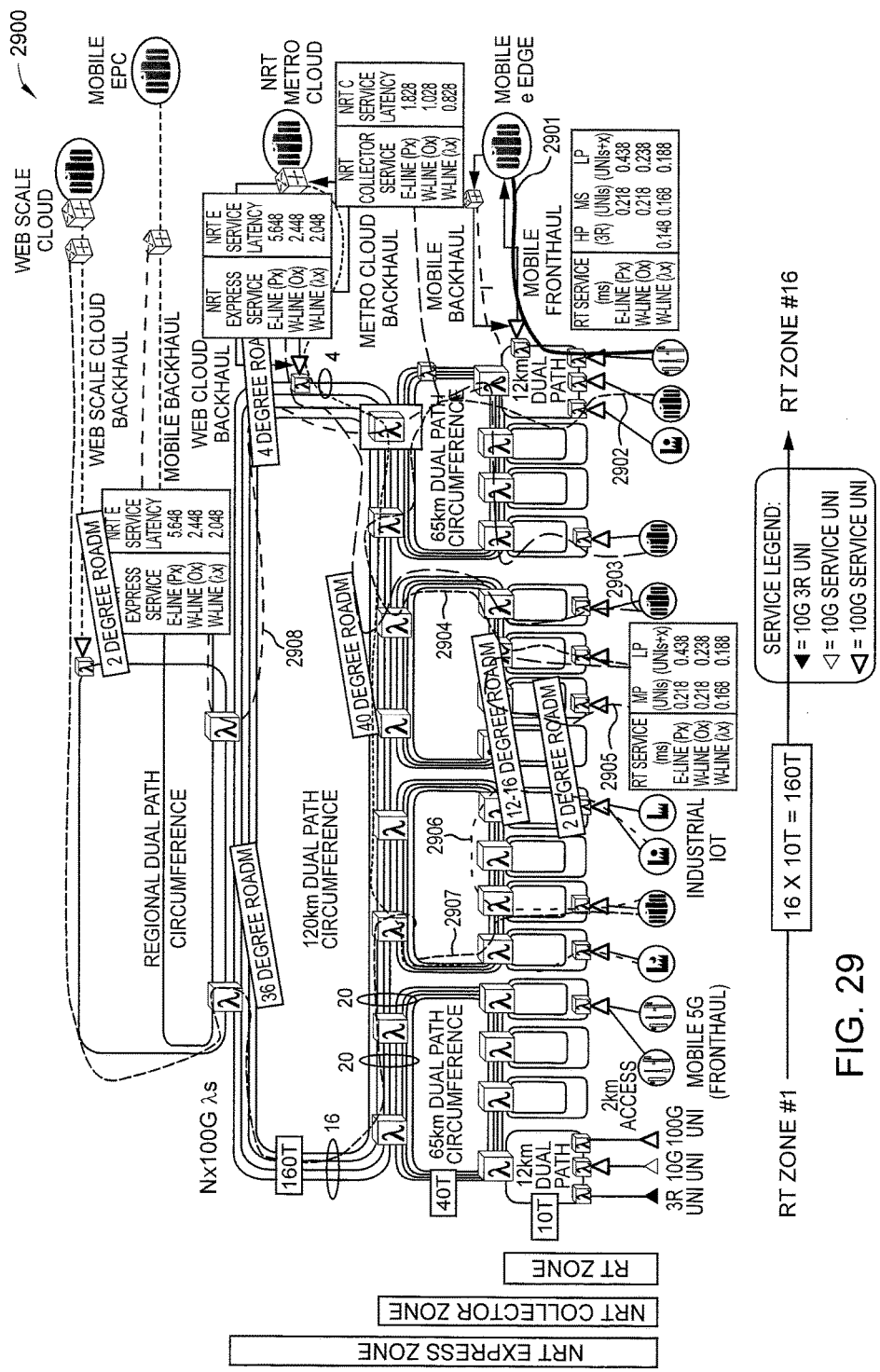
FIG. 29 depicts the exemplary service connections established within the exemplary communication system of FIG. 28.

FIG. 29 depicts the exemplary service connections established within the exemplary communication system of FIG. 28. The communication system 2900 of FIG. 29 is similar to communication system 2800 of FIG. 28. The communication system 2900 illustrates a number of service connections. A service connection 2901 is established between edge mobile remote radio head (edge Wave PE) and Mobile Broadband Base Units in the hosted mobile compute cluster for RT mobile fronthaul. A service connection 2902 is established between Enterprise branch and Enterprise DC for RT Enterprise branch communication. A service connection 2903 is established between Enterprise DC and metro collector level COLO/DC services for supporting metro cloud NRT backhaul (Data Center Interconnect) and hybrid cloud applications supporting<5 ms latency applications. A service connection 2904 is established between Enterprise DC and metro express level COLO/DC services for supporting metro cloud NRT backhaul and hybrid cloud applications supporting<10 ms latency applications. A service connection 2905 is established between Enterprise DC and Enterprise DC for RT DCI<2 ms latency applications. A service connection 2906 is established between industrial edge devices (cameras, sensors and controllers) and Enterprise DC for industrial IOT applications. A service connection 2907 is established between an Enterprise DC and public cloud data centers for hosted Web Scale computing applications (SaaS, PaaS and/or IaaS). A service connection 2908 is established between a mobile edge computing DC and a mobile core for mobile backhaul to the EPC.

Figure 30:
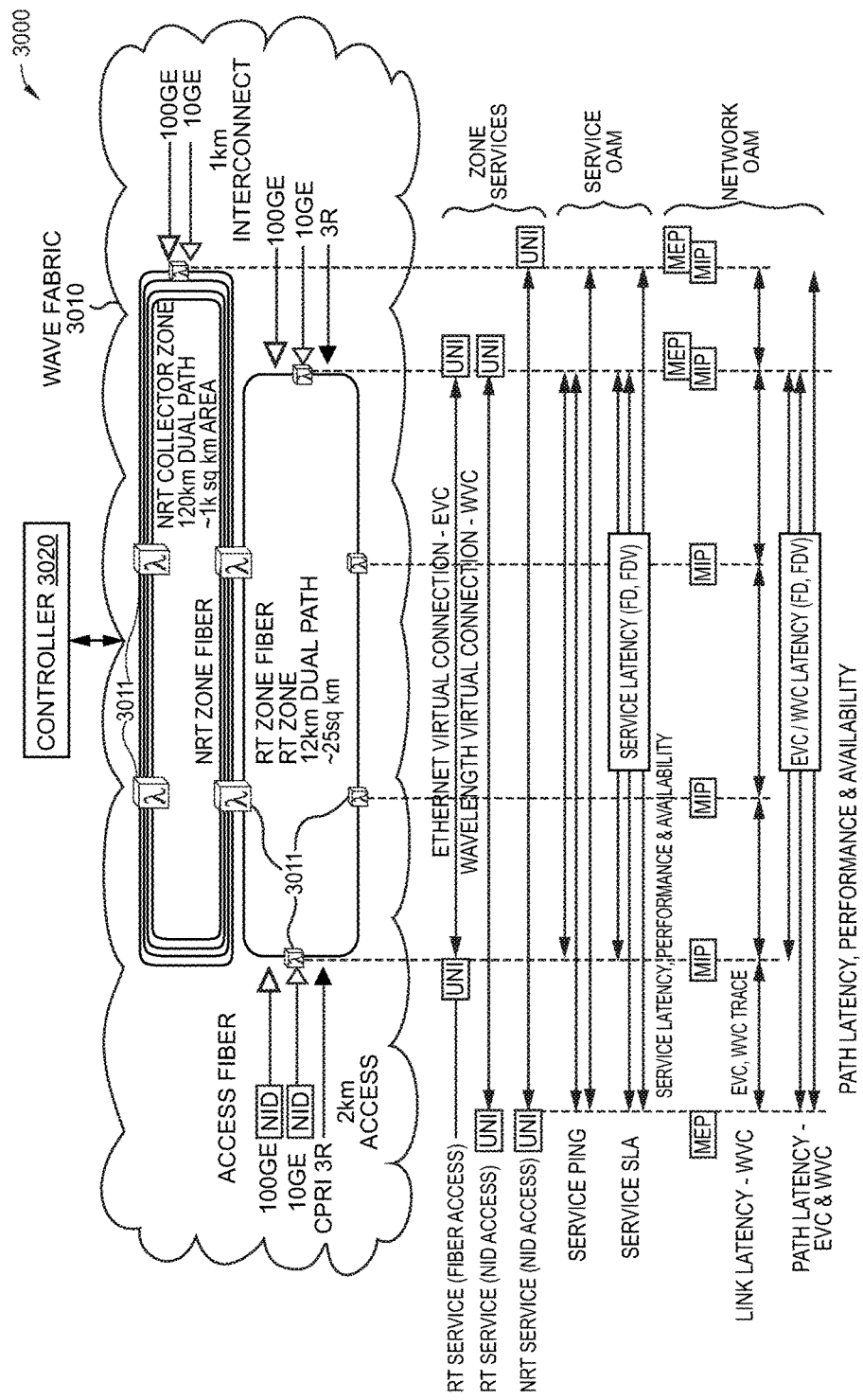
FIG. 30 depicts an exemplary communication system including a wave fabric and a controller for illustrating management of elements of the wave fabric by the controller.

FIG. 30 depicts an exemplary communication system including a wave fabric and a management system for illustrating management of elements of the wave fabric by the management system.

The communication system 3000 includes a wave fabric 3010 and a controller 3020 configured to communicate with wave fabric 3010 (and, thus, with various devices of which the wave fabric 3010 is composed).

The wave fabric 3010 includes network zones (illustratively, an RT zone and an NRT collector zone). The wave fabric includes various WSSs 3011, including WSSs 3011 configured to operate within network zones and WSSs 3011 configured to operate within and between network zones.

The controller 3020 is configured to provide various control functions for wave fabric 3010. The controller 3020 is configured to control the WSSs 3011 and to provide various control functions for the WSSs 3011. The controller 3020 may be configured to provide control functions such as network provisioning functions, service provisioning functions, network testing functions, service testing functions, information collection functions (e.g., for collecting latency information related to use of various wavelength switching capabilities by the WSSs 3011), or the like, as well as various combinations thereof. The controller 3020 may be configured to send instructions to WSSs 3011 (e.g., network configuration instructions, service provisioning instructions, network testing instructions, service testing instructions, or the like, as well as various combinations thereof), receive result information from WSSs 3011 (e.g., results of network configuration operations, results of service provisioning operations, results of network testing operations, results of service testing operations, or the like, as well as various combinations thereof), or the like, as well as various combinations thereof.

The controller 3020 is configured to control configuration of the WSSs 3011 to support the RT and NRT zones. The configuration of a WSS 3011 to support a network zone may include configuration of one or more degrees of one or more ROADMs of the WSS 3011. The configuration of a WSS 3011 to support a network zone may include various network OAM functions which may be performed by the WSS 3011 under the control of controller 3020. The configuration of a WSS 3011 to support a network zone may include configuration of one or more interfaces on the WSS 3011 (e.g., configuration of one or more Maintenance End Points (MEPs), configuration of one or more Maintenance Intermediate Points (MIPs), or the like, as well as various combinations thereof). The controller 3020 is configured to control configuration of an interface (e.g., MEP, MIP, or the like) and the end to end network connection (EVC or WVC, or the like) to support a network zone. The network zones are configured to support network OAM functions and features (e.g., link and path trace to monitor path latency and performance metrics, as well as to aid in fault sectionalization, isolation and repair). The WSS 3011 that is configured, under the control of controller 3020, to support a network zone may store information related to the network zone locally on the WSS 3011 (e.g., wavelength path latency information, service latency information, configuration information, or the like, as well as various combinations thereof), provide information associated with configuration of the network zone to the controller 3020 (e.g., a result of configuration of the network zone on the WSS 3011, information associated with the configuration of the network zone on the WSS 3011, or the like, as well as various combinations thereof), or the like, as well as various combinations thereof).

The controller 3020 is configured to control configuration of the WSSs 3011 to support the RT and NRT services supported by the RT and NRT zones, respectively. The configuration of a WSS 3011 to support zone services may include various service OAM functions which may be performed by the WSS 3011 under the control of controller 3020. The configuration of a WSS 3011 to support a zone service may include configuration of one or more interfaces on the WSS 3011 (e.g., configuration of one or more UNIs, configuration of one or more NNIs, or the like, as well as various combinations thereof). The configuration of an interface (e.g., UNI, NNI, or the like) to support a zone service may include use of service OAM functions and features (e.g., ping and service latency and performance metrics that support the RT & NRT service SLAs). The WSS 3011 that is configured, under the control of controller 3020, to support a zone service may store information related to the zone service locally on the WSS 3011 (e.g., wavelength path latency information, service latency information, configuration information, or the like, as well as various combinations thereof), provide information associated with configuration of the zone service to the controller 3020 (e.g., a result of configuration of the zone service on the WSS 3011, information associated with the configuration of the zone service on the WSS 3011, or the like, as well as various combinations thereof), or the like, as well as various combinations thereof). The zone services may include wavelength virtual connections (WVCs), Ethernet virtual connections (EVCs), or the like, as well as various combinations thereof.

The controller 3020 is configured to control testing of zone services by WSSs 3011. The controller 3020 may be configured to control service commission testing of zone services prior to activation of the zone services, in-service testing of active zone services, or the like, as well as various combinations thereof.

The controller 3020 may be configured to control testing of a zone service by sending a testing instruction to a WSS 3011 that is an endpoint of the zone service and receiving a testing response from the WSS 3011 that is an endpoint of the zone service. The service test may be a service ping test in which the WSS 3011 that receives the testing instruction initiates a ping to the other endpoint of the zone service, receives a ping response from the other endpoint of the zone service, and provides the ping testing results to the controller 3020. The service ping test may be provided using a Wavelength Ping Protocol (WPP) or other suitable type of service ping test. The service test may be a service SLA test configured to test one or more of service latency, service performance, service availability, or the like, as well as various combinations thereof. The service SLA test may be provided using a Wavelength Ping Protocol (WPP) or other suitable type(s) of service SLA test(s). The service test may be initiated by providing the testing instruction to an interface on the WSS 3011 (e.g., an OAM interface, such as an MEP interface or other suitable type of interface).

The controller 3020 may be configured to control testing of a zone service by sending a testing instruction to a WSS 3011 that is an intermediate node supporting the zone service and receiving a testing response from the WSS 3011 that is an intermediate node of the zone service. The service test may be a service ping test in which the WSS 3011 that receives the testing instruction initiates a ping to another WSS 3011 supporting the zone service (e.g., another intermediate node supporting the zone service, an endpoint of the zone service, or the like), receives a ping response from the other WSS 3011 supporting the zone service, and provides the ping testing results to the controller 3020. The service ping test may be provided using a Wavelength Ping Protocol (WPP) or other suitable type of service ping test. The service test may be a service SLA test configured to test one or more of service latency, service performance, service availability, or the like, as well as various combinations thereof. The service SLA test may be provided using a Wavelength Ping Protocol (WPP) or other suitable type(s) of service SLA test(s). The service SLA information may include FD information, FDV information, or the like, as well as various combinations thereof. The service test may be initiated by providing the testing instruction to an interface on the WSS 3011 (e.g., an OAM interface, such as an MIP interface or other suitable type of interface).

The controller 3020 may be configured to control testing of zone services for various types of services using various service testing capabilities. The zone services may include wavelength services or other physical layer services (e.g., WVCs or the like), Ethernet services or other data link layer services (e.g., EVCs or the like), or the like, as well as various combinations thereof. The service testing capabilities may include ITU Y.1731 for testing Ethernet services, ITU OTN TCM for testing wavelength services, or the like, as well as various combinations thereof.

It will be appreciated that various combinations of such techniques may be applied for testing zone services.

The controller 3020 is configured to control configuration of the WSSs 3011 to support wavelength selective switching capabilities (e.g., LLλPS, EBLMλS, or the like, as well as various combinations thereof).

The controller 3020 is configured to control configuration of the WSSs 3011 to support wavelength selective switching capabilities by collecting latency information (e.g., link latency information, path latency information, or the like, as well as various combinations thereof) from the wave fabric 3010, determining wavelength path latency information for the WSSs 3011, and providing the wavelength path latency information to the WSSs 3011 for use in supporting wavelength selective switching capabilities.

The controller 3020 may be configured to control collection of latency information by sending an instruction to a WSS 3011 that is an endpoint of a zone service and receiving a response from the WSS 3011 that includes the latency information. The testing instruction may be an instruction to collect link latency information (e.g., using a WVC trace capability, using an EVC trace capability, or the like), an instruction to collect path latency information (e.g., using a WVC-based capability for measuring latency, using an EVC-based capability for measuring latency, or the like, as well as various combinations thereof). The latency information may be collected using one or more capabilities for collecting latency information (e.g., a Wavelength Trace Route Protocol (WTRP), ITU OTN TCM, IEEE 802.1ag, or the like, as well as various combinations thereof). The latency information may include FD information, FDV information, or the like, as well as various combinations thereof. The latency information may be collected by sending the instruction to an interface on the WSS 3011 (e.g., an OAM interface, such as an MEP interface or other suitable type of interface).

The controller 3020 may be configured to control collection of latency information by sending an instruction to a WSS 3011 that is an intermediate node of a zone service and receiving a response from the WSS 3011 that includes the latency information. The testing instruction may be an instruction to collect link latency information (e.g., using a WVC trace capability, using an EVC trace capability, or the like), an instruction to collect path latency information (e.g., using a WVC-based capability for measuring latency, using an EVC-based capability for measuring latency, or the like, as well as various combinations thereof). The latency information may be collected using one or more capabilities for collecting latency information (e.g., a WTRP, ITU OTN TCM, IEEE 802.1ag, or the like, as well as various combinations thereof). The latency information may include FD information, FDV information, or the like, as well as various combinations thereof. The latency information may be collected by sending the instruction to an interface on the WSS 3011 (e.g., an OAM interface, such as an MIP interface or other suitable type of interface).

The controller 3020 may be configured to provide various other control functions for wave fabric 3010.

Figure 31:
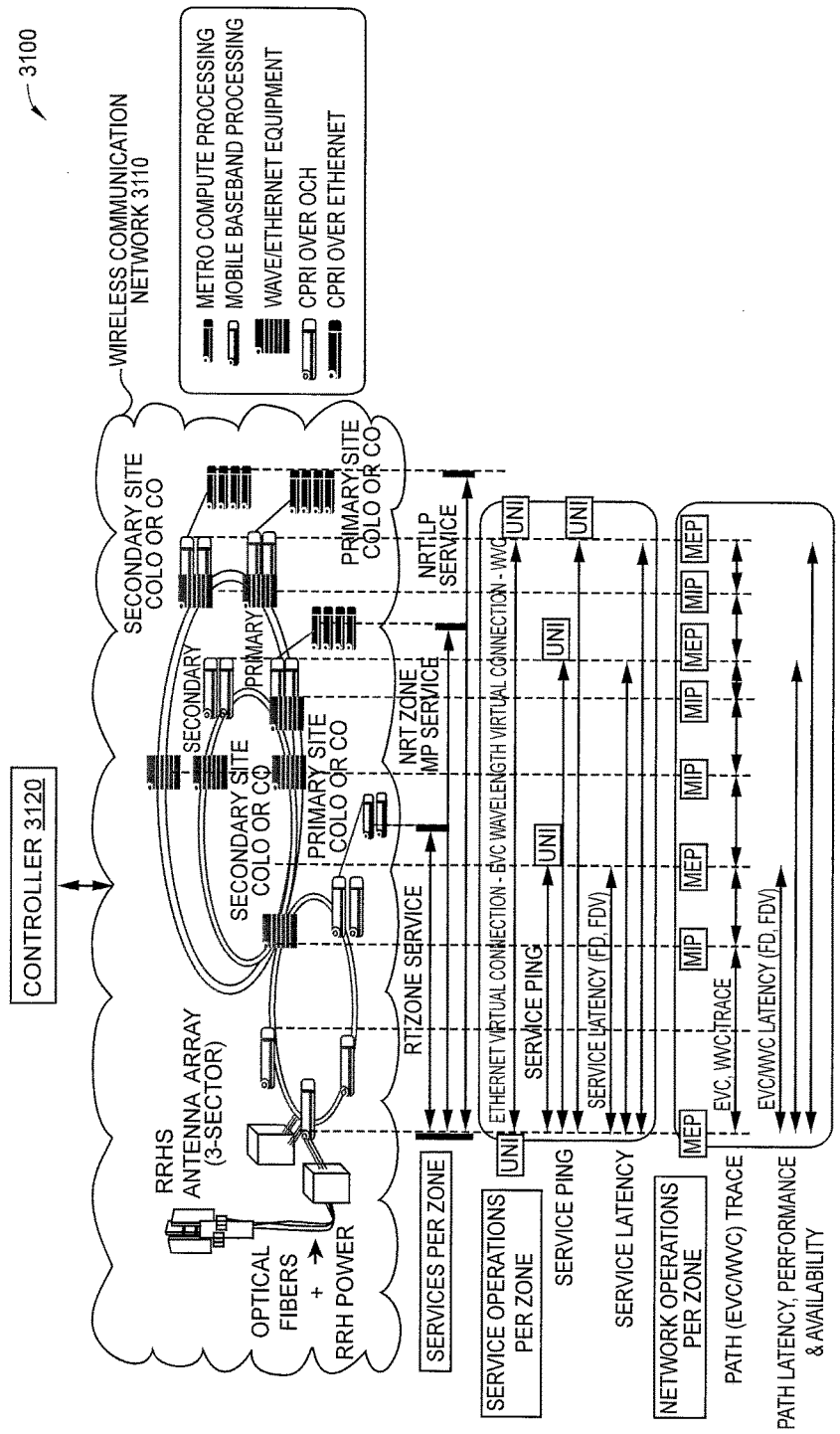
FIG. 31 depicts an exemplary communication system including a wireless communication network and a controller for illustrating management of elements of the wireless communication network by the controller.

FIG. 31 depicts an exemplary communication system including a wireless communication network and a controller for illustrating management of elements of the wireless communication network by the controller. The communication system 3100 includes a wireless communication network 3110 and a controller 3120. The wireless communication network 3110 includes three fiber rings configured as an RT zone, an NRT collector (MP) zone, and an NRT express (LP) zone, respectively. The three fiber rings each include various types of devices, including WSSs. The controller 3120 is configured to provide various control functions for wireless communication network 3110. As depicted in FIG. 31, the controller 3120 may be configured to provide control functions for wireless communication network 3110 that are similar to the control functions provided by controller 3020 for wave fabric 3010 as depicted and described with respect to FIG. 30 (e.g., network provisioning functions, service provisioning functions, network testing functions, service testing functions, information collection functions (e.g., for collecting latency information related to use of various wavelength switching capabilities by the WSSs 3011), or the like, as well as various combinations thereof). The controller 3120 may be configured to provide various other types of control functions for wireless communication network 3110.

Figure 32:
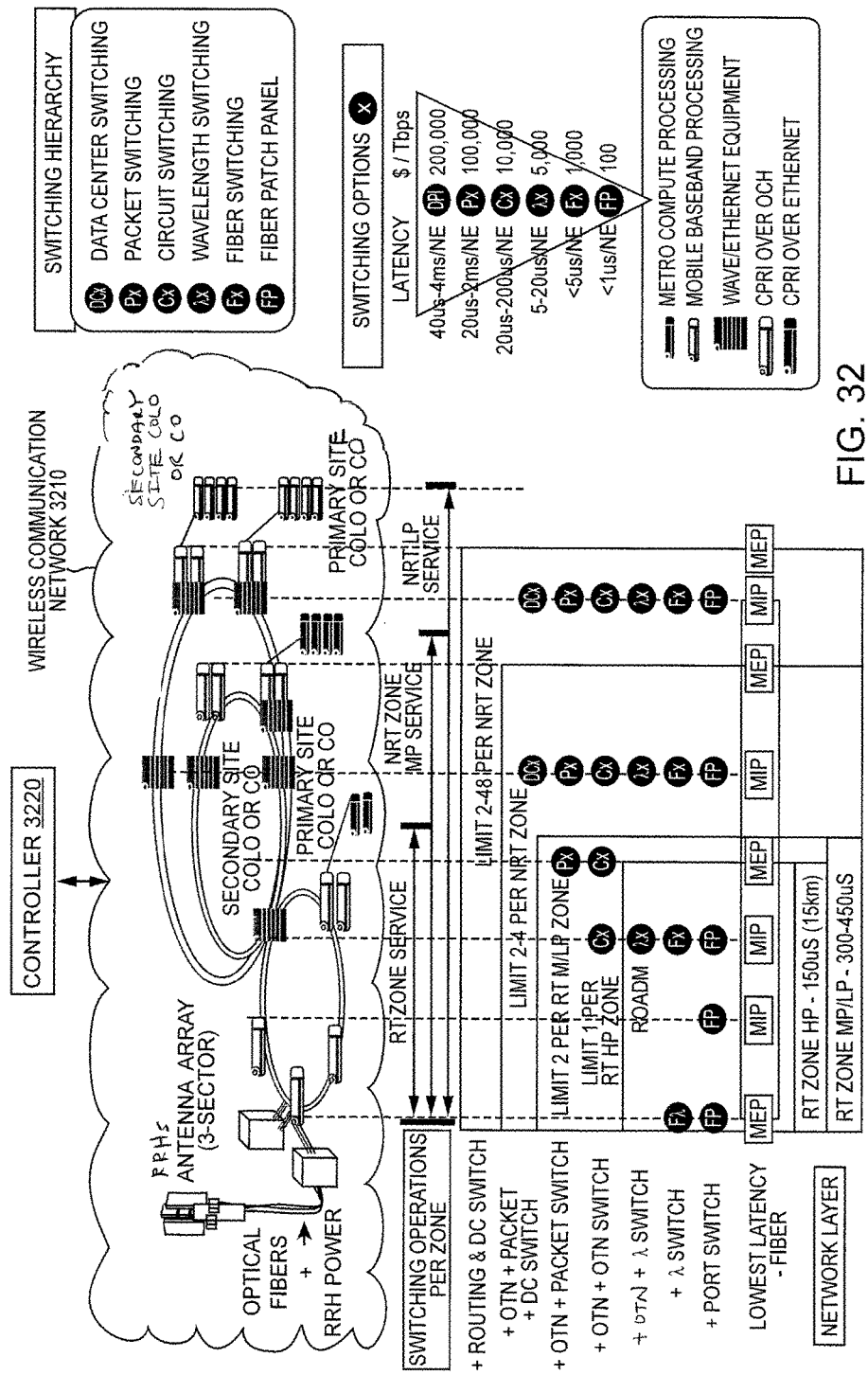
FIG. 32 depicts the exemplary wireless communication network of FIG. 31 for further illustrating various switching points which may be supported at various elements of the wireless communication network of FIG. 31.

FIG. 32 depicts the exemplary wireless communication network of FIG. 31 for further illustrating various switching points which may be supported at various elements of the wireless communication network of FIG. 31. The communication system 3200 includes a wireless communication network 3210 and a controller 3220. The wireless communication network 3210 includes three fiber rings configured as an RT zone, an NRT collector (MP) zone, and an NRT express (LP) zone, respectively. The three fiber rings each include various types of devices, including WSSs, processing devices, and the like. The controller 3220 is configured to provide various control functions for wireless communication network 3210. As depicted in FIG. 32, various types of switching points may be provided at various devices of wireless communication network 3210 in order to support bounded latency of network zones and associated zone services. The types of switching points include fibre patch panel switching points (denoted as FP), fiber switching points (denoted as Fx), wavelength switching points (denoted as λx), circuit switching points (denoted as Cx), packet switching points (denoted as Px), and data center switching points (denoted as DCx).

Figure 33:
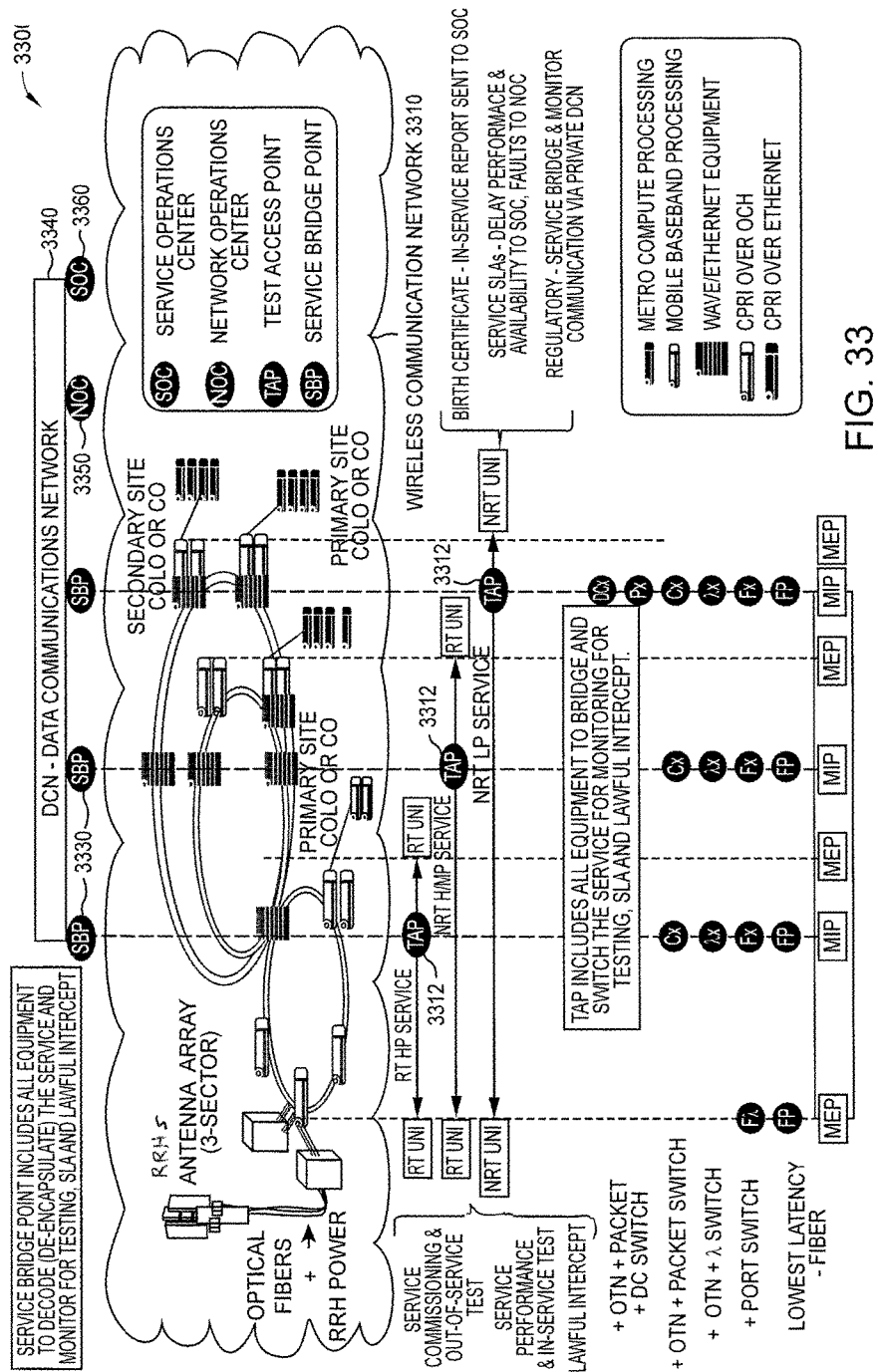
FIG. 33 depicts the exemplary wireless communication network of FIG. 31 for further illustrating various testing access points (TAPs) and service bridging points (SBPs) which may be supported at various elements of the wireless communication network of FIG. 31.

FIG. 33 depicts the exemplary wireless communication network of FIG. 31 for further illustrating various testing access points (TAPs) and service bridging points (SBPs) which may be supported at various elements of the wireless communication network of FIG. 31.

The communication system 3300 includes a wireless communication network 3310 having a set of test access points (TAPs) 3312, a set of service bridging points (SBPs) 3330, a data communication network (DCN) 3340, a network operations center (NOC) 3350, and a service operations center (SOC) 3360.

The wireless communication network 3310 includes three fiber rings configured as an RT zone, an NRT collector (MP) zone, and an NRT express (LP) zone, respectively. The three fiber rings each include various types of devices, including WSSs, processing devices, and the like. The wireless communication network 3310, as indicated above, also includes various TAPs 3312 which may be associated with various devices of the fiber rings. It will be appreciated that, although the TAPs 3312 are depicted as being outside of the wireless communication network 3310 (for purposes of clarity in illustrating various testing functions which may be supported), the TAPs 3312 will be understood to include equipment that is part of (or is communicatively connected to) the various devices with which they are associated in wireless communication network 3310.

The TAPs 3312 include equipment configured to bridge and switch various services in support of various management functions which may be provided for the various services (e.g., monitoring, testing, SLA, lawful intercept, or the like, as well as various combinations thereof). The TAPs 3312 are communicatively connected to SBPs 3330 for communication with DCN 3340.

The SBPs 3330 include equipment configured to decapsulate and decode various services in support of various management functions which may be provided for the various services (e.g., monitoring, testing, SLA, lawful intercept, or the like, as well as various combinations thereof). The SBPs 3330 are communicatively connected to DCN 3340 for communication with NOC 3350 and SOC 3360.

The NOC 3350 is configured to provide various network management functions for wireless communication network 3310 based on communication with elements of wireless communication network 3310 via DCN 3340, SBPs 3330, and TAPS 3312.

The SOC 3360 is configured to provide various service management functions for wireless communication network 3310 based on communication with elements of wireless communication network 3310 via DCN 3340, SBPs 3330, and TAPS 3312.

Figure 34:
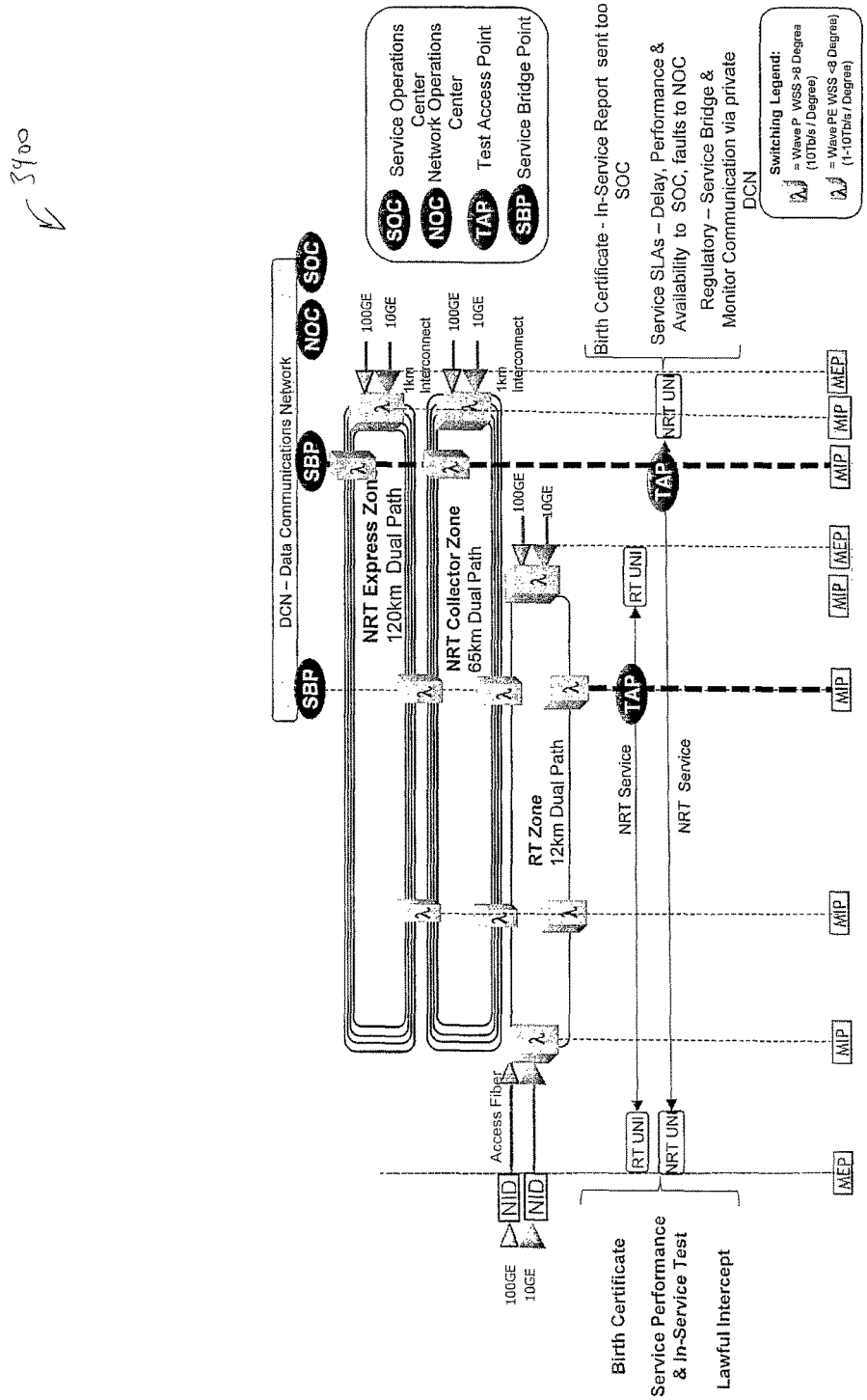
FIG. 34 depicts an exemplary communication system including a wave fabric and a controller for further illustrating various testing access points (TAPs) and service bridging points (SBPs) of FIG. 33 within the context of the wave fabric of FIG. 30.

FIG. 34 depicts an exemplary communication system including a wave fabric and a controller for further illustrating various testing access points (TAPs) and service bridging points (SBPs) of FIG. 33 within the context of the wave fabric of FIG. 30. It will be appreciated that the communication system 3400 of FIG. 34 may be configured to operate in a manner similar to the communication system 3300 of FIG. 33.

Figure 35:
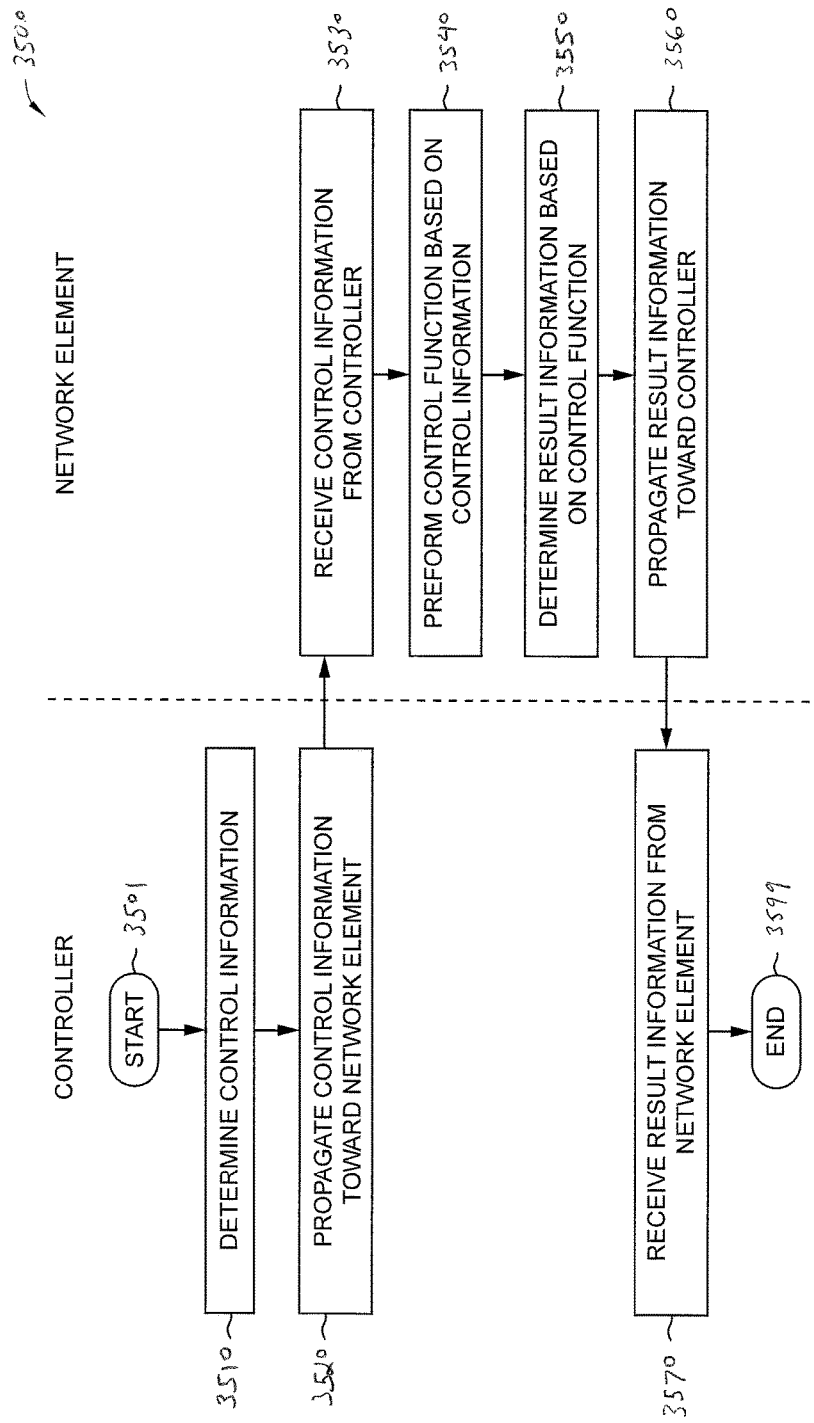
FIG. 35 depicts one embodiment of a method for supporting network zones and associated zone services.

FIG. 35 depicts one embodiment of a method for supporting network zones and associated zone services. The method 3500 includes functions performed by a controller and a network element (device) of a communication network. At block 3501, method 3500 begins. At block 3510, the controller determines control information for the network element. The control information may include any information which may be used by the network element to provide any control functions depicted and/or described herein. For example, the control information may include provisioning information for provisioning the network element or provisioning using the network element, testing information for testing the network element or testing using the network element, traffic control information for use by the network element in controlling propagation of traffic at the network element, or the like, as well as various combinations thereof. At 3520, the controller propagates the control information toward the network element. At block 3530, the network element receives the control information from the controller. At block 3540, the network element performs a control function based on the control information. At block 3550, the network element determines result information based on the control function performed by the network element. The result information may include any information which may be produced by the network element by performing any control functions depicted and/or described herein. At block 3560, the network element propagates the result information toward the controller. At block 3570, the controller receives the result information from the network element. At block 3599, method 3500 ends. It will be appreciated that, although depicted and described as ending (for purposes of clarity), the controller and network element may continue to interact for performing various control functions.

Figure 36:
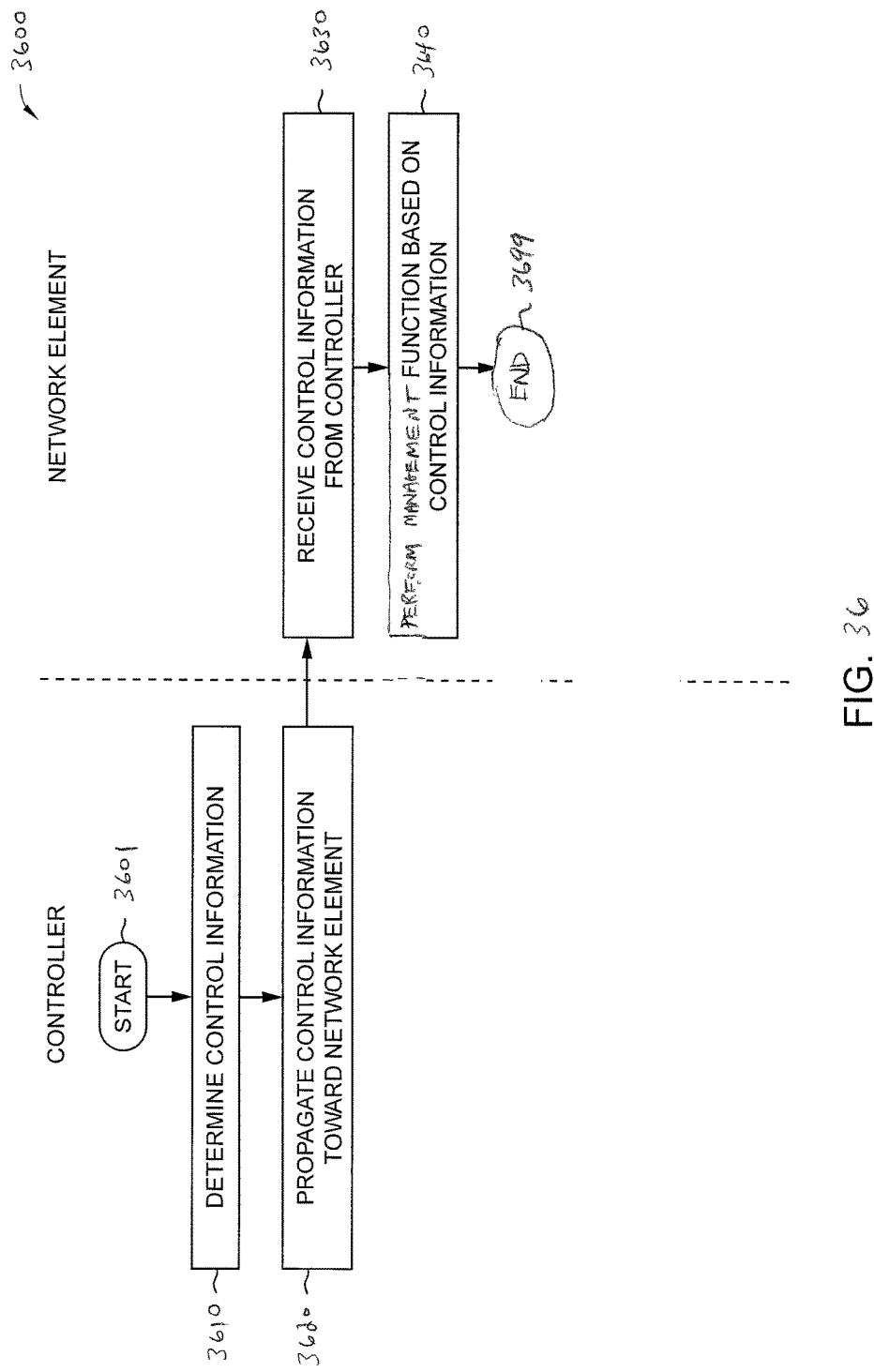
FIG. 36 depicts one embodiment of a method for supporting network zones and associated zone services.

FIG. 36 depicts one embodiment of a method for supporting network zones and associated zone services. The method 3600 includes functions performed by a controller and a network element (device) of a communication network. At block 3601, method 3600 begins. At block 3510, the controller determines control information for the network element. The control information may include any information which may be used by the network element to provide any control or management functions depicted and/or described herein. For example, the control information may include provisioning information for provisioning the network element or provisioning using the network element, testing information for testing the network element or testing using the network element, traffic control information for use by the network element in controlling propagation of traffic at the network element, wavelength path latency information, or the like, as well as various combinations thereof. At 3620, the controller propagates the control information toward the network element. At block 3630, the network element receives the control information from the controller. At block 3640, the network element performs a control or management function based on the control information. At block 3699, method 3600 ends. It will be appreciated that, although depicted and described as ending (for purposes of clarity), the controller and network element may continue to interact for performing various control functions.

As discussed herein, the present disclosure generally discloses capabilities for supporting one or more new network zones and associated zone services (e.g., NRT zones and associated NRT services, RT zones and associated RT services, or the like) which may be used within various contexts for various purposes. In at least some embodiments, RT and NRT zones may be used to compliment Carrier Ethernet (MEF), IP, and Internet services. In at least some embodiments, cloud and mobile solutions can create and offer service chaining in order to couple cloud resource models to either a mobile edge or metro edge low latency zone and service. In at least some embodiments, mobile RT and NRT zones may include fiber and DWDM engineering guidelines for 4G communications (e.g., fronthaul and backhaul), 5G communications (e.g., fronthaul, mid-haul, and backhaul), latency-sensitive solutions (e.g., NFV, Industrial IO, emerging 5G low latency applications, or the like), or the like, as well as various combinations thereof. In at least some embodiments, NRT and RT zones and services may be configured to offer higher performance and lower latency connectivity than is currently available in the market (e.g., while various existing applications—like voice or VoIP, text, e-mail and unicast video—have evolved to fully interwork across high latency solutions, some storage, computing, and emerging mobile and industrial technologies require lower latency network solutions which may be supported by NRT and RT zones and associated services). In at least some embodiments, RT and NRT zones and services may be used to support lower (and bounded) latency for cloud computing ecosystems which typically require latencies that are below the latencies currently supported by solutions currently used by cloud computing ecosystems (e.g., long haul networks used to support communications between datacenters and between datacenters and primary Internet exchange, private IP-VPNs, Carrier Ethernet, or the like). In at least some embodiments, RT and NRT zones and services may be used to support lower (and bounded) latency for mobile ecosystems which typically (and, in the case of 5G mobile, are expected to) require latencies that are below the latencies currently supported by solutions currently used by mobile ecosystems (e.g., Internet services, IP-VPN services, or the like). In at least some embodiments, RT and NRT zones and services may be used to support lower (and bounded) latency for enterprise networking associated with storage (SANs) and computing (LANs), which typically require latencies that are below the latencies currently supported by solutions currently used by enterprise networking. In at least some embodiments, RT and NRT zones and services may be used to support lower (and bounded) latency for mobile 4G and 5G networks which are evolving the Cloud—RAN (CRAN) to support Remote Radio Heads (RRH), fronthaul based on CPRI and/or CPRI over Ethernet, and Base Band Unit (BBU) pools for mobile clustering, where such latency may be in the range of between about 150-450 us at high performance rates (e.g., 10 Gbps (e.g., CPRI 3, 5 and 7)). In at least some embodiments, RT and NRT zones and services may be configured to provide a recipe for low latency, high performance operation, as well as a new operational solution (e.g., KPIs) including RT and NRT service SLA targets for CSPs, CNPs, ICPs, or the like (which also may account for associated business goals). In at least some embodiments, RT and NRT zones and services may be configured to constrain latency, build a hierarchical fiber plant, define new SDWDM network solutions, provide new RT and NRT Ethernet and Wavelength services for low latency, high performance networking, or the like, as well as various combinations thereof.

As discussed herein, the present disclosure discloses capabilities for supporting an RT zone and associated RT services. In at least some embodiments, an RT network recipe may include one or more of a basic fiber layer that defines the fiber plant (e.g., conduit, routing, and distance limits), a SDWDM network and switching layers (and an optional integrated packet switching layer), and a hierarchy of infrastructure latency zones. In at least some embodiments, an RT network recipe may support 150 µs to 450 µs round trip networking. In at least some embodiments, an RT network recipe may include WVC and/or EVC connectivity, may include an RT fiber plant (e.g., supporting linear topologies, tree topologies, ring topologies, or the like), may support WVC (OO) switching points (e.g., for lowest latency and lowest cost per bit interconnect), may be constructed with a fixed connectivity model using single or multiple aggregation points, may be constructed with a switching point that enables two or more aggregation points for flexibility to groom traffic to two or more locations (e.g., COs, COLOs, cloud hosting locations, or the like), may support multiple RT performance zones and associated network KPIs (e.g., an RT High Performance (HP) Zone (e.g., <150 µS), an RT Medium Performance (MP) Zone (e.g., <300 µS), an RT Low Performance (LP) Zone (e.g., <450 µS), or the like), may support various types of interfaces (e.g., UNI, NNI, or the like) which support various rates (e.g., 1G, 10G, 100G, 400G, and so forth), may support WVC switching based on ROADMs or other optical switching technologies), or the like, as well as various combinations thereof. In at least some embodiments, an RT service recipe may include one or more of RT service interconnects for various interface types (e.g., UNI, NNI, or the like) which may support various rates (e.g., 1G, 10G, 100G, 400G, and so forth), RT wholesale and retail services (e.g., RT W-Line, RT W-Access, CPRI, TSE W-Line, Industrial RT services, or the like), virtual connectivity for various virtual connection types (e.g., RT WVCs, RT EVCs, or the like) over various technologies (e.g., fiber, DWDM, ONT, Ethernet, or the like), RT service performance SLA targets for various RT services (e.g., RT High Performance Service, with FD, FDV (<1 ms), FLR (<0.001%), and FA (>99.99%); RT Medium Performance Service with FD, FDV (<2 ms), FLR (<0.001%), and FA (>99.99%); RT Low Performance Service with FD, FDV (<5 ms), FLR (<0.001%), and FA (>99.99%), or the like, as well as various combinations thereof). In at least some embodiments, an RT operations recipe may include one or more of RT UNI and NNI service operations with MEP and MIP per EVC and WVC, RT Service ping based on Ethernet IEEE 802.1ag and OTN TCM and Wavelength Wavetraker ping, RT Service trace based on Ethernet IEEE 802.1ag and OTN TCM and Wavelength Wavetraker trace, RT FD and FDV metrics based Ethernet IEEE 802.1ag and OTN TCM and Wavelength Wavetraker trace, RT wholesale and retail operations for network and service support systems, or the like, as well as various combinations thereof.

As discussed herein, the present disclosure discloses capabilities for supporting an NRT zone and associated NRT services. In at least some embodiments, an NRT network recipe may support round trip networking (e.g., 1 ms-5 ms, 2 ms-10 ms, or the like). In at least some embodiments, an NRT network recipe may include WVC and/or EVC connectivity, may include an NRT fiber plant supporting various topologies (e.g., linear topologies, tree topologies, ring topologies, or the like) and supporting various types of scalability (e.g., distance, number of channels, rate of channels, and so forth), may support various types of interconnects (e.g., WVC, EVC, and so forth), may support WVC (OO) switching (and, optionally, (OEO) WVC and/or EVC switching) for low latency and more granular services, may be constructed with a switching point that enables two or more aggregation points for flexibility to groom traffic to two or more locations (e.g., COs, COLOs, cloud hosting locations, or the like), may support multiple NRT performance zones and associated network KPIs (e.g., an NRT High Performance (HP) Zone (e.g., <1 ms), an NRT Medium Performance (MP) Zone (e.g., <2 ms), an NRT Low Performance (LP) Zone (e.g., <5 ms), or the like), may support various types of interfaces (e.g., UNI, NNI, or the like) which support various rates (e.g., 1G, 10G, 100G, 400G, and so forth), may support various types of switching (e.g., WVC switching based on optical switching to support very high data rates, WVC switching based on OTN switching to support OTN 1-N data rates, EVC switching based on packet switching to support Ethernet frame granularity and to introduce frame delay (FD) and frame delay variation (FDV) where the FD and FDV metrics can be engineered for fewer switching nodes than typical Carrier Ethernet networks and could be limited to 1, 2 or 3 points per EVC), or the like, as well as various combinations thereof. In at least some embodiments, an NRT service recipe may include one or more of NRT service interconnects for various interface types (e.g., UNI, NNI, or the like) which may support various rates (e.g., 1G, 10G, 100G, 400G, and so forth), RT wholesale and retail services (e.g., NRT W-Line, NRT W-Access, CPRI, TSE W-Line, Industrial NRT services, or the like), virtual connectivity for various virtual connection types (e.g., NRT WVCs, NRT EVCs, or the like) over various technologies (e.g., fiber, DWDM, ONT, Ethernet, or the like), NRT service performance SLA targets for various NRT services (e.g., NRT High Performance Service, with FD, FDV (<1 ms), FLR (<0.001%), and FA (>99.99%); NRT Medium Performance Service with FD, FDV (<2 ms), FLR (<0.001%), and FA (>99.99%); NRT Low Performance Service with FD, FDV (<5 ms), FLR (<0.001%), and FA (>99.99%), or the like, as well as various combinations thereof). In at least some embodiments, an NRT operations recipe may include one or more of NRT UNI and NNI service operations with MEP and MIP per EVC and WVC, NRT Service ping based on Ethernet IEEE 802.1ag and OTN TCM and Wavelength Wavetraker ping, NRT Service trace based on Ethernet IEEE 802.1ag and OTN TCM and Wavelength Wavetraker trace, RT FD and FDV metrics based Ethernet IEEE 802.1ag and OTN TCM and Wavelength Wavetraker trace, NRT wholesale and retail operations for network and service support systems, or the like, as well as various combinations thereof.

In at least some embodiments, RT and NRT zones and services may be configured to provide an infrastructure network recipe to de-risk network CAPEX, a new recipe for network OPEX, and a new recipe for RT and NRT service revenue.

Figure 37:
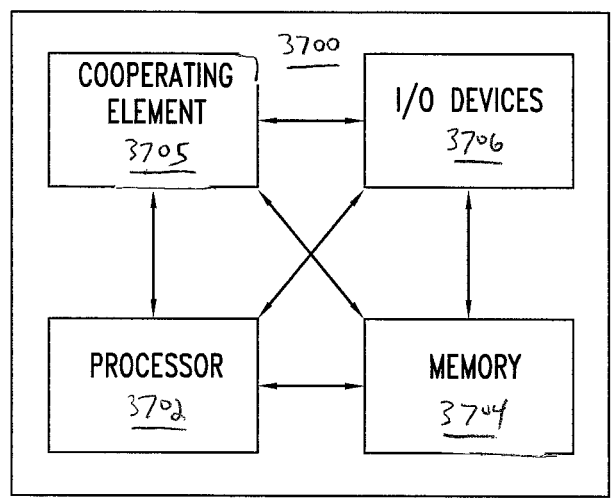
FIG. 37 depicts a high-level block diagram of a computer suitable for use in performing various functions described herein.

FIG. 37 depicts a high-level block diagram of a computer suitable for use in performing various functions described herein.

The computer 3700 includes a processor 3702 (e.g., a central processing unit (CPU), a processor having a set of processor cores, a processor core of a processor, or the like) and a memory 3704 (e.g., a random access memory (RAM), a read only memory (ROM), or the like). The processor 3702 and the memory 3704 are communicatively connected.

The computer 3700 also may include a cooperating element 3705. The cooperating element 3705 may be a hardware device. The cooperating element 3705 may be a process that can be loaded into the memory 3704 and executed by the processor 3702 to implement functions as discussed herein (in which case, for example, the cooperating element 3705 (including associated data structures) can be stored on a non-transitory computer-readable storage medium, such as a storage device or other storage element (e.g., a magnetic drive, an optical drive, or the like)).

The computer 3700 also may include one or more input/output devices 3706. The input/output devices 3706 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 3700 of FIG. 37 may represent a general architecture and functionality suitable for implementing functional elements described herein, portions of functional elements described herein, or the like, as well as various combinations thereof. For example, computer 3700 may provide a general architecture and functionality that is suitable for implementing any of the elements or functions (e.g., devices, nodes, controllers, systems, or the like) presented herein.

It will be appreciated that the functions depicted and described herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits (ASIC), and/or any other hardware equivalents).

It will be appreciated that at least some of the functions discussed herein as software methods may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
at least one processor; and
at least one memory including computer program code;
wherein the at least one memory and the computer program code are configured to, with the at least one processor, cause the apparatus at least to:
receive, by a network device configured to communicate data of a service via a set of available wavelength paths supported by the network device, wavelength path latency information comprising, for each of the available wavelength paths, respective bounded latency path information for the respective available wavelength path and respective lowest latency path information for the respective available wavelength path; and
perform, by the network device based on the wavelength path latency information, a management action for the service.

2. The apparatus of claim 1, wherein, to perform the management action, the at least one memory and the computer program code are configured to, with the at least one processor, cause the apparatus at least to:
receive a service provisioning message comprising a request for provisioning of the service, the service having a service latency associated therewith; and
configure the network device, based on the wavelength path latency information and the service latency associated with the service, to support the service.

3. The apparatus of claim 2, wherein the at least one memory and the computer program code are configured to, with the at least one processor, cause the apparatus at least to:
determine the service latency associated with the service based on service latency information available at the network device.

4. The apparatus of claim 2, wherein, to configure the network device to support the service, the at least one memory and the computer program code are configured to, with the at least one processor, cause the apparatus at least to:
select one of the available wavelength paths for the service based on a bounded latency value associated with the one of the available wavelength paths and based on the service latency associated with the service; and
associate the one of the available wavelength paths with the service at the network device.

5. The apparatus of claim 2, wherein, to configure the network device to support the service, the at least one memory and the computer program code are configured to, with the at least one processor, cause the apparatus at least to:
configure an interface of the network device to support the service, wherein the interface comprises a user-network interface (UNI) or a network-network interface (NNI).

6. The apparatus of claim 1, wherein, to perform the management action, the at least one memory and the computer program code are configured to, with the at least one processor, cause the apparatus at least to:
  receive data of the service to be communicated by the network device; and
  perform lowest latency wavelength path switching of the data of the service at the network device based on the lowest latency path information.

7. The apparatus of claim 6, wherein, to perform the lowest latency wavelength path switching of the data of the service at the network device, the at least one memory and the computer program code are configured to, with the at least one processor, cause the apparatus at least to:
  identify the available wavelength paths available at the network device;
  determine, for each of the available wavelength paths available at the network device based on the lowest latency path information, a respective lowest latency value indicative of a lowest latency of the available wavelength path;
  select, from the available wavelength paths, a selected wavelength path for which the respective lowest latency value indicative of the latency of the available wavelength path is lowest; and
  propagate the data of the service via the selected wavelength path.

8. The apparatus of claim 1, wherein the at least one memory and the computer program code are configured to, with the at least one processor, cause the apparatus at least to:
  receive data of the service to be communicated by the network device; and
  perform equal bounded latency multi-path wavelength switching of the data of the service at the network device based on the bounded latency path information.

9. The apparatus of claim 8, wherein, to perform equal bounded latency multi-path wavelength switching of the data of the service at the network device, the at least one memory and the computer program code are configured to, with the at least one processor, cause the apparatus at least to:
  identify the available wavelength paths available at the network device;
  determine, for each of the available wavelength paths available at the network device based on the bounded latency path information, a respective bounded latency value indicative of a bounded latency of the available wavelength path;
  identify, from the available wavelength paths, multiple wavelength paths for which the respective bounded latency values satisfy a threshold; and
  propagate the data of the service via the multiple wavelength paths.

10. The apparatus of claim 1, wherein the at least one memory and the computer program code are configured to, with the at least one processor, cause the apparatus at least to:
  receive, at the network device from a controller, an instruction to collect latency information;
  collect the latency information at the network device; and
  send the latency information from the network device toward the controller.

11. The apparatus of claim 10, wherein the latency information comprises at least one of physical layer latency information or data link layer latency information.

12. The apparatus of claim 10, wherein the latency information is collected using at least one of a maintenance endpoint (MEP) or a maintenance intermediate point (MIP).

13. The apparatus of claim 10, wherein the latency information is collected using at least one of a wavelength virtual connection (WVC) trace function or an Ethernet virtual connection (EVC) trace function.

14. The apparatus of claim 10, wherein the wavelength path latency information is based on the latency information.

15. The apparatus of claim 1, wherein the at least one memory and the computer program code are configured to, with the at least one processor, cause the apparatus at least to:
  receive service latency information for a set of services, wherein the service latency information comprises bounded latency information and lowest latency information; and
  perform the management action at the network device based on the service latency information.

16. The apparatus of claim 1, wherein the at least one memory and the computer program code are configured to, with the at least one processor, cause the apparatus at least to:
  receive a message comprising a request for provisioning of a backup network path based on dual path connection option information; and
  configure the network device to support the backup network path.

17. The apparatus of claim 1, wherein the at least one memory and the computer program code are configured to, with the at least one processor, cause the apparatus at least to:
  receive a message comprising a request for provisioning of a service connection based on alternate bounded latency path option information; and
  configure the network device to support the service connection.

18. The apparatus of claim 1, wherein the service comprises one of:
  a near-real-time (NRT) service configured to support a latency of less than 1 millisecond (ms), a latency of less than 2 ms, a latency of less than 5 ms, or a latency of less than 10 ms; or
  a real-time (RT) service configured to support a latency of less than 500 microseconds (us), a latency of less than 350 us, or a latency of less than 150 us.

19. The apparatus of claim 1, wherein the network device comprises a reconfigurable optical add-drop multiplexer (ROADM).

20. A non-transitory computer-readable storage medium including program instructions for causing an apparatus to at least:
  receive, by a network device configured to communicate data of a service via a set of available wavelength paths supported by the network device, wavelength path latency information comprising, for each of the available wavelength paths, respective bounded latency path information for the respective available wavelength path and respective lowest latency path information for the respective available wavelength path; and
  perform, by the network device based on the wavelength path latency information, a management action for the service.

21. A method, comprising:
  receiving, by a network device configured to communicate data of a service via a set of available wavelength paths supported by the network wavelength path latency information comprising, for each of the available wavelength paths, respective bounded latency path information for the respective available wavelength path and respective lowest latency path information for the respective available wavelength path; and performing, by the network device based on the wavelength path latency information, a management action for the service.

* * * * *